3,238,216
SUBSTITUTED 1,3,8-TRIAZA-SPIRO (4,5) DECANES
Paul Adriaan Jan Janssen, Vosselaar, near Turnhout, Belgium, assignor to Research Laboratorium Dr. C. Janssen N.V., a corporation of Belgium
No Drawing. Filed June 20, 1963, Ser. No. 289,443
34 Claims. (Cl. 260—293.4)

This application is a continuation-in-part of co-pending application Serial No. 204,623, filed June 22, 1962.

This invention relates to a new series of organic compounds generically definable as 1-$R_1$-2-$R_2$-3-$R_3$-4-oxo-8-$R_4$-1,3,8-triazaspiro(4,5)decanes and their therapeutically active nontoxic acid addition salts.

In the above general formula, $R_1$ is phenyl; lower alkaryl, e.g., methylphenyl, ethylphenyl and propylphenyl; lower alkyl; lower alkoxyphenyl, e.g. methoxyphenyl, ethoxyphenyl; cycloalkyl, e.g., cyclobutyl, cyclopentyl, cyclohexyl; halophenyl, e.g. fluorophenyl, bromophenyl, chlorophenyl; $R_2$ is hydrogen and lower alkyl; $R_3$ is hydrogen; hydroxymethyl; lower alkyl; lower alkylcarbonyl, e.g. acetyl, propionyl and butyryl; cyanoalkyl; lower alkoxymethyl; lower alkoxycarbonyl-alkyl, e.g., 2-(ethoxy-carbonyl)-ethyl; carbamoylalkyl, e.g., 2-carbamoylethyl; cyclopropylcarbonyl, benzyl and benzoyl; $R_4$ is $Z(CH_2)_n$—where $n$ is a positive integer from 1 to 5 and Z stands for hydrogen; lower alkyl; hydroxy; hydroxy-lower alkoxy; phenyl; diphenyl-cyano-methylene; diaryl-hydroxymethylene; diphenyl-propionylmethylene; fluorophenyl-hydroxymethylene; aryloxy, such as phenoxy, halophenoxy, including fluorophenoxy and chlorophenoxy, alkyyphenoxy and alkoxyphenoxy; 1,4-benzodioxanyl; halo-substituted 1,4-benzodioxanyl, including 7-bromo-1,4-benzodioxanyl; thienyl, halophenyl, including fluorophenyl and chlorophenyl; lower alkylphenyl; pyridyl; di-lower alkylphenyl; phenyl-lower alkylene, including phenyl-ethylene; lower alkoxyphenyl; cyclopropylethenyl; benzoyl, halobenzoyl, including fluorobenzoyl and chlorobenzoyl; thienoyl; lower alkylbenzoyl; lower alkoxybenzoyl; benzoyloxy; benzyloxy; phenylmethoxymethylene; phenylhydroxymethylene; fluorophenyl-lower alkyl-carbonyl-oxy-methylene, including fluorophenylacetoxymethylene and fluorophenylpropionoxymethylene; fluorophenyl-lower alkylene; aralkyl; including aryl-branched lower alkyl; aryl-cyclopropyl; arylthio; (aryl) (R′)CH—, wherein R′ is a member of the group consisting of lower alkyl, aryl and aralkyl radicals; (aryl)$_2$CH—O—; (lower alkyl)$_2$C=CH—; and (aryl)(R″)C=CH—, wherein R″ is a member of the group consisting of hydrogen, lower alkyl, aryl and aralkyl radicals. $R_4$ furthermore stands for (R‴)(R⁗)CH— wherein R‴ stands for methyl or ethyl and R⁗ is an aryl, arylmethylene and arylethylene radical.

Lower alkyl and lower alkoxy groups include those having from 1 to 6 carbon atoms. Both branched and straight-chain alkyl groups are included herein. Among the aryl groups operable herein are phenyl; halophenyl, such as fluorophenyl and chlorophenyl; lower alkylphenyl, such as methylphenyl; lower alkoxyphenyl, such as methoxyphenyl; trifluoromethylphenyl and 2-thienyl. An aralkyl group signifies one in which the aryl moiety is as just described and the number of carbon atoms in the alkyl moiety thereof, in combination with those in the hydrocarbon fraction attached to the nitrogen atom in the 8-position, totals up to and including 6 carbon atoms.

The compounds in base form are convertible to therapeutically active nontoxic acid addition salts, more especially hydrochlorides, dihydrochlorides and hydrochloride hemihydrates. This is accomplished by reaction with an appropriate acid as, for example, an inorganic acid such as hydrohalic acid, i.e., hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, benzenesulfonic, p-toluenesulfonic, salicylic, p-aminosalicylic, 2-phenoxybenzoic or 2-acetoxybenzoic acid.

Depending upon the conditions employed during the course of the reaction, the novel compounds are obtained either in the form of the free bases or salts thereof. The salts are converted to the free bases in the usual manner, e.g., by reaction with alkali such as sodium or potassium hydroxide. The bases can be converted to their therapeutically useful acid addition salts by reaction with an appropriate organic or inorganic acid.

The compounds of this invention are central nervous system depressants. The compounds have been shown to possess one or more of the following pharmacological properties: neuroleptic activity, coronary vasodilating activity, analgesic activity, mydriatic activity and anti-"apomorphine-induced emetic" activity. Among the preferred and more notably active compounds of this invention are the following. Neuroleptic activity is shown when $R_4$ in the above general formula is Z—$(CH_2)_n$—, but, more particularly, of this type Aryl—X—$(CH_2)_n$—, wherein X=—CO—, —CH(OH)—, —CH(OCO-lower alkyl)—, —$CH_2$—, —O— and —S— and $n$ is an integer from 1 to 5, although more predominantly and preferably when $n=3$. Neuroleptic activity is also observed when X in the foregoing formula is —CH=CH— and $n$ is as previously described and, preferably, when $n$ is 1 or 2. This neuroleptic activity is illustrated by inhibition of learned avoidance-escape behaviour in rats and dogs at dose levels of 0.0025 mg./kg. upward. Furthermore, inhibition of apomorphine-induced vomiting in dogs is observably responsive at doses at as low as 0.0005 mg./kg., whereas observable responses are also obtained in mice injected subcutaneously from 1.0 mg./kg. upward in the hot plate test of Eddy et al. (J. Pharmacol., 107, 385 (1953) and 110, 135 (1954)), without showing any mydriatic activity at the same dose level and also without any indication of a Straub phenomenon.

Compounds wherein Z is di(halophenyl)-methylene or phenylhalophenyl-methylene and, preferably, di(fluorophenyl)-methylene, and $n \geq 3$, but, preferably, $n$ is 3, are also potent neuroleptics characterized by an outstanding long duration of action.

Compounds wherein Z is diphenylmethylene, phenyl-lower alkylphenylmethylene, or di-(lower alkylphenyl)-methylene and $n$ is 3 are potent coronary vasodilating agents.

Compounds wherein $R_4$ stands for an aryl-branched alkyl group, and, preferably, where there is only one carbon atom between the aryl group and the piperidine moiety, are potent, short acting morphine-like analgesics. Mice injected subcutaneously respond to the hot plate test at doses from 0.1 mg./kg. upward. Mydriasis is evidenced at varying doses from 0.2 mg./kg. upward whereas also a positive Straub phenomenon is observed.

Compounds wherein Z stands for diphenylmethylene, diphenyl-cyanomethylene, diphenyl-hydroxymethylene or diphenyl-propionylmethylene and, $n=2$, are potent, long acting morphine-like analgesics.

Compounds wherein $R_4$ stands for 1,4-benzodioxanylmethylene, halo-substituted 1,4-benzodioxanylmethylene and compounds wherein Z stands for Aryl—$C(CH_3)$=CH— and $n=2$ have neuroleptic properties at low dose levels, as characterized by the inhibition of apomorphine-induced vomiting in dogs at dose levels of 0.008 mg./kg., whereas they have potent, morphine-like analgesic properties of long duration at higher dose levels as illustrated by their activity in the hot plate test in mice combined with a mydriatic activity in a positive Straub phenomenon at about 5 mg./kg. upward.

Condensation of a piperidone-4 or 4-hydroxy-piperidine alkali metal sulfite appropriately protected at the nitrogen by, for example, a benzyl group, with a primary amine and an alkali metal cyanide causes simultaneous introduction of the nitrile and secondary amino groups in the piperidyl ring at the 4-position. The ketone is reacted in an aqueous lower alkanol in the presence of one equivalent of an inorganic acid such as hydrochloric acid or an aqueous organic carboxylic acid system such as acetic acid (glacial). The 4-hydroxy-piperidine is reacted in an aqueous lower alkanol such as methyl, ethyl or propyl alcohol in the presence of one equivalent of hydrochloric acid.

The nitrile function is converted to the amide by acid hydrolysis. Advantageously, one may use a strong, aqueous, inorganic acid for this purpose such as hydrochloric acid, phosphoric acid or, preferably, sulfuric acid.

Cyclization of the resulting compound is suitably effected by treatment with formamide, in the absence or presence of an inorganic acid such as sulfuric acid, yielding the 1,3,8-triaza-spiro (4,5)dec-2-ene in cases where the secondary amino group attached to the piperidine ring is alkyl-substituted, and the 1,3,8-triaza-spiro (4,5) decane in cases where the secondary amino group is aryl-substituted. An exception occurs when the alkyl group is ethyl, in which case the saturated spiro compound is obtained. Reaction of the carboxamide with triethoxymethane, in the presence or absence of an organic carboxylic acid/organic solvent system such as acetic acid/toluene solution, invariably affords 1,3,8-triaza-spiro(4,5)dec-2-ene.

Ring closure of the carboxamidopiperidine is alternatively accomplished by treatment with an acylating agent, especially an anhydride of an aliphatic carboxylic acid of low molecular weight. This procedure leads to the unsaturated 1,3,8-triaza-spiro(4,5)dec-2-ene bearing a substituent at the 2-position identical to the aliphatic carboxylic acid residue of the anhydride employed.

The 1,2-di-substituted 1,3,8-triaza-spiro(4,5)dec-2-ene bearing a methyl substituent at the 2-position or the corresponding compound unsubstituted at the 2-position may be advantageously reduced to the spiro(4,5-)decane by treatment with a di-light metal hydride such as lithium aluminum hydride or sodium aluminum hydride. In the case of 2-methyl-substituted dec-2-enes, debenzylation by means of hydrogen activated by palladium-on-charcoal catalyst may be carried out before or after saturation of the cyclic double bond. Other suitable reducing agents include hydrogen activated by platinum or nickel catalyst such as platinum oxide or Raney nickel as well as obvious equivalents thereof. If, however, the 2-position of the dec-2-ene is unsubstituted, saturation of the ring precedes debenzylation. In any event, the debenzylation procedure is applicable to the 2,3-substituted and unsubstituted and 1-substituted compounds, except for side reactions such as simultaneous dehalogenation if, for example, the 1-position is occupied by a haloaryl group.

Substituents may be introduced into the nitrogen group at the 3-position before or after debenzylation. Reaction with an anhydride such as one of those noted above introduces an acyl group on the nitrogen. Conversely, treatment with an alkylating agent such as an alkyl halide or quaternary ammonium alkylaryl halide in the presence of a strong base such as sodamide gives the corresponding 3-alkyl-substituted compound. A hydroxyalkyl group may be introduced by reaction with the appropriate aqueous aldehyde, e.g., formaldehyde in the presence of a lower alkanol. The cyanoalkyl group is introduced into the 3-position by treatment of the appropriately substituted decane, preferably one having a benzyl group in the 8-position with an unsaturated nitrile. For example, reaction with acrylonitrile introduces the cyanoethyl group in the 3-position. The reaction is carried out in the presence of a strong base, such as an alkali metal alkoxide, at slightly elevated temperature, e.g., about 50° C., more or less, for several hours.

The benzyl group on the piperidine nitrogen may be removed by conventional means such as hydrogenolysis or other known methods and then may be replaced with a variety of substituents such as alkyl, aryloxyalkyl, alkaralkyl, diphenylalkylene, etc., groups by reaction of the spiro(4,5)-decane with the appropriate halogenated reactant in the presence of a halogen acid acceptor, such as sodium carbonate, trialkylamines or tertiary heterocyclic amines to bind the halogen acid that is liberated during the course of the reaction, preferably in an inert solvent medium such as a lower alkanol, e.g., methanol, ethanol, propanol or n-butanol, either singly or in admixture with another organic solvent.

If the substituent on the piperidine nitrogen is a cyano-bearing group, such as diphenyl-cyanomethylene-$(CH_2)_n$, reaction with an organo-metallic halide under Grignard conditions results in the replacement of the nitrile function with the corresponding keto group.

Especially useful acylating agents are the anhydrides of aliphatic carboxylic acids of low molecular weight, e.g., acetic, propionic, or butyric.

Organic solvents of advantage in conducting the necessary reactions of this invention include 4-methyl-2-pentanone, benzene, toluene, xylene, heptane, tetrahydrofuran, dioxane, ether. Where appropriate, water-miscible solvents such as lower alkanols may be used, e.g., ethanol, butanol, or isopropanol.

As a Grignard reagent one employs the lower alkyl magnesium halide appropriate for introduction of the desired alkyl group, e.g., methyl magnesium iodide, ethyl magnesium bromide, or propyl magnesium bromide.

The nomenclature employed in the compounds of this invention is based upon the following nucleus:

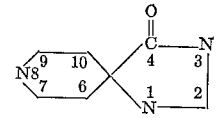

The preferred compounds of this series are those where the 1-position is occupied by phenyl or alkylphenyl; the 2-position is unsubstituted or occupied by methyl; the 3-position is unsubstituted or occupied by lower alkyl or alkylcarbonyl; and the 8-position is occupied by 3-cyano-3,3-diphenylpropyl; 2-(1,4-benzodioxanyl)-methyl; substituted or unsubstituted benzoylpropyl, especially fluorobenzoylpropyl; substituted or unsubstituted phenoxypropyl, especially fluorophenoxypropyl, substituted or unsubstituted phenylthiopropyl, especially fluorophenylthiopropyl, aralkyl, especially arylmethylene and diarylbutyl, especially di(fluorophenyl)butyl, fluorophenylphenylbutyl and diphenylbutyl.

The following examples are intended to illustrate, but not to limit, the scope of the present invention.

*Example I*

A mixture of 6.12 parts 1-benzyl-4-carbamoyl-4-N-anilinopiperidine and 20 parts formamide is heated for twelve hours at 170° C. After cooling, the reaction mixture is divided between 100 parts water and 900 parts chloroform. The organic layer is separated, dried over $MgSO_4$, filtered and the filtrate is evaporated. The semisolid residue is stirred in 16 parts ethyl acetate. The undissolved part is filtered off, washed with ethyl acetate, and dried, yielding 1-phenyl-4-oxo-8-benzyl-1,3,8-triaza-spiro- (4,5)decane, melting point 232–238.5° C., as a white microcrystalline powder.

*Example II*

To a stirred mixture of 3.9 parts 1-phenyl-4-oxo-1,3,8-triaza-spiro(4,5)decane, 3.2 parts sodium carbonate, a few crystals of potassium iodide in 160 parts 4-methyl-2-pentanone is added dropwise a solution of 2.8 parts 1-chloro-2-phenylethane in 40 parts 4-methyl-2-pentanone. After the addition is complete, the whole is stirred and refluxed for forty-eight hours. After cooling, 100 parts water are added. A precipitate is formed, which is filtered off, yielding a first crop of crude 1-phenyl-4-oxo-8-(2-phenylethyl)-1,3,8-triaza-spiro(4,5)decane, melting point 198.6–201° C.

From the filtrate, the organic layer is separated, dried over MgSO₄, filtered and evaporated. The solid residue is washed with ether and dried, yielding 1-phenyl-4-oxo-8-(2 - phenylethyl) - 1,3,8 - triaza - spiro(4,5)decane, melting point 181–184.2° C., as a beige granular powder.

*Example III*

A mixture of 5.4 parts 4-bromo-2,2-diphenyl-butyronitrile, 3.9 parts 1-phenyl-4-oxo-1,3,8-triaza-spiro(4,5)decane, 3.2 parts sodium carbonate, a few crystals of potassium iodide in 200 parts 4-methyl-2-pentanone is stirred and refluxed for forty-eight hours. After cooling, 100 parts water are added. The aqueous layer is separated and extracted once more with toluene. The combined organic layers are dried over MgSO₄, filtered and the solvent is evaporated. The oily residue is dissolved in 80 parts diisopropylether. On keeping at room temperature, 1-phenyl-4-oxo-8 - (3-cyano-3,3-diphenylpropyl) - 1,3,8-triaza-spiro(4,5)decane is obtained, melting point 178–184° C., as a pale grey granular powder.

*Example IV*

20 parts 1-benzyl-4-carbamoyl-4-N - (3-methylanilino) piperidine, 45.2 parts formamide are refluxed for twenty hours. The mixture is cooled to room temperature, poured in water and extracted with 3 x 50 parts chloroform. The chloroform solutions are combined, dried over 10 parts K₂CO₃, filtered and the solvent evaporated under reduced pressure on the water bath. The oily residue is taken up in toluene, treated with charcoal, filtered, concentrated under reduced pressure and dissolved in 100 parts ether with 10 parts hexone. On cooling at —20° C., a white precipitate is formed which, after filtering with suction and drying, yields 1 - (3 - methylphenyl) - 4-oxo-8-benzyl-1,3,8-triaza-spiro(4,5)decane, melting point 203.6–209.2° C., as a light tan crystalline powder.

*Example V*

15 parts 1-benzyl-4-carbamoyl-4-N - (4-methylanilino) piperidine and 34.5 parts formamide are refluxed and stirred for two hours. The mixture is then poured into 100 parts water, alkalinized with excess ammonia and extracted with 3 x 50 parts chloroform. The extract is dried over 5 parts K₂CO₃, filtered and evaporated to dryness under reduced pressure on a water bath. The residue is dissolved in 90 parts ethyl acetate. The precipitate which separates at once on cooling is filtered off, dried over K₂CO₃ and weighed. The yield of 1-(4-methylphenyl)-4-oxo-8-benzyl - 1,3,8 - triaza-spiro(4,5)decane, melting point 221.4–222.6° C., as a grey amorphous powder.

*Example VI*

A mixture of 4.5 parts 1-bromo-2-phenoxyethane, 4.4 parts 1-phenyl-4-oxo-1,3,8-triaza-spiro(4,5)decane, 3 parts sodium carbonate, a few crystals of potassium iodide in 200 parts 4-methyl-2-pentanone is stirred and refluxed for forty-eight hours. After cooling to room temperature, the reaction mixture is treated with 50 parts water and the layers are separated. The organic layer is dried over 5 parts K₂CO₃, filtered and evaporated to dryness. The solid residue is treated with 40 parts diisopropylether and yields after recrystallization from 160 parts 4-methyl-2-pentanone 1-phenyl-4-oxo-8 - (2-phenoxyethyl) - 1,3,8-triaza-spiro(4,5)decane, melting point 214–217.5° C., as light yellow needles.

*Example VII*

A mixture of 5.8 parts 2-(bromomethyl)-1,4-benzodioxane, 4.4 parts 1-phenyl-4-oxo - 1,3,8 - triaza-spiro(4,5) decane, 3 parts sodium carbonate, a few crystals of potassium iodide in 200 parts 4-methyl-2-pentanone is stirred and refluxed for forty-eight hours. After cooling, 100 parts water are added. The organic layer is separated, dried and filtered. On standing of the filtrate a solid precipitated which is filtered off, yielding crude 1-phenyl-4-oxo-8/2-(1,4-benzodioxanyl) - methyl/1,3,8-triaza-spiro (4,5)decane. This crop is recrystallized from 100 parts toluene to yield 1-phenyl-4-oxo-8/2-(1,4-benzodioxanyl)-methyl/1,3,8 - triaza - spiro(4,5)decane, melting point 215.8–218° C., as a white amorphous powder.

*Example VIII*

A mixture of 4.8 parts 1-bromo-3-phenoxypropane, 4.4 parts 1-phenyl-4 - oxo - 1,3,8 - triaza - spiro(4,5)decane, 3 parts sodium carbonate, a few crystals of potassium iodide in 200 parts 4-methyl-2-pentanone is stirred and refluxed for forty-eight hours. After cooling, 100 parts water are added. The organic layer is separated while hot, dried, filtered and evaporated. The solid residue is stirred in diisopropylether, filtered off and dried, yielding crude 1-phenyl-4-oxo-8-(3-phenoxypropyl)-1,3,8-triaza-spiro(4,5) decane. This crop is recrystallized from a mixture of 40 parts diisopropylether and 20 parts tetrahydrofurane to yield 1-phenyl-4-oxo-8 - (3-phenoxypropyl) - 1,3,8-triaza-spiro(4,5)decane, melting point 154.2–156° C., as pale beige granules.

*Example IX*

To a mixture of 15.5 parts 1-benzyl-4-carbamoyl-4-N-(4-chloroanilino)-piperidine and 50 parts formamide are added portionwise 20 parts sulfuric acid 98%. After the addition is complete, the whole is refluxed for two hours. After cooling, there are added 100 parts water and the mixture is alkalinized with a small volume of ammonium hydroxide. The whole is extracted with chloroform. The organic layer is dried, filtered and evaporated. The residue is recrystallized from ethyl acetate to yield 1-(4-chlorophenyl)-4-oxo-8-benzyl - 1,3,8-triaza-spiro(4,5)decane, melting point 209.5–214.8° C., as white microcrystals.

*Example X*

A mixture of 20 parts 1-benzyl-4-carbamoyl-4-N-(3-methoxyanilino)-piperidine and 40 parts formamide is tirred and refluxed for one and three-quarter hours. After cooling, the reaction is treated with 20 parts ammonium hydroxide, 100 parts water and 150 parts chloroform. The aqueous layer is separated and extracted four times with 75 parts chloroform. The combined organic layers are dried over potassium carbonate and evaporated. The oily residue is treated with 100 parts ethyl acetate and the whole is shaken for five minutes. The formed precipitate is filtered off, washed with ethyl acetate and dried, yielding crude 1 - (3 - methoxyphenyl) - 4 - oxo-8-benzyl-1,3,8-triaza-spiro(4,5)decane. This crop is boiled for ten minutes in 60 parts ethyl acetate and filtered while hot to yield crude 1 - (3-methoxyphenyl) - 4-oxo-8-benzyl-1,3,8-triaza-spiro(4,5)decane. This fraction is recrystallized from 57 parts tetrahydrofuran. After cooling to 0° C., 1 - (3-methoxyphenyl) - 4-oxo-8-benzyl-1,3,8-triaza-spiro (4,5)decane is filtered off, melting point 212–214° C., as a white amorphous powder.

*Example XI*

A mixture of 20 parts 1-benzyl-4-carbamoyl-4-N-(2-methyl-anilino)-piperidine and 40 parts formamide is stirred and refluxed for one and three-quarter hours. After cooling, the reaction mixture is decomposed with 100 parts water and 20 parts ammonium hydroxide and extracted with 150 parts chloroform. The obtained emulsion is clarified by filtering and from the filtrate the organic layer is separated, dried over potassium carbonate and evaporated. The oily residue is dissolved in 400 parts diethylether and this solution is filtered several times until clear; the filtrate is evaporated again. The oily residue is dissolved in 48 parts ether. After cooling for a few days to −15° C., 1-(2-methylphenyl)-4-oxo-8-benzyl-1,3,8-triaza-spiro(4,5)decane is obtained, melting point 151–161° C., as white shiny scales.

*Example XII*

A mixture of 3.5 parts 2-chloromethyl-thiophene, 5 parts 1 - phenyl - 4 - oxo - 1,3,8 - triaza-spiro(4,5)decane, 4 parts sodium carbonate, a few crystals of potassium iodide in 200 parts 4-methyl-2-pentanone is stirred and refluxed for sixty hours. After cooling, 100 parts water are added. The organic layer is separated, dried, filtered and evaporated. The solid residue is stirred in diisopropylether, filtered off and dried, yielding the product. This crop is recrystallized from a mixture of chloroform and acetone, yielding 1-phenyl-4-oxo-8-(2-thienylmethyl)-1,3,8-triaza-spiro(4,5)decane, melting point 220–223° C.

*Example XIII*

A mixture of 3.6 parts 4-fluoro-benzylchloride, 5 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for sixty hours. After cooling, 100 parts water are added. The organic layer is separated, dried over potassium carbonate, filtered and evaporated. The solid residue is stirred in acetone, filtered and dried, yielding 1-phenyl-4-oxo-8-(4-fluorobenzyl)-1,3,8-triaza-spiro(4,5)decane, melting point 224–234° C., as a white amorphous powder.

*Example XIV*

A mixture of 4.6 parts 4-methyl-benzylchloride, 5 parts 1 - phenyl -4- oxo -1,3,8- triaza-spiro(4,5)decane, 4 parts sodium carbonate, a few crystals of potassium iodide in 200 parts 4-methyl-2-pentanone is stirred and refluxed for sixty hours. After cooling, 100 parts water are added. The organic layer is separated, dried, filtered and evaporated. The solid residue is stirred in diethylether and dried to yield crude product. This crop is recrystallized from 56 parts acetone, yielding 1-phenyl-4-oxo-8-(4 - methylbenzyl) - 1,3,8 - triaza - spiro(4,5)decane, melting point 182.6–185.4° C., as a pale yellow microcrystalline powder.

*Example XV*

A mixture of 4 parts 2-chloromethylpyridine hydrochloride, 5 parts 1-phenyl-4-oxo-1,3,8-triaza-spiro(4,5)decane, 8 parts sodium carbonate, a few crystals of potassium iodide in 200 parts 4-methyl-2-pentanone is stirred and refluxed for sixty hours. After cooling, 100 parts water are added. The organic layer is separated, dried, filtered and evaporated. The solid residue is recrystallized from a mixture of acetone and chloroform, yielding 1 - phenyl - 4 - oxo - 8 - (2 - pyridylmethyl)-1,3,8-triaza-spiro(4,5)decane, melting point 195–201° C., as a beige amorphous powder.

*Example XVI*

A mixture of 4 parts 2,5-dimethyl-benzylchloride, 5 parts 1 - phenyl -4- oxo -1,3,8- triaza-spiro(4,5)decane, 4 parts sodium carbonate, a few crystals of potassium iodide in 200 parts 4-methyl-2-pentanone is stirred and refluxed for forty-eight hours. After cooling, 100 parts water are added. The precipitated solid is filtered off, yielding impure product, melting point 209.4–211° C.

From the filtrate the organic layer is separated, dried, filtered and evaporated. The solid residue is stirred in diethylether, filtered off again and dried, yielding 1-phenyl - 4 - oxo - 8 - (2,5 - dimethyl - benzyl) - 1,3,8-triaza-spiro(4,5)decane, melting point 206–208.4° C., as a while powder.

*Example XVII*

Starting from 0.6 part magnesium, 2.7 parts bromoethane and 120 parts anhydrous ether, a solution of ethyl magnesium bromide is prepared in the usual manner. To this solution is added slowly a solution of 5 parts 1-phenyl - 4 - oxo - 8 - (3 - cyano - 3,3 - diphenylpropyl)-1,3,8-triaza-spiro(4,5)decane in 200 parts toluene. After the addition is complete, most of the ether is distilled off. The residue is stirred and refluxed for twenty hours. The reaction mixture is decomposed with 100 parts hydrochloric acid 2 N and then stirred and refluxed for another six hours. Three layers are obtained. After separation of the supernatant toluene layer, the remaining aqueous layer together with the oily layer is alkalized with ammonium hydroxide and the whole is extracted with chloroform. The chloroform is dried, filtered and evaporated. The solid residue is stirred in ether, filtered off and dried, yielding crude 1-phenyl-4-oxo-8-(3,3-diphenyl-4-oxohexyl)-1,3,8-triaza-spiro(4,5)decane. This crop is recrystallized from a mixture of chloroform and methanol, yielding 1 - phenyl - 4 - oxo - 8 - (3,3 - diphenyl - 4-oxo-hexyl)-1,2,3-triaza-spiro(4,5)decane, melting point 226–228° C., as a while-grey amorphous powder.

*Example XVIII*

To a stirred mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 3.7 parts 2-methyl-benzylchloride in 24 parts 4-methyl-2-pentanone. After the addition is complete, the whole is stirred and refluxed for forty-eight hours. After cooling, 150 parts water are added. The precipitate is filtered off, yielding crude 1-phenyl - 4 - oxo-8-(2-methyl-benzyl)-1,3,8-triaza-spiro(4,5)decane. From the filtrate, the aqueous layer is separated and extracted once more with 40 parts 4-methyl-2-pentanone. The combined organic layers are dried over potassium carbonate and evaporated. The solid residue is stirred in 80 parts diisopropylether, filtered off again and dried, yielding a second fraction of impure 1-phenyl - 4 -oxo - 8 - (2 - methylbenzyl) - 1,3,8 - triaza-spiro(4,5)-decane. The combined fractions are recrystallized from 56 parts 4-methyl-2-pentanone. After cooling to 0° C., 1-phenyl-4-oxo-8-(2-methylbenzyl)-1,3,8-triaza-spiro(4,5)decane is obtained, melting point 217–219° C., as white shiny crystals.

*Example XIX*

A mixture of 3.6 parts 3-methyl-benzylchloride, 5 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for forty-eight hours. After cooling the reaction mixture, 100 parts water are added. The whole is stirred and the formed precipitate is filtered off, yielding crude 1-phenyl-4 - oxo - 8 - (3 - methylbenzyl) - 1,3,8 - triaza - spiro-(4,5)decane. This crop is recrystallized from 80 parts 4 - methyl - 2 - pentanone, yielding 1 - phenyl - 4 - oxo-8 - (3 - methylbenzyl) - 1,3,8 - triaza-spiro(4,5)decane, melting point 220–225° C., as a while amorphous powder.

*Example XX*

To a stirred mixture of 5.1 parts 1-phenyl-4-oxo-1,3,8-triaza-spiro(4,5)decane, 7 parts sodium carbonate and a few crystals of potassium iodide in 136 parts 4-methyl-2-pentanone is added dropwise a solution of 5.25 parts 1-bromo-3-phenylpropane in 24 parts 4-methyl-2-pentanone. After the addition is complete, the whole is stirred and refluxed for forty-two hours. After cooling, 150 parts water are added. The aqueous layer is separated and extracted once more with about 40 parts 4-methyl-2-pentanone. The combined organic layers are dried over potassium carbonate and evaporated. The solid residue is stirred in about 80 parts diisopropylether and filtered off again. It is recrystallized from 56 parts 4-methyl-2-pentanone. After cooling to 0° C., the precipitate is filtered off and dried for two hours at 90° C., yielding 1 - phenyl - 4 - oxo-8-(3-phenylpropyl)-1,3,8-triaza-spiro-(4,5)decane, melting point 169.6–170.8° C., as a grey amorphous powder.

*Example XXI*

A mixture of 7.5 parts 4-bromo-,2-diphenyl-butyronitrile, 5 parts 1-methyl-4-oxo-1,3,8-triaza-spiro(4,5)decane hydrochloride, 8 parts sodium carbonate and a few crystals of potassium iodide in 320 parts 4-methyl-2-pentanone is stirred and refluxed for seventy-six hours. The reaction mixture is filtered and the filtrate is evaporated. The solid residue is recrystallized from 80 parts 2-propanol. The precipitate is filtered off, washed with ether and dried, yielding 1 - methyl-4-oxo-8-(3-cyano-3,3-diphenylpropyl)-1,3,8-triaza-spiro(4,5)decane, melting point 117.4–121° C., as a white powder.

*Example XXII*

A mixture of 102 parts 1-benzyl-4-carbamoyl-4-N-(4-methoxyanilino)-piperidine, 190 parts formamide and 54 parts sulfuric acid 98% is stirred and refluxed for one and one-half hours. After cooling, 250 parts water are added. This aqueous solution is alkalized with 50 parts ammonium hydroxide and extracted three times with 450 parts chloroform. The combined organic layers are dried over potassium carbonate and evaporated. The oily residue solidifies on stirring in 200 parts ethyl acetate, yielding 1 - (4 - methoxyphenyl)-4-oxo-8-benzyl-1,2,8-triaza-spiro (4,5)decane, melting point 184.2–185.4° C., as a white amorphous powder.

*Example XXIII*

A mixture of 7.5 parts 4-bromo-2,2-diphenyl-butyronitrile, 5 parts 1-(3-methylphenyl)-4-oxo-1,3,8-triaza-spiro (4,5)decane, 4 parts sodium carbonate and a few crystals of potassium iodide in 200 parts 4-methyl-2-pentanone is stirred and refluxed for forty-eight hours. After cooling, 150 parts water are added. The organic layer is separated, dried over magnesium sulfate, filtered and evaporated. The residue is recrystallized from 80 parts boiling diethylether, yielding 1-(3-methylphenyl)-4-oxo-8-(3-cyano - 3,3-diphenylpropyl)-1,3,8-triaza-spiro(4,5)decane, melting point 206–212° C., as a pale brown amorphous powder.

*Example XXIV*

A mixture of 7.5 parts 4-bromo-2,2-diphenyl-butyronitrile, 5 parts 1-(4-methylphenyl)-4-oxo-1,3,8-triaza-spiro (4,5)decane, 4 parts sodium carbonate and a few crystals of potassium iodide in 200 parts 4-methyl-2-pentanone is stirred and refluxed for forty-eight hours. After cooling, 150 parts water are added. The organic layer is separated, dried, filtered and evaporated. The solid residue is stirred in diethylether, filtered off again and dried, yielding 1 - (4 - methylphenyl)-4-oxo-8-(3-cyano-3,3-diphenylpropyl)-1,3,8-triaza-spiro(4,5)decane, melting point 205–211° C., as a white amorphous powder.

*Example XXV*

A mixture of 4.5 parts 4-bromo-2,2-diphenyl-butyronitrile, 4.5 parts 1-cyclohexyl-4-oxo-1,3,8-triaza-spiro(4,5)-decane dihydrochloride, 6 parts sodium carbonate and a few crystals of potassium iodide in 200 parts 4-methyl-2-pentanone is stirred and refluxed for seventy-two hours. The reaction mixture is filtered and the filtrate is evaporated. The residue is dissolved in water and the whole is extracted with chloroform. The organic layer is dried over sodium sulfate and evaporated. The residue is dissolved in a mixture of 40 parts 2-propanol and 40 parts diisopropylether. After keeping at room temperature, two fractions are obtained, a first crop of 1-cyclohexyl-4-oxo - 8 - (3-cyano-3,3-diphenylpropyl)-1,3,8-triaza-spiro-(4,5)decane contaminated with some of its hydrobromide and a second crop of 1-cyclohexyl-4-oxo-8-(3-cyano-3,3-diphenylpropyl)-1,3,8 - triaza - spiro(4,5)decane, melting point 172.5–175° C., as a pale yellow, granular powder.

*Example XXVI*

To a stirred mixture of 5.5 parts 1-phenyl-4-oxo-1,3,8-triaza-spiro(4,5)decane, 7.5 parts sodium carbonate and a few crystals of potassium iodide in 137 parts 4-methyl-2-pentanone is added dropwise a solution of 3.5 parts 1-chloro-2-(2-hydroxyethoxy)-ethane in 24 parts 4-methyl-2-pentanone. After the addition is complete, the whole is stirred and refluxed for forty-eight hours. After cooling, 150 parts water are added. The aqueous layer is separated and extracted once more with 80 parts 4-methyl-2-pentanone. The combined organic layers are dried over potassium carbonate and concentrated to a volume of 70 parts. After cooling this residue for one hour at 0° C., 1-phenyl-4-oxo-8-[2-(2 - hydroxy - ethoxy)ethyl] - 1,3,8-triaza-spiro(4,5)decane is obtained, melting point 197.6–234° C. (dec.), as a beige amorphous powder.

*Example XXVII*

To a stirred mixture of 0.6 part lithium aluminum hydride, 48 parts benzene and 24 parts tetrahydrofurane are added, portionwise, 5.4 parts of 1-phenyl-2-methyl-4-oxo-8-benzyl-1,3,8-triaza-spiro(4,5)dec-2-ene. After the addition is complete, the whole is stirred and refluxed for twenty hours. After cooling, the reaction mixture is decomposed by successive addition of 50 parts water and 100 parts hydrochloric acid 1 N. Then there are added 6 parts tartaric acid. The solution is alkalized with ammonium hydroxide and extracted with chloroform. The organic layer is separated, dried over magnesium sulfate, filtered and evaporated. The oily residue is dissolved in a boiling mixture of 20 parts ethyl acetate and 160 parts diethylether and gaseous hydrogen chloride is introduced into the solution. The precipitated hydrochloride is filtered off and recrystallized from 68 parts boiling 2-propanol, yielding crude hydrochloride. This crop is dissolved in water. The aqueous solution is alkalized with ammonium hydroxide. The separated free base is filtered off and recrystallized from 24 parts boiling 4-methyl-2-pentanone. After cooling, dl-1-phenyl-2-methyl-4-oxo-8-benzyl-1,3,8-triaza-spiro(4,5)decane is filtered off, melting point 150–151.8° C., as a white granular powder.

*Example XXVIII*

A mixture of 5 parts 1bromo-2-phenoxyethane, 5 parts 1 - (4-methylphenyl)-4-oxo-1,3,8-triaza-spiro(4,5)decane, 4 parts sodium carbonate and a few crystals of potassium iodide in 200 parts 4-methyl-2-pentanone is stirred and refluxed for forty-eight hours. After cooling, 100 parts water are added. The organic layer is separated, dried, filtered and on keeping the filtrate at room temperature, the product is filtered off. This crop is recrystallized from 48 parts 4-methyl-2-pentanone, yielding 1-(4-methylphenyl) - 4 - oxo - 8 - (2-phenoxyethyl)-1,3,8-triaza-spiro-(4,5)decane, melting point 177–177.5° C., as colorless shiny crystal needles.

*Example XXIX*

A mixture of 5 parts 1-phenyl-4-oxo-8-benzyl-1,3,8-triazospiro(4,5)decane, 10 parts acetic acid anhydride and 40 parts toluene is stirred and refluxed for fifteen hours. After cooling, the reaction mixture is alkalized with ammonium hydroxide. The organic layer is separated, dried over magnesium sulfate, filtered and the filtrate is concentrated to a volume of 30 parts. To this residue are added 56 parts diethylether. After keeping at room temperature, 1-phenyl-3-acetyl-4-oxo-8-benzyl-1,3,8-triaza-spiro(4,5)decane is filtered off, melting point 128–130° C., as a white amorphous powder.

Example XXX

A mixture of 6.4 parts 1-phenyl-4-oxo-8-benzyl-1,3,8-triazo-spiro(4,5)decane, 0.98 part sodamide and 40 parts anhydrous toluene is stirred and refluxed until no more ammonia is evolved (in the course of about thirty minutes). After cooling, 5.4 parts N,N,N-trimethylanilinium-bromide are added. Then the whole is stirred and refluxed for sixteen hours. After cooling, 50 parts water are added. The organic layer is separated, dried over magnesium sulfate and filtered and evaporated. To the oily residue are added 50 parts water and the whole is evaporated again. This treatment is repeated three times to remove the dimethylaniline formed during the reaction. The residual water is removed by repeated azeotropic distillation with 40 parts 4-methyl-2-pentanone. The oily residue is then dissolved in a mixture of 16 parts ethyl acetate and 40 parts diethylether. After keeping at room temperature, 1-phenyl-3-methyl-4-oxo-8-benzyl-1,3,8-triaza-spiro(4,5)decane is filtered off, melting point 138–140.5° C., as white crystals. On further cooling the mother liquor at 0° C., a second fraction of less pure 1-phenyl-3-methyl-4-oxo-8-benzyl-1,3,8-triaza-spiro(4,5)decane is obtained, melting point 136–184° C.

Example XXXI

A mixture of 6 parts 1-bromo-2-phenoxyethane, 6 parts 1-methyl-4-oxo-1,3,8-triaza-spiro(4,5)decane hydrochloride, 9.5 parts sodium carbonate and a few crystals of potassium iodide in 240 parts 4-methyl-2-pentanone is stirred and refluxed for forty-eight hours. The reaction mixture is filtered and evaporated. The residue is recrystallized from acetone, yielding the crude product. This crop is recrystallized from acetone, yielding 1-methyl-4-oxo-8-(2-phenoxyethyl)-1,3,8-triaza-spiro(4,5)decane, melting point 109.2–113.2° C., as a white-yellow granular powder.

Example XXXII

A mixture of 6 parts 1-phenyl-4-oxo-8-benzyl-1,3,8-triaza-spiro(4,5)decane, 10 parts formaline 37% and 48 parts 2-propanol is stirred and refluxed for sixteen hours. The reaction mixture is kept at room temperature, yielding 1-phenyl-3-(hydroxymethyl)-4-oxo-8-benzyl-1,3,8-triaza-spiro(4,5)decane, melting point 171.4–173° C., as a white amorphous powder. On further keeping the filtrate at room temperature, second fraction of 1-phenyl-3-(hydroxymethyl)-4-oxo-8-benzyl-1,3,8-triaza-spiro(4,5)decane is filtered off, melting point 169–170° C. (dec.).

Example XXXIII

A mixture of 4.5 parts 1-bromo-2-phenoxyethane, 6.7 parts 1-cyclohexyl-4-oxo-1,3,8-triaza-spiro(4,5)decane dihydrochloride, 8.5 parts sodium carbonate and a few crystals of potassium iodide in 240 parts 4-methyl-2-pentanone is stirred and refluxed for forty-eight hours. The reaction mixture is filtered and evaporated. The solid residue is recrystallized from acetone, yielding 1-cyclohexyl-4-oxo-8-(2-phenoxyethyl)-1,3,8-triaza-spiro(4,5)decane, melting point 161–162.5° C., as pale beige crystals.

Example XXXIV

A mixture of 6.4 parts 1-phenyl-4-oxo-8-benzyl-1,3,8-triaza-spiro(4,5)decane, 1 part sodamide and 40 parts anhydrous toluene is stirred and refluxed for one hour. Then there is added dropwise a solution of 2.2 parts ethylbromide in 40 parts anhydrous toluene to the refluxing solution. After the addition is complete, stirring and refluxing is continued for three hours. After cooling, the reaction mixture is decomposed with water. The aqueous layer is separated and extracted once more with toluene. The combined organic layers are separated, dried over magnesium sulfate, filtered and evaporated. The semi-solid residue is dissolved in 160 parts ether. The solution is filtered and gaseous hydrogen chloride is introduced into the filtrate. The precipitated solid hydrochloride is filtered off and recrystallized from 24 parts 2-propanol to yield 1-phenyl-3-ethyl-4-oxo-8-benzyl-1,3,8-triaza-spiro(4,5)decane hydrochloride, melting point 234–238° C., as a grey-white granular powder.

Example XXXV

A mixture of 72 parts 1-benzyl-4-carbamoyl-4-N-(ethylamino)-piperidine, 177 parts formamide and 44 parts sulfuric acid 98% is stirred and refluxed for one hour. After cooling, 200 parts water are added. The whole is alkalized with ammonium hydroxide and extracted with chloroform. The organic layer is dried over sodium sulfate, filtered and evaporated. The residue is dissolved in 120 parts ethyl acetate. After cooling for three hours at −15° C., 3 parts of an unidentified solid are filtered off. After further cooling of the mother liquor for four days at 0° C., 1-ethyl-4-oxo-8-benzyl-1,3,8-triaza-spiro(4,5)decane is obtained, melting point 139–145.4° C., as a grey-white granular powder.

Example XXXVI

A mixture of 3.8 parts cinnamylchloride, 5 parts 1-phenyl-4-oxo-1,3,8-triaza-spiro(4,5)decane, 4 parts sodium carbonate and a few crystals of potassium iodide in 200 parts 4-methyl-2-pentanone is stirred and refluxed for forty-eight hours. After cooling, 100 parts water are added. The organic layer is separated, dried, filtered and evaporated. The residue is dissolved in diethylether and filtered. After cooling at room temperature, 2.5 parts less pure product are obtained. This crop is recrystallized from 160 parts ether, yielding 1-phenyl-4-oxo-8-cinnamyl-1,3,8-triaza-spiro(4,5)decane, melting point 171–172.2° C., as pale beige crystals.

Example XXXVII

A mixture of 5 parts 1-phenyl-4-oxo-8-(3-cyano-3,3-diphenylpropyl)-1,3,8-triaza-spiro(4,5)decane, 10 parts acetic acid anhydride and 80 parts anhydrous toluene is stirred and refluxed for fifteen hours. The reaction mixture is alkalized with ammonium hydroxide. The organic layer is separated, dried, filtered and evaporated. The solid residue is recrystallized from 80 parts 4-methyl-2-pentanone, to yield 1-phenyl-3-acetyl-4-oxo-8-(3-cyano-3,3-diphenylpropyl)-1,3,8-triaza-spiro(4,5)decane, melting point 219–220.5° C., as a pale yellow amorphous powder.

Example XXXVIII

A mixture of 4.6 parts 1-chloro-4-phenoxybutane, 5 parts 1-phenyl-4-oxo-1,3,8-triaza-spiro(4,5)decane, 4 parts sodium carbonate and a few crystals of potassium iodide in 200 parts 4-methyl-2-pentanone is stirred and refluxed for forty-eight hours. After cooling, 100 parts water are added. The organic layer is separated, dried, filtered and evaporated. The solid residue is recrystallized from 240 parts diethylether to yield the crude product. This crop is recrystallized from 80 parts 4-methyl-2-pentanone, yielding 1-phenyl-4-oxo-8-(4-phenoxybutyl)-1,3,8-triaza-spiro(4,5)decane, melting point 85–112° C. (dec.), as a pale yellow granular powder.

Example XXXIX

To a mixture of 6.4 parts 1-phenyl-4-oxo-8-benzyl-1,3,8-triaza-spiro(4,5)decane, 1.3 parts acrylonitrile and 40 parts dioxane is added dropwise a solution of sodium ethoxide, prepared from 0.35 part sodium in 8 parts ethanol. After the addition is complete, the whole is heated to 50° C. While maintaining this temperature, the mixture is stirred for three hours. After cooling, 50 parts water are added. The whole is extracted twice with 240 parts ether. The organic layer is separated, dried over potassium carbonate and gaseous hydrogen chloride is introduced into it. An oily hydrochloride is obtained. The solvent is decanted and the oily residue is dissolved in water. The aqueous solution is alkalized with sodium hydroxide and extracted with ether and chloroform. The combined organic solutions are dried over magnesium sulfate and gaseous hydrogen chloride is introduced into it. A sticky hydrochloride is obtained, which is dissolved in 80 parts boiling 2-propanol. After keeping for forty-eight hours at room temperature, the crude product is obtained. This crop is recrystallized from a mixture of 48 parts acetone and 8 parts 2-propanol. After cooling overnight at −20° C., 1-phenyl-3-(2-cyanoethyl)-4-oxo-8-benzyl-1,3,8-triaza-spiro(4,5)decane hydrochloride is obtained, melting point 217.8–219° C., as purple shiny crystals.

*Example XL*

A mixture of 6.1 parts 1-bromo-3,3-diphenylpropane, 4.6 parts 1-phenyl-4-oxo-1,3,8-triaza-spiro(4,5)decane, 3.2 parts sodium carbonate and a few crystals of potassium iodide in 200 parts 4-methyl-2-pentanone is stirred and refluxed for sixty hours. After cooling, 50 parts water are added. The organic layer is separated, dried over potassium carbonate and evaporated. The oily residue is dissolved in 40 parts acetone. This solution is poured into 400 parts diisopropylether. After filtration gaseous hydrogen chloride is introduced into the filtrate. The precipitated hydrochloride is filtered off and dried, yielding the crude salt. This crop is recrystallized from a boiling mixture of 80 parts 2-propanol and 40 parts acetone. The undissolved part is filtered off. After cooling the filtrate for three hours at −20° C., 1-phenyl-4-oxo-8-(3,3-diphenylpropyl) - 1,3,8 - triaza-spiro(4,5)decane hydrochloride is filtered off, melting point 247–251° C., as a pale yellow amorphous powder.

*Example XLI*

A mixture of 4.3 parts 3-chloro-1,1-diphenylpropanol, 4.6 parts 1-phenyl-4-oxo-1,3,8-triaza-spiro(4,5)decane, 3.2 parts sodium carbonate and a few crystals of potassium iodide in 120 parts 4-methyl-2-pentanone is stirred and refluxed for sixty hours. After cooling, 50 parts water are added. The organic layer is separated, dried over potassium carbonate and evaporated. The solid residue is triturated in 24 parts acetone, yielding the crude product. This crop is recrystallized from a boiling mixture of 80 parts acetone and 8 parts 2-propanol. After cooling overnight at −20° C., 1-phenyl-4-oxo-8-(3,3-diphenyl-3-hydroxypropyl) - 1,3,8 - triaza-spiro(4,5)decane is obtained, melting point 226–231.5° C., as a white amorphous powder.

*Example XLII*

To a stirred and refluxing mixture of 4.6 parts 1-phenyl-4-oxo-1,3,8-triaza-spiro(4,5)decane, 3.2 parts sodium carbonate and a few crystals of potassium iodide in 160 parts 4-methyl-2-pentanone is added dropwise a solution of 4.4 parts 2-(2-chloroethyl)-1,4-benzodioxane in 40 parts 4-methyl-2-pentanone. After the addition is complete the whole is stirred and refluxed for sixty-five hours. After cooling, 50 parts water are added. The organic layer is separated, dried over potassium carbonate, filtered and evaporated. The oily residue is dissolved in a mixture of 120 parts acetone and 120 parts diisopropylether. This solution is filtered and gaseous hydrogen chloride is introduced into the filtrate. The solid hydrochloride is filtered off, boiled in 320 parts 4-methyl-2-pentanone, filtered off again and dried, yielding the crude product. This crop is recrystallized from 64 parts 2-propanol. On standing at room temperature a first fraction of less pure dl-1-phenyl-4-oxo-8-2-/2-(1,4-benzodioxanyl)/ - ethyl - 1,3,8-triaza-spiro(4,5)decane hydrochloride is obtained, melting point 154° to 220° C. On further cooling the filtrate at 0° C., another fraction of pure dl-1-phenyl-4-oxo-8-2-/2-(1,4-benzodioxanyl)/-ethyl - 1,3,8 - triaza-spiro(4,5) decane hydrochloride is filtered off, melting point 141.6° to 202° C. (dec.), as a brown-yellow amorphous powder.

*Example XLIII*

A mixture of 3.2 parts 4-chloro-p-fluoro-butyrophenone, 3.5 parts 1-phenyl-4-oxo-1,3,8-triaza-spiro(4,5)decane, 2 parts sodium carbonate and 0.1 part potassium iodide in 200 parts 4-methyl-2-pentanone is refluxed with stirring for fifty hours. The mixture is cooled to room temperature, 200 parts water are added and the layers are separated. The organic layer is dried over 10 parts magnesium sulfate, filtered and the solvent removed under reduced pressure on the water bath. The residue is treated with 50 parts diisopropylether. The precipitate is filtered on a Buchner filter and recrystallized from 20 parts 4-methyl-2-pentanone at room temperature. The solid is filtered off and dried to yield 1-phenyl-4-oxo-8-[3-(4-fluorobenzoyl) - propyl] - 1,3,8-triaza-spiro(4,5)decane, melting point 190–193.6° C., as a light brown amorphous powder.

*Example XLIV*

To a stirred mixture of 5.1 parts 1-phenyl-4-oxo-1,3,8-triaza-spiro(4,5)decane, 7 parts sodium carbonate and a few crystals of potassium iodide in 136 parts 4-methyl-2-pentanone is added dropwise a solution of 4.8 parts 4-chloro-butyrophenone in 24 parts 4-methyl-2-pentanone. After the addition is complete, the whole is stirred and refluxed for forty-eight hours. After cooling, 150 parts water are added. The aqueous layer is separated and extracted once more with 40 parts 4-methyl-2-pentanone. The combined organic layers are dried over potassium carbonate and evaporated. The solid residue is recrystallized from about 56 parts 4-methyl-2-pentanone. After cooling to 0° C., 1-phenyl-4-oxo-8-(3-benzoylpropyl)-1,3,8-triaza-spiro(4,5)decane is obtained, melting point 173.8–177.6° C., as a pale brown amorphous powder.

*Example XLV*

A mixture of 4.2 parts 4-chloro-butyrothienone, 5 parts 1-phenyl-4-oxo-1,3,8-triaza-spiro(4,5)decane, 4 parts sodium carbonate and a few crystals of potassium iodide in 200 parts 4-methyl-2-pentanone is stirred and refluxed for forty-eight hours. After cooling the reaction mixture, 100 parts water are added. The undissolved part is filtered off to yield 1-phenyl-4-oxo-8-[4-oxo-4-(2-thienyl)-butyl]-1,3,8-triaza-spiro(4,5)decane, melting point 172.5–177° C., as a beige granular powder.

From the filtrate the organic layer is separated, dried, filtered and evaporated. The residue is recrystallized from 20 parts 4-methyl-2-pentanone, yielding crude 1-phenyl - 4-oxo-8-[4-oxo-4-(2-thienyl)-butyl]-1,3,8-triaza-spiro(4,5)decane, melting point 160.6–173° C. (dec.).

*Example XLVI*

A mixture of 5 parts 4-chloro-4′-fluoro-butyrophenone, 5 parts 1-(3-methylphenyl)-4-oxo-1,3,8-triaza-spiro(4,5)decane, 4 parts sodium carbonate, and a few crystals of potassium iodide in 200 parts 4-methyl-2-pentanone is stirred and refluxed for forty-eight hours. After cooling the reaction mixture, 100 parts water are added. The organic layer is separated, dried, filtered and evaporated. The solid residue is stirred in diethylether, filtered off again and dried to yield crude 1-(3-methylphenyl)-4-oxo-8 - [3 - (4-fluorobenzoyl)-propyl]-1,3,8-triaza-spiro(4,5)decane. This crop is recrystallized from a mixture of diisopropylether and tetrahydrofurane, yielding 1-(3-methylphenyl) - 4 - oxo-8-[3-(4-fluorobenzoyl)-propyl]-1,3,8-triaza-spiro(4,5)decane, melting point 180.8–182.6° C., as a pale beige amorphous powder.

*Example XLVII*

A mixture of 5 parts 4-chloro-4′-fluoro-butyrophenone, 5 parts 1-(4-methylphenyl)-4-oxo-1,3,8-triaza-spiro(4,5)decane, 4 parts sodium carbonate and a few crystals of potassium iodide in 200 parts 4-methyl-2-pentanone is stirred and refluxed for forty-eight hours. After cooling, 50 parts water are added. The organic layer is separated, dried, filtered and the filtrate is evaporated. The solid residue is stirred in diethylether, filtered off again and dried, yielding the crude product. This crop is recrystallized from a mixture of 40 parts diisopropylether and 40 parts tetrahydrofurane, yielding 1-(4-methylphenyl)-4-oxo - 8 - [3 - (4-fluorobenzoyl)-propyl]-1,3,8-triaza-spiro (4,5)decane, melting point 178–180.8° C., as a white amorphous powder.

*Example XLVIII*

A mixture of 3 parts 4,4'-dichloro-butyrophenone, 3.6 parts 1-phenyl-4-oxo-1,3,8-triaza-spiro(4,5)decane, 4 parts sodium carbonate and a few crystals of potassium iodide in 200 parts 4-methyl-2-pentanone is stirred and refluxed for forty-eight hours. After cooling, 100 parts water are added. The organic layer is separated, dried, filtered and evaporated. The solid residue is first recrystallized from 40 parts acetone and then from 24 parts 4-methyl-2-pentanone, yielding 1-phenyl-4-oxo-8-[3-(4-chlorobenzoyl) - propyl] - 1,3,8-triaza-spiro(4,5)decane, melting point 202–203.8° C., as a pale brown amorphous powder.

*Example XLIX*

A mixture of 5 parts 4-chloro-4'-fluoro-butyrophenone, 5 parts 1-methyl-4-oxo-1,3,8-triaza-spiro(4,5)decane hydrochloride, 8 parts sodium carbonate and a few crystals of potassium iodide in 320 parts 4-methyl-2-pentanone is stirred and refluxed for forty hours. A second fraction of 5 parts 4-chloro-4'-fluoro-butyrophenone is added and the whole is stirred and refluxed for another twenty-six hours. The reaction mixture is filtered and the filtrate is evaporated. The solid residue is recrystallized from 80 parts 2-propanol. After keeping at room temperature, the crude free base of 1-methyl-4-oxo-8-[3-(4-fluorobenzoyl)-propyl]-1,3,8-triaza-spiro(4,5)decane dihydrochloride is filtered off. This crop is dissolved in chloroform. The organic layer is washed with water, dried over potassium carbonate and evaporated. The residue is dissolved in 2-propanol and gaseous hydrogen chloride is introduced into the solution. The precipitated hydrochloride is filtered off and dried, yielding 1-methyl-4-oxo-8-[3-(4-fluorobenzoyl)-propyl]-1,3,8-triaza-spiro(4,5)decane dihydrochloride, melting point 203.6–212° C., as a grey-white amorphous powder.

*Example L*

To a mixture of 2.8 parts dl-1-phenyl-2-methyl-4-oxo-1,3,8-triaza-spiro(4,5)decane, 1.8 parts sodium carbonate, and a few crystals of potassium iodide in 80 parts 4-methyl-2-pentanone is added dropwise a solution of 3-parts 4-chloro-4'-fluoro-butyrophenone in 80 parts 4-methyl-2-pentanone. After the addition is complete, the whole is stirred and refluxed for forty-eight hours. After cooling, 100 parts water are added. The organic layer is separated, dried over magnesium sulfate, filtered and the filtrate is concentrated to a volume of 60 parts, whereupon a solid is precipitated. It is filtered off and dried to yield dl-1-phenyl-2-methyl-4-oxo-8-[3-(4-fluorobenzoyl)-propyl]-1,3,8-triaza-spiro(4,5)decane, melting point 148–149.6° C., as a white amorphous powder.

*Example LI*

To a stirred mixture of 5.75 parts 1-(4-methoxyphenyl)-4-oxo-1,3,8-triaza-spiro(4,5)decane, 7 parts sodium carbonate and a few crystals of potassium iodide and 136 parts 4-methyl-2-pentanone is added dropwise a solution of 5.3 parts 4-chloro-4'-fluoro-butyrophenone in 24 parts 4-methyl-2-pentanone. After the addition is complete, the whole is stirred and refluxed for twenty-four hours. Then there is added a second portion of 2.65 parts 4-chloro-4'-fluoro-butyrophenone dissolved in 24 parts 4-methyl-2-pentanone and after this addition is complete, the whole is stirred and refluxed for another forty-eight hours. After cooling 150 parts water are added. The organic layer is separated, dried over potassium carbonate and evaporated. The solid residue is stirred in 80 parts diisopropylether, filtered off and dried, yielding crude 1-(4-methoxyphenyl)-4-oxo-8-[3 - (4 - fluorobenzoyl)-propyl]-1,3,8-triaza-spiro(4,5)decane. This fraction is recrystallized twice from 4-methyl-2-pentanone (respectively from 32 parts and 24 parts), yielding 1-(4-methoxyphenyl)-4-oxo-8-[3-(4-fluorobenzoyl)-propyl]-1,3,8 - triaza-spiro(4,5)decane, melting point 163–165° C., as a pale yellow crystalline powder.

*Example LII*

A mixture of 4.8 parts 4-chloro-4'-methyl-butyrophenone, 5 parts 1-phenyl-4-oxo-1,3,8-triaza-spiro(4,5)decane, 4 parts sodium carbonate and a few crystals of potassium iodide in 200 parts 4-methyl-2-pentanone is stirred and refluxed for forty-eight hours. After cooling, 100 parts water are added. The organic layer is separated, dried over potassium carbonate, filtered and the filtrate is concentrated under reduced pressure, whereupon a solid is precipitated. It is filtered off, washed with diethylether and dried, yielding 1-phenyl-4-oxo-8-[3-(4-methylbenzoyl)-propyl]-1,3,8 - triaza - spiro-(4,5)decane, melting point 190.6–193.8° C., as a white amorphous powder.

*Example LIII*

A mixture of 5 parts 1-phenyl-4-oxo-8-[3-(4-fluorobenzoyl)-propyl]-1,3,8-triaza-spiro(4,5)decane, 10 parts acetic acid anhydride and 80 parts toluene is stirred and refluxed for sixteen hours. After cooling, the reaction mixture is alkalized ammonium hydroxide. The organic layer is separated, dried, filtered and evaporated. The oily residue is dissolved in diethylether. Then gaseous hydrogen chloride is introduced into the solution. The precipitated hydrochloride is filtered off and recrystallized from 40 parts 4-methyl-2-pentanone, yielding 1-phenyl-3-acetyl-4-oxo-8-[3 - (4-fluorobenzoyl) - propyl]-1,3,8-triaza-spiro(4,5)decane hydrochloride, melting point 188–212.5° C. (dec.), as white granules.

*Example LIV*

A mixture of 4 parts 4-chloro-4'-fluoro-butyrophenone, 3.5 parts 1-(2-propyl)-4-oxo-1,3,8-triaza-spiro(4,5)decane, 6.36 parts sodium carbonate and a few crystals of potassium iodide in 160 parts 4-methyl-2-pentanone is stirred and refluxed for twenty-four hours. Then a second portion of 2 parts 4-chloro-4'-fluoro-butyrophenone is added and the whole is stirred and refluxed for another thirty-six hours. The reaction mixture is filtered while hot and the filtrate is evaporated. The oily residue is dissolved in a mixture of 160 parts ether and 80 parts 4-methyl-2-pentanone. Gaseous hydrogen chloride is introduced into the solution. The precipitated solid hydrochloride is filtered off, yielding the product. This crop is recrystallized from a mixture of 80 parts ethanol (denaturated), 80 parts acetone and 320 parts methanol. After cooling for three hours at −15° C., the precipitated solid is filtered off. This crop is dried for thirty hours at 70° C., yielding 1-(2-propyl)-8-[3-(4-fluorobenzoyl)-propyl] - 1,3,8-triaza - spiro(4,5)decane dihydrochloride hemihydrate, melting point 212.6–214° C. (dec.), as a white amorphous powder.

*Example LV*

A mixture of 4.5 parts 1-phenyl-4-oxo-8-[3-(4-fluorobenzoyl)-propyl]-1,3,8-triaza-spiro(4,5)decane, 0.5 part sodium tetrahydridoborate, 48 parts tetrahydrofurane and 1 part distilled water is stirred and refluxed for four hours. After cooling, the reaction mixture is decomposed with diluted hydrochloric acid and alkalized with ammonium hydroxide. The aqueous layer is separated and extracted with chloroform. The combined organic layers are dried over magnesium sulfate and evaporated. The solid residue is boiled in 80 parts methanol. The undissolved part is filtered off while hot, yielding the product (mainly unreacted 1-phenyl-4-oxo-8-[3-(4-fluorobenzoyl)-propyl]-1,3,8-triaza-spiro(4,5)decane). On cooling the filtrate at room temperature, a second fraction of 2 parts solid is filtered off. The filtrate is evaporated. This residue (0.5 part), together with the second fraction of 2 parts product is recrystallized from 16 parts 2-propanol and filtered. On keeping the filtrate at room temperature, dl-1-phenyl-4-oxo-8-[4-(4-fluorophenyl)-4-hydroxybutyl]-1,3,8-triaza-spiro(4,5)decane is obtained, melting 175.5–177° C., as a white microcrystalline powder.

*Example LVI*

A mixture of 5 parts 4-chloro-4'-methoxy-butyrophenone, 5 parts 1-phenyl-4-oxo-1,3,8-triaza-spiro(4,5)decane, 4 parts sodium carbonate and a few crystals of potassium iodide and 200 parts 4-methyl-2-pentanone is stirred and refluxed for forty-eight hours. After cooling, 100 parts water are added. The organic layer is separated, dried, filtered and evaporated. The oily residue is dissolved in 40 parts 2-propanol. After cooling to room temperature the crude product is obtained. This crop is recrystallized from 24 parts 4-methyl-2-pentanone, yielding 1-phenyl-4-oxo-8-[3-(4-methoxybenzoyl)-propyl]-1,3,8-triaza-spiro(4,5)decane, melting point 178.4–180° C., as a pale brown crystalline powder.

*Example LVII*

To a stirred and refluxing solution of 6.7 parts 1-cyclohexyl-4-oxo-1,3,8-triaza-spiro(4,5)decane dihydrochloride and 8.5 parts sodium carbonate in 120 parts 4-methyl-2-pentanone is added dropwise a solution of 6 parts 4-chloro-4'-fluoro-butyrophenone in 80 parts 4-methyl-2-pentanone. After the addition is complete, the whole is stirred and refluxed for forty-eight hours. After cooling, the reaction mixture is treated with water. The organic layer is dried over sodium sulfate and evaporated. The residue is dissolved in anhydrous ether and gaseous hydrogen chloride is introduced into the solution. The precipitated hydrochloride is filtered off and dried, yielding the crude product. This crop is boiled in 80 parts 2-propanol. After cooling, 3.5 parts of a mixture of the mono- and dihydrochloride salt are obtained. This crop is triturated in boiling acetone and gaseous hydrogen chloride is introduced into this mixture. The obtained solid is filtered off and dried, yielding 1-cyclohexyl-4-oxo-8-[3-(4-fluorobenzoyl)-propyl]-1,3,8-triaza-spiro(4,5)decane dihydrochloride, melting point 206–215° C. (dec.), as beige granules.

*Example LVIII*

To a stirred and refluxing solution of 6 parts 1-phenyl-3-methyl-4-oxo-1,3,8-triaza-spiro(4,5)decane hydrochloride, 4 parts sodium carbonate and a few crystals of potassium iodide in 104 parts of 4-methyl-2-pentanone is added dropwise a solution of 6 parts 4-chloro-4'-fluoro-butyrophenone in 56 parts 4-methyl-2-pentanone. After the addition is complete, the whole is stirred and refluxed for forty-eight hours. After cooling, 100 parts water are added. The organic layer is separated, dried over magnesium sulfate, filtered and evaporated. The oily residue is dissolved in 160 parts diethylether and gaseous hydrogen chloride is introduced into the solution. The precipitated hydrochloride is filtered off and boiled in 56 parts 2-propanol. The undissolved part is filtered off from the hot solution and dried to yield 1-phenyl-3-methyl-4-oxo-8-[3-(4-fluorobenzoyl)-propyl]-1,3,8-triaza-spiro(4,5)decane hydrochloride, melting point 252–254° C., as a white amorphous powder.

*Example LIX*

A mixture of 4.3 parts 1-chloro-5-oxo-5-phenyl-pentane, 4.6 parts 1-phenyl-4-oxo-1,3,8-triaza-spiro(4,5)decane, 3.2 parts sodium carbonate and a few crystals of potassium iodide in 200 parts 4-methyl-2-pentanone is stirred and refluxed for sixty hours. After cooling, 50 parts water are added. The organic layer is separated, dried over potassium carbonate and evaporated. The solid residue is triturated in 24 parts acetone, yielding 1-phenyl-4-oxo-8-(4-benzoylbutyl)-1,3,8-triaza-spiro(4,5)decane, melting point 169.5–184° C., as a pale yellow amorphous powder.

*Example LX*

A mixture of 4 parts 1-phenyl-4-oxo-8-[3-(4-fluorobenzoyl)-propyl]-1,3,8-triaza-spiro(4,5)decane, 6.5 parts propionic acid anhydride and 80 parts anhydrous toluene is heated to reflux. The obtained solution is stirred and refluxed for fifteen hours. The reaction mixture is filtered while hot. After cooling, the filtrate is alkalized with ammonium hydroxide. The toluene layer is separated, washed twice with a 10% potassium carbonate solution, dried over potassium carbonate, filtered and evaporated. The oily residue solidifies on treating in diisopropylether, yielding 1-phenyl-3-propionyl-4-oxo-8-[3-(4-fluorobenzoyl)-propyl]-1,3,8-triaza-spiro(4,5)decane, melting point 86.5–88° C., as a beige granular powder.

*Example LXI*

To a mixture of 44 parts 1-benzyl-4-hydroxypiperidine sodium, 70 parts water and 40 parts alcohol are added dropwise 14 parts aniline (slightly exothermic reaction). After stirring for two hours, a precipitate is formed. A solution of 9.5 parts potassium cyanide in 50 parts water is added dropwise at room temperature, whereupon the precipitate is dissolved again. After stirring overnight at room temperature, the whole is extracted with 640 parts ether, the etheral solution is washed with about 1500 parts water, dried over potassium carbonate, filtered and the filtrate is evaporated. The oily residue is dissolved in anhydrous diisopropylether. After cooling for one day at −15° C., 4.5 parts of product are filtered off. This crop is recrystallized from ether and a few drops of acetone are added. After cooling overnight at −15° C., 1-benzyl-4-cyano-4-N-anilinopiperidine is filtered off, melting point 144.8–146.2° C., as shiny crystal needles.

*Example LXII*

A mixture of 190 parts 1-benzyl-4-oxo-piperidine, 93 parts aniline and 700 parts glacial acetic acid is cooled to 30° C. Then there are added dropwise a solution of 71.6 parts potassium cyanide in 200 parts water, at the same temperature (exothermic reaction: temperature rises to 45° C.). After the addition is complete, the whole is stirred at room temperature for twenty hours. The reaction mixture is poured into a mixture of 1300 parts ammonium hydroxide and 1000 parts crushed ice. The whole is extracted with chloroform. The organic layer is dried, filtered and evaporated. The solid residue is washed with diisopropylether and dried, yielding 1-benzyl-4-cyano-4-N-anilinopiperidine, melting point 143.5–147° C.

*Example LXIII*

A mixture of 5 parts 1-benzyl-4-cyano-4-N-anilinopiperidine and 60 parts sulfuric acid 90% is heated for ten minutes at 70° C. in a water bath. The water bath is removed and the whole is stirred for another hour. The reaction mixture is poured into ice-water. The aqueous solution is alkalized with ammonium hydroxide and extracted with chloroform. The organic layer is dried over magnesium sulfate, filtered and evaporated. The solid residue is stirred in 56 parts benzene, filtered off and dried, yielding 1-benzyl-4-carbamoyl-4-N-anilinopiperidine, melting point 186.8–188.2° C., as a white amorphous powder.

*Example LXIV*

A mixture of 95 parts 1-benzyl-4-oxo-piperidine, 33.1 parts potassium cyanide, 50 parts methyl-amine hydrochloride, 120 parts water and 48 parts ethanol is stirred for sixty-six hours at room temperature. The reaction mixture is extracted with chloroform. The organic layer is dried over sodium sulfate and evaporated. The residue is dissolved in a mixture of 80 parts petroleum ether and 80 parts diisopropylether. After cooling to −20° C., two fractions of 1 - benzyl-4-cyano-4-N-methyl-amino-piperidine are filtered off, one having a melting point 63–64° C. and the other a melting point 61.2–62° C.

*Example LXV*

20 parts 1-benzyl-4-cyano-4-N-methyl-aminopiperidine are added to 90 parts sulfuric acid 90% (exothermic reaction: temperature rises to 75° C). The whole is stirred for fifty minutes. The reaction mixture is poured into ice-water. The whole is alkalized with ammonium hydroxide while cooling: a precipitate is formed. The whole is extracted with chloroform. The chloroform layer is dried over potassium carbonate and evaporated. The solid residue is recrystallized from diisopropylether, filtered off and dried, yielding 1-benzyl-4-carbamoyl-4-N-methyl-aminopiperidine, melting point 156–157° C., as a white flaky powder.

*Example LXVI*

To a cooled mixture (30° C.) of 192 parts 1-benzyl-4-oxo-piperidine, 120.5 parts 3-methyl-aniline and 500 parts glacial acetic acid is added dropwise a solution of 81.4 parts potassium cyanide in 140 parts water, in the course of thirty minutes (exothermic reaction: temperature rises from 30° to 40° C.). The whole is stirred for two days at room temperature. The reaction mixture is poured into 1000 parts crushed ice, while stirring. The whole is alkalized with 1200 parts ammonium hydroxide and extracted with about 3000 parts chloroform. The organic layer is dried over potassium carbonate and evaporated. The oily residue is dissolved in 320 parts diisopropylether and stirred. After cooling to 0° C., the formed precipitate is filtered off, yielding crude 1-benzyl-4-cyano - 4 - N-(3-methylanilino)-piperidine. This crop is purified by recrystallization from diisopropylether, yielding pure 1-benzyl-4-cyano-4-N-(3-methylanilino)-piperidine, melting point 95.5–97° C., as colorless shiny crystals.

*Example LXVII*

A solution of 41 parts potassium cyanide in 75 parts water is added dropwise to a stirred mixture of 96 parts 1-benzyl-4-oxo-piperidine, 69 parts 3-methoxy-aniline and 250 parts glacial acetic acid, while maintaining a temperature of 30° to 36° C. After the addition is complete, the whole is stirred at room temperature for forty-eight hours. The reaction mixture is poured into 750 parts crushed ice. The whole is alkalized with 600 parts ammonium hydroxide and extracted with chloroform. The organic layer is dried over potassium carbonate and evaporated. The oily residue is dissolved in 320 parts diisopropylether. On stirring this solution, a solid is precipitated. After cooling to 0° C., 1-benzyl-4-cyano-4-N-(3-methoxy-anilino)-piperidine is obtained, melting point 97–98° C., as a white flaky powder.

*Example LXVIII*

134.4 parts 1-benzyl-4-cyano-4-N-(3-methyl-anilino)-piperidine are added portionwise to 915 parts concentrated sulfuric acid in three-quarters of an hour. The temperature rises to 70° C. Stirring is prolonged for two hours until complete solution is effected. The solution is added dropwise to a mixture of 1000 parts ice and 1300 parts ammonia, with stirring and cooling in an ice bath. The alkaline mixture is extracted with 3 x 200 parts chloroform, the chloroform solutions dried over potassium carbonate, concentrated under reduced pressure on a water bath to a volume of about 400 ml. The precipitate is filtered off with suction to yield, after drying, a first crop of 1-benzyl-4-carbamoyl-4-N-(3-methyl-anilino)-piperidine, melting point 115.4–122° C. A second crop of less pure 1-benzyl-4-carbamoyl-4-N-(3-methyl-anilino)-piperidine, melting point 111–113.2° C. is obtained by concentrating the filtrate of the first crop to dryness under reduced pressure on the water bath.

*Example LXIX*

95 parts 1-benzyl-4-oxo-piperidine, 61.5 parts 4-methyl-aniline and 260 parts glacial acetic acid are stirred together until complete solution is effected. Then 40.5 parts potassium cyanide in 100 parts water are added dropwise at 40° C. The mixture is stirred for seventy-two hours at room temperature and poured into a mixture of 650 parts concentrated ammonia and 500 parts ice. Extraction with 3 x 200 parts chloroform, drying of the collective chloroform solutions over 20 parts potassium carbonate, filtration and evaporation of the solvent under reduced pressure on the water bath yields a residue, from which, after recrystallization from 150 parts diisopropylether, 1-benzyl-4-cyano-4-N-(4-methyl-anilino)-piperidine, melting point 112–115° C. is obtained as white soft crystals.

*Example LXX*

80 parts 1-benzyl-4-cyano-4-N-(4-methyl-anilino)-piperidine and 450 parts sulfuric acid 90% are mixed with stirring. The temperature rises quickly to 75° C. The mixture is allowed to cool slowly to room temperature, poured into excess ammoniacal ice water and extracted with 3 x 100 parts chloroform. The organic layers are collectively dried over 30 parts potassium carbonate, filtered and the solvent is evaporated under reduced pressure on the water bath. The solid residue is filtered on a Büchner filter, washed with 3 x 100 parts diisopropylether and dried, yielding 1-benzyl-4-carbamoyl-4-N-(4-methyl-anilino)-piperidine, melting point 166–167.5° C., as a white amorphous powder.

*Example LXXI*

A mixture of 95 parts 1-benzyl-4-oxo-piperidine, 61.5 parts 4-chloro-aniline and 260 parts acetic acid are stirred together until complete solution is effected. 40.5 parts 4-chloro-aniline are dissolved in 100 parts water and this solution is added dropwise to the acetic acid solution, an exothermic reaction ensuing. After complete addition, stirring is continued for forty-eight hours. The reaction mixture is poured into 500 parts ice and excess ammonia. Extraction with 3 x 150 parts chloroform, drying over 20 parts potassium carbonate, filtration and evaporation of the solvent under reduced pressure on the water bath yields a solid residue, which, after washing with 100 parts diisopropylether and drying, yields 1-benzyl-4-cyano-4-N-(4-chloro-anilino)-piperidine, melting point 157–159° C., as a white granular powder.

*Example LXXII*

96 parts 1-benzyl-4-oxo-piperidine, 60 parts 2-methyl-aniline and 260 parts glacial acetic acid are mixed while being stirred and cooled. A solution of 41 parts potassium cyanide in 70 parts water is added dropwise. An exothermic reaction raises the temperature of the mixture from 25° C. to 38° C. Stirring is continued for forty-eight hours after complete addition, after which time the reaction mixture is poured into excess ammonia and ice. The reaction product is extracted with 3 x 100 parts chloroform and the combined extracts dried over 30 parts potassium carbonate, filtered and evaporated under reduced pressure on a boiling water bath. The resulting oily residue is poured into 240 parts diisopropylether. On cooling at 0° C. for two hours, a crystalline precipitate separates. These crystals filtered off and dried, yielding 1-benzyl-4-cyano-4-N-(2 - methyl-anilino) - piperidine, melting point 117–120° C., as a grey crystalline powder.

Example LXXIII 95 parts 1-benzyl-4-oxo-piperidine, 50 parts cyclohexylamine, 50 parts concentrated hydrochloric acid, 65 parts ethanol and 60 parts water are mixed while being stirred and cooled. Then a solution of 32.5 parts potassium cyanide in 40 parts water is added dropwise. Stirring is continued overnight. Then 200 parts water are added and the reaction mixture is extracted with 3 x 80 parts chloroform. The combined extracts are dried over 25 parts sodium sulfate, filtered and evaporated. The residue is dissolved in 280 parts diisopropylether. Crystallization follows practically immediately at room temperature, to yield 1-benzyl-4-cyano-4-N-cyclohexylaminopiperidine, melting point 82–83° C., as white glistening crystals.

A second crop of 1-benzyl-4-cyano-4-N-cyclohexylaminopiperidine, melting point 76–79° C., is obtained after further keeping the mother liquor at room temperature. Also a third and a fourth crop are obtained having, respectively, melting point 78–79° C. and melting point 73.4–74.8° C.

Example LXXIV 20 parts 1-benzyl-4-cyano-4-N-cyclohexylamino-piperidine are added portionwise to 110 parts sulfuric acid 90% in fifteen minutes. The temperature rises to 80° C. Stirring is prolonged for one hour until complete solution is effected. The mixture is allowed to cool to room temperature, poured into excess ammoniacal ice water and extracted with 3 x 75 parts chloroform. The combined organic layers are dried over 15 parts potassium carbonate, filtered and the solvent is evaporated under reduced pressure on the water bath. The solid residue is washed with 3 x 50 parts diisopropylether, filtered and dried to yield 1 - benzyl-4-carbamoyl-4-N-cyclohexylaminopiperidine, melting point 138.8–139.6° C., as a white amorphous powder.

A second crop of 1-benzyl-4-carbamoyl-4-N-cyclohexylaminopiperidine is obtained by further crystallization of the mother liquor at room temperature, melting point 147–148° C.

Example LXXV 58 parts 1-benzyl - 4 - N - (4-chloro-anilino)-4-cyanopiperidine are added portionwise to 276 parts sulfuric acid 90% (exothermic reaction). After the addition is complete, the whole is heated to 70° C. for ten minutes. Then the whole is slowly cooled to room temperature, in the course of about one hour. The reaction mixture is poured into an excess ammoniacal ice water and the whole is extracted with chloroform. The chloroform-extract is separated, dried, filtered and evaporated. The solid residue is stirred in diisopropylether, filtered off again and dried, to yield 1-benzyl-4-carbamoyl-4-N-(4-chloroanilino)-piperidine, melting point 172–173° C., as a white granular powder.

Example LXXVI

To 400 parts sulfuric acid 98% are added portionwise, in the course of twenty minutes, 64 parts 1-benzyl-4-cyano-4-N-(3-methoxy-anilino)-piperidine, while stirring (exothermic reaction: the temperature rises from 20° to 60° C.). Stirring is continued for ten minutes at 70° C., whereupon the reaction mixture is cooled to room temperature, while stirring, in the course of two hours. The whole is poured into 750 parts ammonium hydroxide and 750 parts crushed ice. The mixture is extracted with chloroform. The organic layer is dried over potassium carbonate and then evaporated. The oily residue is dissolved in 160 parts toluene. After cooling to 0° C., 1-benzyl - 4 - carbamoyl - 4 - N - (3 - methoxy - anilino)-piperidine is filtered off, melting point 130–131° C.

Example LXXVII

To 375 parts sulfuric acid 98% are added portionwise 47 parts 1-benzyl-4-cyano-4-N-(2-methyl-anilino)-piperidine, in the course of thirty minutes, while stirring. After the addition is complete, the whole is stirred first at room temperature for fifteen minutes while cooling (exothermic reaction: temperature rises from 15° to 43° C.), and then at a temperature of 70° C. for fifteen minutes. After cooling to room temperature, the mixture is poured into a mixture of 1000 parts ammonium hydroxide and 1000 parts crushed ice. The whole is extracted with 2000 parts chloroform. The organic layer is separated, dried over potassium carbonate and evaporated. On treating the oily residue with 240 parts diisopropylether, a precipitate is formed. After cooling overnight at 0° C., 1-benzyl-4-carbamoyl-4-N-(2-methyl-anilino) - piperidine is filtered off, melting point 126–128° C.

Example LXXVIII

To a stirred mixture of 95 parts 1-benzyl-4-oxo-piperidine, 36.5 parts n-butylamine and 48 parts ethanol are added dropwise 50 parts concentrated hydrochloric acid at a temperature below 20° C. (ice bath). After the addition is complete, there is added dropwise a solution of 33.1 parts potassium cyanide in 120 parts water, while maintaining this temperature. After the addition is complete, the whole is stirred for thirty-six hours at room temperature. Then there are added 200 parts water and the whole is extracted with chloroform. The organic layer is washed with 500 parts water, dried over sodium sulfate, filtered and evaporated. The residue is dissolved in a mixture of 80 parts ether and 560 parts petroleum ether. After cooling for two days at −15° C., crude 1-benzyl-4-cyano-4-N-(butylamino)-piperidine is filtered off.

On further keeping the mother liquor at room temperature for two days a second crop and a third crop of the final product are obtained, having, respectively, melting point 75–77° C., as white crystals and melting point 69.9–78.2° C.

Example LXXIX

To 108 parts sulfuric acid 98% are added portionwise 20 parts 1-benzyl-4-cyano-4-N-(butylamino)-piperidine, in the course of two minutes, while stirring (exothermic reaction: temperature rises to 60° C.). After the addition is complete, the whole is heated at 80° C. for one hour while stirring and then cooled to room temperature. The reaction mixture is poured into ice and ammonium hydroxide. An oil is precipitated. The whole is extracted with chloroform. The organic layer is dried over potassium carbonate, filtered and evaporated. The residue is dissolved in 40 parts diisopropylether. After cooling overnight at −15° C., crude 1-benzyl-4-carbamoyl-4-N-(butylamino)-piperidine is obtained. A sample of 3 parts is recrystallized from 24 parts isopropanol. After cooling overnight at −15° C., 1-benzyl-4-carbamoyl-4-N-(butylamino)-piperidine is filtered off, melting point 114–118° C., as a white amorphous powder.

Example LXXX

A mixture of 950 parts 1-benzyl-4-oxo-piperidine, 694 parts 4-methoxy-aniline and 2500 parts glacial acetic acid is cooled to 25° C. Then there are added dropwise 405 parts potassium cyanide in 800 parts water. After the addition is complete, the whole is stirred for forty-eight hours at room temperature. The reaction mixture is poured into a mixture of 5000 parts crushed ice and 5000 parts ammonium hydroxide. The whole is extracted with 11,000 parts chloroform. The organic layer is separated, dried and evaporated. The residue is recrystallized from ether to yield 1-benzyl-4-cyano-4-N-(4-methoxy-anilino)-piperidine, melting point 110–117° C.

Example LXXXI

To 4860 parts sulfuric acid 98% are added portionwise 1020 parts 1-benzyl-4-cyano-4-N-(4-methoxyanilino)-piperidine (exothermic reaction: temperature rises to 80° C.). After the addition is complete, the reaction mixture is cooled to 60° C., then poured into a mixture of 12,000 parts crushed ice to which 14,000 parts ammonium hydroxide are added. The whole is extracted with chloroform while hot. The organic layer is separated, dried over sodium sulfate, filtered and evaporated. The oily residue is poured into 800 parts diisopropylether. The precipitated solid is filtered off and triturated in diisopropylether, to yield 1-benzyl-4-carbamoyl-4-N-(4-methoxyanilino)-piperidine, melting point 131–134° C.

Example LXXXII

To a mixture of 95 parts 1-benzyl-4-oxo-piperidine and 48 parts denaturated ethanol are added portionwise 22.5 parts ethylamine, at a temperature below 20° C. (cooling with an ice bath). While maintaining this temperature, there are added first 50 parts concentrated hydrochloric acid, followed by 33.1 parts potassium cyanide and 120 parts water. After the addition is complete, the whole is stirred for five days at room temperature. The reaction mixture is poured into 400 parts water. The whole is extracted with chloroform. The organic layer is washed with 1000 parts water, dried over potassium carbonate, filtered and evaporated. The oily residue is dissolved in 240 parts petroleum ether. After cooling for twenty-four hours at —15° C., crude 1-benzyl-4-cyano-4-N-(ethylamino)-piperidine is obtained. This crop is recrystallized from 40 parts ether. After cooling to 0° C., 1-benzyl-4-cyano-4-N-(ethylamino)-piperidine is obtained, melting point 55–56° C., as shiny crystals.

Example LXXXIII

To a mixture of 95 parts 1-benzyl-4-oxo-piperidine and 48 parts denaturated ethanol are added portionwise 53 parts isopropylamine hydrochloride, at a temperature below 20° C. (cooling with ice bath). While maintaining this temperature, there are added 33.1 parts potassium cyanide in 120 parts water. After the addition is complete, the whole is stirred at room temperature. After about fifteen minutes a solid mass is obtained. Then there are added 48 parts ethanol and 120 parts water. After further stirring overnight at room temperature, the reaction mixture is diluted with 200 parts water. The whole is extracted with chloroform. The organic layer is separated, washed with 1000 parts water, dried over sodium sulfate, filtered and evaporated. The residue is dissolved in 400 parts petroleum ether. After keeping overnight at room temperature, crude 1-benzyl-4-cyano-4-N-(2-propylamino)-piperidine is obtained. This crop is recrystallized from 48 parts ether. After cooling to 0° C., 1-benzyl-4-cyano-4-N-(2-propylamino)-piperidine is filtered off, melting point 64–67° C., as a white amorphous powder.

On keeping the first mother liquor for two days at room temperature, a second fraction of less pure 1-benzyl-4-cyano-4-N-(2-propylamino)-piperidine is obtained, melting point 59–64° C.

Example LXXXIV 66 parts 1-benzyl-4-cyano-4-N-(ethylamino)-piperidine are added portionwise to 432 parts sulfuric acid 98% (exothermic reaction: temperature rises from 16° to 81° C.). After the addition is complete, the whole is stirred for one hour. The reaction mixture is poured into a mixture of crushed ice and ammonium hydroxide. The whole is extracted with chloroform. The organic layer is separated, dried over potassium carbonate, filtered and evaporated under reduced pressure. The residue is triturated in ether, yielding 1-benzyl-4-carbamoyl-4-N-(ethylamino)-piperidine, melting point 113.6–115.4° C.

On recrystallization of a sample of this crop from a mixture of 24 parts ether and 40 parts ethanol, the compound has a melting point of 115.2–119.2° C., as white crystals.

Example LXXXV 64 parts 1-benzyl-4-cyano-4-N-(2-propylamino)-piperidine are added portionwise to 434 parts sulfuric acid 98%, while stirring (exothermic reaction: temperature rises from 18° to 79° C.). After the addition is complete, the whole is stirred for one hour. The reaction mixture is poured into a mixture of crushed ice and ammonium hydroxide. The whole is extracted with chloroform. The organic layer is dried over potassium carbonate, filtered and the filtrate is evaporated, yielding 52 parts crude product. This crop is recrystallized from a mixture of 24 parts ether and 40 parts ethanol. After cooling for two days to —15° C., 1-benzyl-4-carbamoyl-4-N-(2-propylamino)-piperidine is obtained, melting point 117.8–120.4° C., as white shiny crystals.

Example LXXXVI

To a stirred mixture of 95 parts 1-benzyl-4-oxo-piperidine, 29.5 parts propyl amine and 48 parts denaturated ethanol are added dropwise 50 parts concentrated hydrochloric acid at a temperature below 20° C. After the addition is complete and while keeping the temperature below 20° C., there is added dropwise a solution of 33.1 parts potassium cyanide in 120 parts water. After the addition is complete, the whole is stirred for three days at room temperature. The reaction mixture is poured into 200 parts water and then extracted with chloroform. The organic layer is washed with water, dried over potassium carbonate, filtered and evaporated. An oily residue of crude 1-benzyl-4-cyano-4-N-(propylamino)-piperidine is obtained. It is used without further purification for preparing 1-benzyl-4-carbamoyl-4-N-(propylamino)-piperidine.

Example LXXXVII

To 165 parts sulfuric acid 98% are added 25.7 parts 1-benzyl-4-cyano-4-N-(propylamino)-piperidine while stirring (exothermic reaction: temperature rises from 18° to 82° C.). The whole is stirred for one hour (temperature falls to 26° C.). The reaction mixture is poured into a mixture of crushed ice and ammonium hydroxide. The whole is extracted with chloroform. The organic layer is separated, dried over potassium carbonate, filtered and evaporated under reduced pressure. The residue is dissolved in ether. After keeping at room temperature, 1-benzyl-4-carbamoyl-4-N-(propylamino)-piperidine is filtered off, melting point 128–131° C., as a white crystalline powder.

Example LXXXVIII

A mixture of 6.2 parts 1-benzyl-4-carbamoyl-4-N-anilino-piperidine, 3.1 parts acetic acid anhydride and 40 parts anhydrous toluene is stirred and refluxed for sixteen hours. After cooling the reaction mixture is decomposed with water, followed by addition of ammonium hydroxide. The aqueous layer is separated and extracted once more with toluene. The combined organic layers are dried over potassium carbonate and evaporated. The oily residue is dissolved in 200 parts diethylether. This solution is filtered several times, until clear and then hydrogen chloride gas is introduced into the filtrate. The precipitated hydrochloride is filtered off and stirred in a warm mixture of acetone and isopropanol. The undissolved part is filtered off, yielding 1.5 parts product. From this crop the free base is liberated in the usual manner. After extraction with benzene, the organic layer is dried and evaporated. The residue is washed with ether and dried, yielding 1-phenyl-2-methyl-4-oxo-8-benzyl-1,3,8-triazaspiro(4,5)dec-2-ene, melting point 211.5–214.5° C., as a beige, crystalline powder.

Example LXXXIX

A mixture of 9.8 parts 1-benzyl-4-carbamoyl-4-N-methylaminopiperidine and 60 parts triethoxy-methane is refluxed for eighteen hours with stirring. The reaction mixture is evaporated to dryness under reduced pressure on the water bath and the residue taken up in 90 parts boiling ethyl acetate. The precipitate is filtered on a Büchner filter and dried to yield 1-methyl-4-oxo-8-benzyl-1,3,8-triaza-spiro(4,5)dec-2-ene, melting point 178–179.5° C., as glistening crystals.

A second crop of less pure 1-methyl-4-oxo-8-benzyl-1,3,8-triaza-spiro(4,5)dec-2-ene is obtained after cooling the mother liquor overnight at −5° C., melting point 175–178.5° C.

Example XC

A mixture of 14.9 parts 1-phenyl-2-methyl-4-oxo-8-benzyl-1,3,8-triaza-spiro(4,5)dec-2-ene and 160 parts ethanol 95% is debenzylated at normal pressure and at a temperature of 37–39° C., in the presence of 5 parts palladium-on-charcoal catalyst 10%. After the calculated amount of hydrogen is taken up, hydrogenation is stopped. The catalyst is filtered off, washed with 2 x 50 parts ethanol and the combined ethanol solutions are evaporated. The solid residue, after washing with 150 parts ether, and drying, yields 1-phenyl-2-methyl-4-oxo-1,3,8-triaza-spiro(4,5)dec-2-ene, melting point 197.4–205° C.

Example XCI

A mixture of 66.7 parts 1-benzyl-4-carbamoyl-4-N-anilinopiperidine, 30 parts triethoxy-methane, 280 parts toluene and 16 parts glacial acetic is stirred and refluxed for thirty-eight hours. After cooling, the reaction mixture is decomposed with 20 parts ammonium hydroxide and 50 parts water. The organic layer is separated, dried over magnesium sulfate and filtered. On standing, a precipitate is formed, which is filtered off and dried, yielding 4 parts of "1-benzyl-4-carbamoyl-4-N-anilinopiperidine." The mother liquor is concentrated to a volume of about 120 parts. After keeping at room temperature, 45 parts crude product are obtained. This crop is dissolved in 48 parts toluene. After cooling to room temperature, 1-phenyl-4-oxo-8-benzyl-1,3,8-triaza-spiro(4,5)dec-2-ene is obtained, melting point 171.2–173.2° C., as yellow shiny crystals.

Example XCII

A mixture of 15 parts 1-benzyl-4-carbamoyl-4-N-cyclohexylamino-piperidine, 15 parts triethoxymethane, 120 parts toluene and 4 parts glacial acetic acid is stirred and refluxed for forty-two hours. After cooling the reaction mixture is evaporated. The residue is dissolved in water. The aqueous solution is alkalinized with ammonium hydroxide and extracted with chloroform. The organic layer is dried over sodium sulfate and evaporated. The residue is recrystallized twice from ethyl acetate, to yield 1-cyclohexyl-4-oxo-8-benzyl-1,3,8-triaza-spiro(4,5)dec-2-ene, melting point 209–211.4° C.

Example XCIII

A mixture of 9 parts 1-benzyl-4-carbamoyl-4-N-cyclohexylamino-piperidine, 18 parts formamide and 5.4 parts sulfuric acid 98% is heated for three hours at 200° C. After cooling the reaction mixture is poured into water. The aqueous solution is alkalinized with ammonium hydroxide and the whole is extracted with chloroform. The organic layer is dried over sodium sulfate and evaporated. The residue is recrystallized from ethyl acetate to yield the crude product. This crop is crystallized from 24 parts ethyl acetate, yielding 1-cyclohexyl-4-oxo-8-benzyl-1,3,8-triaza-spiro(4,5)dec-2-ene, melting point 208.2–210.8° C.

Example XCIV

A mixture of 27.5 parts 1-benzyl-4-carbamoyl-4-N-(2-propylamino)-piperidine, 55 parts triethoxymethane, 80 parts toluene and 10 parts glacial acetic acid is stirred and refluxed for two days. After cooling the reaction mixture is evaporated. The oily residue is alkalinized with sodium hydroxide and then extracted with chloroform. The organic layer is separated, dried over potassium carbonate, filtered and evaporated. The residue is boiled in ethyl acetate. After cooling for one hour at 0° C., 1-(2-propyl)-4-oxo - 8 - benzyl-1,3,8-triaza-spiro (4,5)dec-2-ene is filtered off, melting point 192.6–194° C., as white crystals.

Example XCVI

A mixture of 20 parts 1-phenyl-4-oxo-8-benzyl-1,3,8-triaza-spiro(4,5)decane, 200 parts methanol, 40 parts isopropanol and 7 parts concentrated hydrochloric acid is debenzylated at normal pressure and at a temperature of 38° to 40° C., in the presence of 10 parts palladium-on-charcoal catalyst. After the calculated amount of hydrogen is taken up, hydrogenation is stopped. The catalyst is filtered off and the solvent is evaporated. The residue is dissolved in water. This aqueous solution is alkalinized with ammonium hydroxide and extracted with chloroform. The organic layer is dried over magnesium sulfate, filtered and evaporated. The solid residue is washed with ether, filtered off and dried, yielding 1-phenyl-4-oxo-1,3,8-triaza-spiro(4,5)decane, melting point 168–176° C.

Example XCVII

A mixture of 18 parts 1-methyl-4-oxo-8-benzyl-1,3,8-triaza-spiro(4,5)dec-2-ene, 40 parts 2-propanol, 200 parts methanol and 7 parts hydrochloric acid 35% is debenzylated at normal pressure and at a temperature of 27° C., in the presence of 10 parts palladium-on-charcoal catalyst. After the calculated amount of hydrogen is taken up, hydrogenation is stopped. The charcoal is filtered off and the filtrate is evaporated. The residue is recrystallized from boiling acetone, the formed precipitate is filtered off again and dried, yielding 13 parts product. This crop is boiled once more in 240 parts 2-propanol, filtered and dried, yielding 1-methyl-4-oxo-1,3,8-triaza-spiro(4,5)decane-hydrochloride, melting point 200–203° C., as a white amorphous powder.

On keeping the mother liquor at room temperature, a second less pure crop of 1-methyl-4-oxo-1,3,8-triaza-spiro(4,5)decane-hydrochloride is filtered off, melting point 185–191° C.

Example XCVIII

A mixture of 35 parts 1-(4-methyl-phenyl)-4-oxo-8-benzyl-1,3,8-triaza-spiro(4,5)decane, 320 parts methanol and 20 parts concentrated hydrochloric acid is debenzylated at normal pressure and at a temperature of about 50° C., in the presence of 10 parts palladium-on-charcoal catalyst. After the calculated amount of hydrogen is taken up, hydrogenation is stopped. The charcoal is filtered off and the filtrate is evaporated. The solid residue is dissolved in water. The aqueous solution is alkalinized with ammonium hydroxide and extracted with warm chloroform. The organic layer is separated, dried, filtered and evaporated. The solid residue is stirred in diethyl-ether, filtered off again and dried, yielding 1-(4-methylphenyl)-4-oxo-1,3,8-triaza-spiro(4,5)decane, melting point 190–191.4° C., as a pale-grey, amorphous powder.

Example XCIX

A mixture of 24 parts 1-(3-methyl-phenyl)-4-oxo-8-benzyl-1,3,8-triaza-spiro(4,5)decane, 320 parts methanol and 20 parts concentrated hydrochloric acid is debenzylated at normal pressure and at a temperature of about 50° C., in the presence of 10 parts palladium-on-charcoal catalyst. After the calculated amount of hydrogen is taken up, hydrogenation is stopped. The catalyst is filtered off and extracted with boiling water. The combined filtrates are evaporated and to the solid residues is added a small volume of ammonium hydroxide and the mixture is extracted with chloroform. The organic layer is separated, dried, filtered and evaporated. The solid residue is stirred in diisopropylether, filtered off and dried, yielding 1-(3-methyl-phenyl)-4-oxo-1,3,8-triaza-spiro(4,5) decane, melting point 189.8–190.8° C.

*Example C*

A mixture of 19.7 parts 1-(4-methoxy-phenyl)-4-oxo-8-benzyl-1,3,8-triaza-spiro(4,5)decane, 200 parts hydrogen and 20 parts denaturated ethanol is debenzylated at normal pressure and at a temperature of about 40° C., in the presence of 7 parts palladium-on-charcoal-catalyst. After the calculated amount of hydrogen is taken up, hydrogenation is stopped. Then 200 parts water are added. The catalyst is filtered off and the filtrate is concentrated under diminished pressure. The residue is alkalinized with ammonium hydroxide. The whole is extracted with about 1500 parts chloroform. The organic layer is dried over potassium carbonate and concentrated to a volume of about 60 parts. During this evaporation a solid is precipitated. It is filtered off and dried to yield 1-(4-methoxy-phenyl) - 4 - oxo-1,3,8-triaza-spiro(4,5)decane, melting point 195–196° C., as a white micro-crystalline powder.

*Example CI*

A mixture of 22 parts 1-cyclohexyl-4-oxo-8-benzyl-1,3,8-triaza-spiro(4,5)dec-2-ene, 160 parts methanol, 245 parts 2-propanol and 7 parts concentrated hydrochloric acid is hydrogenated at normal pressure and at room temperature, in the presence of 15 parts palladium-on-charcoal catalyst 10%. After the calculated amount of hydrogen (2 moles) is taken up, hydrogenation is stopped. The catalyst is filtered off. After keeping the filtrate at room temperature, a solid is precipitated. It is filtered and dried, to yield crude 1-cyclohexyl-4-oxo-1,3,8-triaza-spiro(4,5)decane-dihydrochloride, melting point 205–220° C.

*Example CII*

A mixture of 9 parts 1-phenyl-2-methyl-4-oxo-1,3,8-triaza-spiro(4,5)dec-2-ene and 80 parts methanol is hydrogenated at normal pressure and at a temperature of about 37° C., in the presence of 0.2 parts platinum oxide as catalyst (Adams catalyst). After the calculated amount of hydrogen is taken up, hydrogenation is stopped. The catalyst is filtered off. After cooling the filtrate to 0° C., dl - 1-phenyl-2-methyl-4-oxo-1,3,8-triaza-spiro(4,5)decane is filtered off, melting point 196.2–199.2° C.

The mother liquor is concentrated to a volume of about 30 parts, whereupon a solid is precipitated. The whole is diluted with 40 parts 2-propanol. The product is filtered off, yielding a second fraction of dl-1-phenyl-2-methyl-4-oxo-1,3,8-triaza-spiro(4,5)decane, melting point 196–197.5° C.

*Example CIII*

A mixture of 13 parts 1-phenyl-3-methyl-4-oxo-8-benzyl-1,3,8-triaza-spiro(4,5)decane, 80 parts methanol and 24 parts 2-propanol is debenzylated at normal pressure and at a temperature of about 35° C., in the presence of 4 parts palladium-on-charcoal catalyst. After the calculated amount of hydrogen is taken up, hydrogenation is stopped. The catalyst is filtered off and the filtrate is evaporated. The oily residue is dissolved in 56 parts ethyl acetate, whereupon a solid fraction is obtained. This is filtered off, yielding 1 part of crude free base of 1-phenyl - 3-methyl-4-oxo-1,3,8-triaza-spiro(4,5)decane-hydrochloride. The filtrate is diluted with 80 parts diethyl-ether and gaseous hydrogen chloride is filtered off and dissolved in 48 parts 2-propanol. The undissolved part is filtered off, yielding 1-phenyl-3-methyl-4-oxo-1,3,8-triaza-spiro(4,5)decane-hydrochloride, melting point 205–209° C., as a white microcrystalline powder.

*Example CIV*

A mixture of 20 parts 1-(2-propyl)-4-oxo-8-benzyl-1,3,8-triaza-spiro(4,5)dec-2-ene, 160 parts 2-propanol, 200 parts distilled water and 15 parts concentrated hydrochloric acid is hydrogenated at normal pressure and at a temperature of about 30° C., in the presence of 7 parts palladium-on-charcoal catalyst 10%. After the calculated amount of hydrogen is taken up, hydrogenation is stopped. The catalyst is filtered off and the filtrate is evaporated. The residue is alkalized with sodium hydroxide and extracted with chloroform. The organic layer is dried, filtered and evaporated, yielding 1-(2-propyl)-4-oxo-1,3,8-triaza-spiro(4,5)decane, melting point 158–161° C.

*Example CV*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 3.25 parts 2-bromo-propane in 24 parts 4-methyl-2-pentanone. After the addition is complete, the whole is stirred and refluxed for fifty-five hours. After cooling 150 parts water are added. The aqueous layer is separated and extracted once more with 4-methyl-2-pentanone. The combined organic phases are dried over potassium carbonate and evaporated. The solid residue is stirred in 80 parts diisopropylether and recrystallized twice from 80 parts and 24 parts respectively 4-methyl-2-pentanone. After cooling to −20° C., 1-phenyl-4-oxo-8-(2-propyl)-1,3,8-triaza-spiro(4,5)decane is obtained, melting point 185–190° C., as a beige granular powder.

*Example CVI*

To a stirred mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 3.6 parts 1-bromo-butane in 24 parts 4-methyl-2-pentanone. After the addition is complete, the whole is stirred and refluxed for fifty hours. After cooling 150 parts water are added. The aqueous layer is separated and extracted once more with 40 parts 4-methyl-2-pentanone. The combined organic layers are dried over potassium carbonate and evaporated. The solid residue is stirred in 80 parts diisopropylether and the precipitate is filtered off. It is recrystallized from 40 parts 4-methyl-2-pentanone. After cooling to 0° C., the crude product is filtered off. The mother liquor is evaporated. The residue is dissolved in a mixture of 24 parts ether and 32 parts toluene. After cooling overnight at 0° C., a second crop of the crude product is obtained. These combined fractions are recrystallized from 20 parts 4-methyl-2-pentanone, to yield 1-phenyl-4-oxo - 8 - butyl-1,3,8-triaza-spiro(4,5)decane, melting point 178.6–180° C.

*Example CVII*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 4 parts of 1-bromo-pentane in 24 parts 4-methyl-2-pentanone. After the addition is complete, the whole is stirred and refluxed for forty-eight hours. After cooling the reaction mixture is treated with 150 parts water. The remaining precipitate is filtered off and dried in vacuo, yielding 1-phenyl-4-oxo-8-pentyl-1,3,8 - triaza - spiro(4,5) decane, melting point 189.8–190.8° C.

*Example CVIII*

To a stirred mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 4.7 parts 1-bromo-heptane in 24 parts 4-methyl-2-pentanone. After the addition is complete, the whole is stirred and refluxed for forty-eight hours. After cooling the reaction mixture, 150 parts water are added. The precipitated solid is filtered off, yielding 1-phenyl-4-oxo-8-heptyl-1,3,8-triaza-spiro(4,5)decane, melting point 165–166.6° C.

Example CIX

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5.1 parts 1-bromo-octane in 24 parts 4-methyl-2-pentanone. After the addition is complete, the whole is stirred and refluxed for fifty-five hours. After cooling the reaction mixture, there are added 150 parts water. The remaining precipitate is filtered off and dried, yielding less pure 1-phenyl-4-oxo-8-octyl-1,3,8-triaza-spiro(4,5)decane, melting point 167.6–168.2° C.

From the mother liquor the organic layer is separated, dried over potassium carbonate and concentrated to a volume of 70 parts. The residue is kept for two hours at room temperature, whereupon a second fraction of 1-phenyl-4-oxo-8-octyl-1,3,8-triaza-spiro(4,5)decane is obtained, melting point 167–168° C.

Example CX

To a stirred mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5.5 parts 1-bromo-nonane in 24 parts 4-methyl-2-pentanone. After the addition is complete, the whole is stirred and refluxed for fifty-five hours. After cooling the reaction mixture is treated with 150 parts water. The remaining precipitate is filtered off and dried, yielding less pure 1-phenyl-4-oxo-8-nonyl-1,3,8-triaza-spiro(4,5)decane, melting point 169–170° C.

This crop is purified by recrystallization from 32 parts 4-methyl-2-pentanone. After cooling for 2 hours at room temperature, a second fraction of 1-phenyl-4-oxo-8-nonyl-1,3,8-triaza-spiro(4,5)-decane is filtered off, melting point 169.5–170° C.

Example CXI

A mixture of 4.6 parts 2-(bromomethyl)-1,4-benzodiaxane, 3.5 parts 1-(2-propyl)-4-oxo-1,3,8-triaza-spiro(4,5)decane dihydrochloride, 6.36 parts sodium carbonate, a few crystals of potassium iodide in 160 parts 4-methyl-2-pentanone is stirred and refluxed for forty-eight hours. After cooling the reaction mixture, there are added 100 parts water. The organic layer is separated, dried over potassium carbonate, filtered and evaporated. The residue is recrystallized from 80 parts ether, to yield dl-1-(2-propyl)-4-oxo-8-[2-(1,4-benzodioxanyl)-methyl]-1,3,8-triaza-spiro(4,5)decane, melting point 156–157° C.

Example CXII

To a stirred and refluxing mixture of 4 parts 1-butyl-4-oxo-1,3,8-triaza-spiro(4,5)decane, 3.2 parts sodium carbonate, a few crystals of potassium iodide in 160 parts 4-methyl-2-pentanone is added dropwise a solution of 5.1 parts 2-(bromomethyl)-1,4-benzodioxane in 40 parts 4-methyl-2-pentanone. After the addition is complete, the whole is stirred and refluxed for sixty hours. After cooling 50 parts water are added. The organic layer is separated, dried over potassium carbonate, filtered and evaporated. The oily residue is dissolved in a mixture of 80 parts acetone and 160 parts diisopropylether. This solution is filtered and gaseous hydrogen chloride is introduced into the filtrate. The solid hydrochloride is filtered off and dried, yielding the crude product. This crop is boiled in a mixture of 40 parts 2-propanol and 40 parts acetone. The undissolved part is filtered off and dried, yielding a first fraction of dl-1-butyl-4-oxo-8-[2-(1,4-benzodioxanyl)-methyl]-1,3,8-triaza-spiro(4,5)decane dihydrochloride hydrate, melting point 178.5–184° C.

After cooling the mother liquor for five hours at −20° C., a second fraction of dl-1-butyl-4-oxo-8-[2-(1,4-benzodioxanyl)-methyl]-1,3,8-triaza-spiro(4,5)decane dihydrochloride hydrate is obtained, melting point 185–188° C.

Example CXIII

To a refluxing solution of 3 parts 1-phenyl-4-oxo-8-[2-(1,4-benzodioxanyl)-methyl]-1,3,8-triaza-spiro(4,5)decane in 400 parts 4-methyl-2-pentanone is added a solution of 0.7 part hydrochloric acid in 40 parts 4-methyl-2-pentanone. After cooling the reaction mixture is poured into a beaker and kept for two days at room temperature. The formed precipitate is filtered off and dried at 110° C. in vacuo, yielding dl-1-phenyl-4-oxo-8-[2-(1,4-benzodioxanyl)-methyl]-1,3,8-triaza-spiro(4,5)decane hydrochloride, melting point 247.5–249° C.

Example CXIV

A mixture of 6.8 parts 7-bromo-2-(bromomethyl)-1,4-benzodioxane, 4.6 parts 1-phenyl-4-oxo-1,3,8-triaza-spiro-(4,5)decane, 3.2 parts sodium carbonate, a few crystals of potassium iodide in 200 parts 4-methyl-2-pentanone is stirred and refluxed for 60 hours. After cooling the reaction mixture, there are added 50 parts water. The organic layer is separated, dried over potassium carbonate and evaporated. The solid residue is triturated in 16 parts acetone, filtered off again and dried, to yield the crude product. This crop is recrystallized from 90 parts boiling acetone. After cooling to room temperature, the formed precipitate is filtered off, to yield dl-1-phenyl-4-oxo-8-[2-(7-bromo-1,4-benzodioxanyl)-methyl]-1,3,8-triaza-spiro(4,5)decane, melting point 202–214° C.

On cooling the mother liquor overnight at −20° C., a second fraction of dl-1-phenyl-4-oxo-8-[2-(7-bromo-1,4-benzodioxanyl)-methyl]-1,3,8-triaza-spiro(4,5)decane is filtered off, melting point 199–208° C.

Example CXV

To a stirred mixture of 4.6 parts 1-phenyl-4-oxo-1,3,8-triaza-spiro(4,5)decane, 3.2 parts sodium carbonate, a few crystals of potassium iodide in 160 parts 4-methyl-2-pentanone is added dropwise a solution of 4.8 parts 2-(3-chloropropyl)-1,4-benzodioxane in 40 parts 4-methyl-2-pentanone. After the addition is complete, the whole is stirred and refluxed for sixty-five hours. After cooling the reaction mixture, there are added 50 parts water. The organic layer is separated, dried over potassium carbonate, filtered and evaporated. The solid residue is triturated in diisopropylether, filtered off and dried, to yield the crude product. This crop is recrystallized from 60 parts acetone, yielding dl-1-phenyl-4-oxo-8-{3-[2-(1,4-benzodioxanyl)]propyl}-1,3,8-triaza-spiro(4,5)decane, melting point 188–193.6° C.

Example CXVI

To a stirred mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5.2 parts 1-bromo-1-phenyl-propane in 24 parts 4-methyl-2-pentanone. After the addition is complete, the whole is stirred and refluxed for forty-eight hours. After cooling the reaction mixture is treated with 150 parts water. The remaining precipitate is filtered off and recrystallized from 64 parts 4-methyl-2-pentanone, yielding dl-1-phenyl-4-oxo-8-(1-phenylpropyl)-1,3,8-triaza-spiro(4,5)decane, melting point 198.5–201° C.

Example CXVII

A mixture of 5.17 parts dl-1-bromo-1-(4-methylphenyl)-ethane, 5.1 parts 1-phenyl-4-oxo-1,3,8-triaza-spiro-(4,5)decane, 7 parts sodium carbonate, a few crystals of potassium iodide in 160 parts 4-methyl-2-pentanone is stirred and refluxed for two days. After cooling the reaction mixture, there are added 300 parts water. The organic layer is separated, dried over potassium carbonate, filtered and the filtrate is evaporated. The solid residue is recrystallized from 4-methyl-2-pentanone, yielding dl-1-phenyl- 4 - oxo - 8 - [1 - (4 - methylphenyl) - ethyl] - 1,3,8 - triaza-spiro(4,5)decane, melting point 162–164° C.

*Example CXVIII*

A mixture of 5.5 parts dl-1-bromo-1-(4-methylphenyl)-propane, 5.1 parts 1-phenyl-4-oxo-1,3,8-triaza-spiro(4,5)-decane, 7 parts sodium carbonate, a few crystals of potassium iodide in 160 parts 4-methyl-2-pentanone is stirred and refluxed for two days. After cooling, there are added 300 parts water. The organic layer is separated, dried over potassium carbonate, filtered and evaporated in vacuo. The solid residue is recrystallized from 4-methyl-2-pentanone, yielding the crude product. This crop is recrystallized from diisobutylketone. After drying for two days at 80° C., dl-1-phenyl-4-oxo-8-[1-(4-methylphenyl)-propyl]-1,3,8-triaza-spiro(4,5)decane is obtained, melting point 199–201.5° C.

*Example CXIX*

50 parts 1-(4-fluorophenyl)-ethanol are cooled to 0° C. While maintaining this temperature, it is saturated with gaseous hydrobromic acid. Then it is taken up in ether and water. The etheric layer is separated, dried, filtered and the filtrate is distilled in vacuo, yielding dl-1-bromo-1-(4-fluorophenyl)-ethane, boiling point 86–87° C. at 9 mm. pressure.

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5.3 parts dl-1-bromo-1-(4-fluorophenyl)-ethane in 24 parts 4-methyl-2-pentanone. After the addition is complete, the whole is further stirred and refluxed for forty-eight hours. After cooling 150 parts water are added. The remaining precipitate is filtered off and dried. Then this crop is treated with a mixture of 64 parts 4-methyl-2-pentanone and 32 parts methanol. The insoluble material is filtered off and after cooling the filtrate to room temperature, two fractions are obtained: one less pure dl-1-phenyl-4-oxo-8 - [1 - (4 - fluorophenyl) - ethyl] - 1,3,8 - triaza - spiro-(4,5)decane and a second fraction of pure dl-1-phenyl-4-oxo - 8 - [1 - (4 - fluorophenyl) - ethyl] - 1,3,8 - triaza-spiro(4,5)decane, melting point 232–238° C.

*Example CXX*

133 parts dl-1-(4-fluorophenyl)-propanol are saturated with gaseous hydrobromic acid at a temperature of 0° C. To the obtained solution are added 80 parts ether and 100 parts water. The aqueous layer is separated and extracted once more with ether. The combined etheric extracts are washed successively with water, sodium hydrogen carbonate solution and water; then dried over calcium sulfate, filtered and evaporated. The oily residue is distilled in vacuo, yielding dl-1-bromo-1-(4-fluorophenyl)-propane, boiling at about 84–86° C. at 1 mm. pressure.

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5.7 parts dl-1-bromo-1-(4-fluorophenyl)-propane in 24 parts 4-methyl-2-pentanone. After the addition is complete, the whole is stirred and refluxed for forty-eight hours. After cooling the reaction mixture, there are added 150 parts water. The remaining precipitate is filtered off and recrystallized from 320 parts boiling 4-methyl-2-pentanone. After cooling overnight at room temperature, dl-1-phenyl-4-oxo-8-[1-(4-fluorophenyl)-propyl]-1,3,8-triaza-spiro(4,5)decane is obtained, melting point 232-238° C.

*Example CXXI*

152 parts 1-(4-chlorophenyl)-propanol are cooled to 0° C. Then there are added portionwise 150 parts phosphorous tribromide. After the addition is complete, the temperature is slowly brought to room temperature, whereupon the whole is stirred for two hours at 100° C. The reaction mixture is then poured into 500 parts crushed ice. The mixture is extracted with ether. The extract is washed successively with water, sodium hydrogen carbonate solution and again with water, then dried over calcium chloride, filtered and evaporated. The oily residue is distilled in vacuo, yielding dl-1-bromo-1-(4-chlorophenyl)-propane, boiling at 140–142° C. at 24 mm. pressure, $n_D^{20}$: 1.5650; $d_{20}^{20}$: 1.3782.

A mixture of 6 parts dl-1-bromo-1-(4-chlorophenyl)-propane, 5.1 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for sixty hours. After cooling the reaction mixture, there are added 100 parts water. The organic layer is separated, dried over sodium sulfate, filtered and evaporated. The solid residue is recrystallized from 200 parts 4-methyl-2-pentanone, yielding dl-1 - phenyl - 4-oxo-8-[1-(4-chlorophenyl)-propyl]-1,3,8-triaza-spiro(4,5)decane, melting point 198.5–202° C.

*Example CXXII*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 4.1 parts 1-chloro-2-(4-methylphenyl)-ethane in 24 parts 4-methyl-2-pentanone. After the addition is complete, the whole is stirred and refluxed for fifty-five hours. After cooling 150 parts water are added. The formed precipitate is filtered off, to yield the crude product. This fraction is recrystallized from 100 parts boiling 4-methyl-2-pentanone. After cooling overnight at room temperature, 1-phenyl-4-oxo-8-[2-(4-methylphenyl)-ethyl]-1,3,8-triaza-spiro(4,5)decane is obtained, melting point 233.5–236° C.

*Example CXXIII*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 4.5 parts 1-chloro-2-(4-methoxyphenyl)-ethane in 24 parts 4-methyl-2-pentanone. After the addition is complete, the whole is stirred and refluxed for fifty-five hours. After cooling 150 parts water are added. The formed precipitate is filtered off and dried, yielding 5.9 parts crude product. This crop is recrystallized from 80 parts boiling 4-methyl-2-pentanone. After cooling for two hours at room temperature, 1-phenyl-4-oxo-8-[2-(4-methoxyphenyl) - ethyl] - 1,3,8-triaza-spiro(4,5)decane is obtained, melting point 204–205° C.

*Example CXXIV*

To a stirred and refluxed mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 4.2 parts 1-chloro-2-(4-fluorophenyl)-ethane in 24 parts 4-methyl-2-pentanone. After the addition is complete, the whole is stirred and refluxed for fifty-five hours. After cooling 150 parts water are added. The formed precipitate is filtered off, yielding 1-phenyl-4-oxo-8-[2-(4-fluorophenyl)-ethyl]-1,3,8-triaza-spiro(4,5)decane, melting point 201.5–203.5° C.

*Example CXXV*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 4.4 parts 1-chloro-4-phenyl-butane in 24 parts 4-methyl-2-pentanone. After the addition is complete, the whole is stirred and refluxed for forty-eight hours.

After cooling the reaction mixture, 150 parts water are added. The remaining precipitate is filtered off and dried, yielding 1 - phenyl - 4-oxo-8-(4-phenylbutyl)-1,3,8-triaza-spiro(4,5)decane, melting point 188.5–190° C.

*Example CXXVI*

A mixture of 4.75 parts 1-chloro-4-(4-fluorophenyl)-butane, 5.1 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for forty-eight hours. After cooling, 150 parts water are added. The remaining precipitate is filtered off and recrystallized from 24 parts 4-methyl-2-pentanone, yielding 1-phenyl-4-oxo-8-[4-(4-fluorophenyl)-butyl]-1,3,8-triaza-spiro(4,5)decane; melting point 180–181° C.

*Example CXXVII*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5.6 parts 1-bromo-2-phenyl-butane in 24 parts 4-methyl-2-pentanone. After the addition is complete, the whole is further stirred and refluxed for forty-eight hours. After cooling the reaction mixture is treated with 150 parts water. The organic layer is separated, dried over potassium carbonate and evaporated. The solid residue is recrystallized from 56 parts 4-methyl-2-pentanone. After cooling to 0° C., the precipitate is filtered off and dried, yielding dl-1-phenyl-4-oxo-8-(2-phenylbutyl)-1,3,8-triaza-spiro(4,5)decane, melting point 176–179° C.

*Example CXXVIII*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 6.1 parts 1-bromo-3-phenyl-butane in 24 parts 4-methyl-2-pentanone. After the addition is complete, the whole is stirred and refluxed for fifty-five hours. After cooling, 150 parts water are added. The formed precipitate is filtered off and dried, yielding the crude product. This fraction is recrystallized from 40 parts 4-methyl-2-pentanone. After cooling to 0° C., dl-1-phenyl-4-oxo-8 - (3 - phenylbutyl) - 1,3,8-triaza-spiro(4,5)decane is obtained, melting point 166.5–167.5° C.

*Example CXXIX*

A mixture of 5.5 parts dl-1-bromo-2-methyl-3-phenyl-propane, 5.1 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for sixty hours. After cooling, there are added 150 parts water. The organic layer is separated, dried over potassium carbonate, filtered and evaporated. The solid residue is stirred in diisopropylether, filtered off again and recrystallized from 80 parts 4-methyl-2-pentanone, yielding dl - 1 - phenyl-4-oxo-8-(2-methyl-3-phenyl-propyl) - 1,3,8 - triaza - spiro(4,5)decane, melting point 190.5–193° C.

*Example CXXX*

A mixture of 5.5 parts dl-1-bromo-3-phenyl-butane, 5.1 parts 1 - phenyl - 4 - oxo-1,3,8-triaza-spiro(4,5)decane, 4 parts sodium carbonate, a few crystals of potassium iodide in 200 parts 4-methyl-2-pentanone is stirred and refluxed for fifty-six hours. After cooling, the reaction mixture is treated with 150 parts water. The organic layer is separated, dried, filtered and from the filtrate a solid crystallizes. It is filtered off and dried, yielding dl-1-phenyl-4-oxo-8-(1 - methyl-3-phenyl - propyl) - 1,3,8 - triaza - spiro(4,5)decane, melting point 164–165.5° C.

*Example CXXXI*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5.5 parts dl-1-chloro-4-phenyl-pentane in 24 parts 4-methyl-2-pentanone. After the addition is complete, the whole is stirred and refluxed for sixty-five hours. After cooling, 150 parts water are added. The aqueous layer is separated and extracted once more with 4-methyl-2-pentanone. The combined organic layers are dried over potassium carbonate and evaporated. The solid residue is stirred in 80 parts diisopropylether, filtered off again and dried, yielding the crude product. This fraction is recrystallized from 48 parts 4-methyl-2-pentanone. After cooling overnight at −20° C., dl-1-phenyl-4-oxo-8-(4-phenyl-pentyl)-1,3,8-triaza-spiro(4,5)decane is obtained, melting point 121.5–125.5° C.

*Example CXXXII*

A solution of 146 parts 5-chloro-2-(4-methylphenyl)-2-pentene in 320 parts 2-propanol is hydrogenated at normal pressure and at a temperature of about 40° C., in the presence of 10 parts palladium-on-charcoal catalyst 10%. After the amount of hydrogen is taken up, hydrogenation is stopped. The catalyst is filtered off and the filtrate is evaporated. The oily residue is distilled in vacuo, yielding dl-1-chloro-4-(4-methylphenyl)-pentane, boiling at 94–95° C. at 0.2 mm. pressure; $n_D^{20}$: 1.5102; $d_{20}^{20}$: 0.9918.

A mixture of 5.1 parts dl-1-chloro-4-(4-methylphenyl)-pentane, 5.1 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for sixty hours. After cooling, there are added 150 parts water. The organic layer is separated, dried over potassium carbonate and filtered and evaporated. The oily residue is dissolved in 80 parts 4-methyl-2-pentanone and after cooling to room temperature, the formed precipitate is filtered off, washed with 4-methyl-2-pentanone and dried, yielding dl-1-phenyl-4-oxo-8-[4-(4-methylphenyl) - pentyl] - 1,3,8 - triaza - spiro(4,5)decane, melting point 133–135° C.

*Example CXXXIII*

A mixture of 17.5 parts 5-chloro-2-(4-methoxyphenyl)-2-pentene, and 160 parts 2-propanol is hydrogenated at normal pressure and at a temperature of about 35° C., in the presence of 2 parts palladium-on-charcoal catalyst 10%. After the calculated amount of hydrogen is taken up, hydrogenation is stopped. The catalyst is filtered off and the filtrate is evaporated, to yield dl-1-chloro-4-(4-methoxyphenyl)-pentane.

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5.6 parts dl - 1 - chloro-4-(4-methoxyphenyl)-pentane in 24 parts 4-methyl-2-pentanone. After the addition is complete, the whole is stirred and refluxed for another forty-eight hours. After cooling there are added 150 parts water. The organic layer is separated, dried over potassium carbonate and evaporated. The oily residue is dissolved in 48 parts 4-methyl-2-pentanone. After cooling to 0° C., the formed precipitate is filtered off and dried in vacuo at 90° C., yielding dl-1-phenyl-4-oxo-8-[4-(4-methoxyphenyl) - pentyl]-1,3,8-triaza - spiro(4,5)decane, melting point 138–139.5° C.

*Example CXXXIV*

To a stirred mixture of 300 parts fluorobenzene and 56.2 parts concentrated sulfuric acid are added dropwise 121 parts freshly distilled allylbromide, while maintaining a temperature of about 40° C. (exothermic reaction).

After the addition is complete, the whole is stirred at the same temperature for 5 hours and kept overnight at room temperature. The organic layer is separated and washed successively with 30 parts concentrated sulfuric acid, 60 parts of a saturated sodium sulfate solution and 50 parts of a 10% sodium hydroxide solution. To the resulting suspension is added benzene. The aqueous layer is drawn off and the organic layer is washed once more with 50 parts water. The layers are separated and the organic layer is dried over sodium sulfate and evaporated. The residue is distilled in vacuo, the crude product. On redistillation of this fraction, dl-1-bromo-2-(4-fluorophenyl)-propane is obtained, boiling at 74–77° C. at 0.9 mm. pressure.

A mixture of 5.7 parts dl-1-bromo-2-(4-fluorophenyl)-propane, 5.1 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for sixty hours. After cooling the reaction mixture, there are added 150 parts water. The organic layer is separated, dried over potassium carbonate, filtered and evaporated. The oily residue is dissolved in ether and gaseous hydrogen chloride is introduced into this solution. The precipitated solid hydrochloride is filtered off and recrystallized twice from 40 parts 2-propanol, yielding dl-1-phenyl - 4 - oxo-8-[2-(4-fluorophenyl)-propyl]-1,3,8-triaza - spiro(4,5)decane hydrochloride, melting point 214.5–220° C.

*Example CXXXV*

To a stirred and refluxing mixture of 1,45 parts 4-fluoro-benzylcyanide, 642 parts diethyl carbonate and 48 parts anhydrous toluene are added portionwise 53.5 parts sodium (temperature: about 95–100° C.). After the addition is complete, the whole is further stirred and refluxed for one and one-half hours. After cooling overnight the reaction mixture is decomposed by successive slowly addition of 640 parts water and 250 parts hydrochloric acid. The aqueous layer is separated and extracted twice with diisopropylether. The organic layer is separated, dried over sodium sulfate and evaporated. The oily residue is fractionated in vacuo, yielding dl-α-(ethoxy-carbonyl)-4-fluoro-benzyl-cyanide, boiling at 112–123° C. at 1 mm. pressure; $n_D^{20}$: 1.4900; $d_{20}^{20}$: 1.1655.

To 308 parts absolute ethanol are added portionwise 22 parts sodium (exothermic reaction: temperature rises to 75° C.). After cooling to about 50° C., there is added a solution of 188.7 parts dl-α-(ethoxy-carbonyl)-4-fluoro-benzyl-cyanide in 544 parts absolute ethanol. After the addition is complete, the whole is stirred for one and one-half hours at room temperature. Then there is added a solution of 125.5 parts ethylbromide in 80 parts absolute ethanol. After the addition is complete, the mixture is stirred and refluxed for two hours. After cooling the reaction mixture, the precipitated sodium bromide is filtered off, washed on the filter with ethanol and the filtrate is evaporated. The oily residue is treated with water and diisopropylether while shaken. The aqueous layer is separated and extracted once more with diisopropylether. The combined organic layers are dried over sodium sulfate and evaporated. The oily residue is distilled in vacuo, yielding dl-α-(ethoxy-carbonyl)-α-ethyl-4-fluoro-benzyl-cyanide, boiling at 107–110° C. at 0.7 mm. pressure; $n_D^{20}$: 1.4841; $d_{20}^{20}$: 1.1154.

To a solution of 82 parts potassium hydroxide 85% in 720 parts absolute denatured ethanol are added portionwise 146 parts dl-α-(ethoxy-carbonyl)-α-ethyl-4-fluoro-benzyl-cyanide. After the addition is complete, the whole is stirred and refluxed for three minutes. After cooling to room temperature, the formed precipitate is filtered off, washed on the filter with ethanol and the combined filtrates are evaporated. The oily residue is taken up in 400 parts water. The mixture is extracted with diisopropylether (three times). The solvent is dried over sodium carbonate and evaporated. The residue is fractionated in vacuo, yielding dl-2-(4-fluoro-phenyl)-butyronitrile, boiling at 124–125° C. at 15 mm. pressure; $n_D^{20}$: 1.4903; $d_{20}^{20}$: 1.0578.

A solution of 81.6 parts dl-2-(4-fluorophenyl)-butyronitrile and 118 parts potassium hydroxide 85% and 472 parts ethanol 90% is stirred and refluxed until no more ammonia gas is evolved. The mixture is then neutralized with 200 parts hydrochloric acid 2 N, and the whole is further stirred and refluxed overnight. The ethanol is evaporated. The residue is dissolved in 600 parts water. The aqueous solution is washed with 160 parts ether; then to the water layer are added crushed ice and the whole is acidified with concentrated hydrochloric acid. The obtained oily layer is extracted three times with 320 parts diisopropylether. The organic layer is dried over sodium sulfate and evaporated. The oily residue is distilled in vacuo, yielding dl-2-(4-fluoro-phenyl)-butyric acid, boiling at 120–123° C. at 1.1 mm. pressure.

To a stirred mixture of 22.5 parts lithium tetrahydrido-aluminate in 400 parts anhydrous ether (room temperature) is added dropwise a solution of 83 parts dl-2-(4-fluorophenyl)-butyric acid in 320 parts anhydrous ether (exothermic reaction). After the addition is complete, the whole is stirred and refluxed for two hours. The reaction mixture is decomposed immediately with water and concentrated hydrochloric acid (ice-bath). The acid aqueous layer is separated and extracted twice with diisopropylether. The organic layer is dried over sodium sulfate and evaporated. The oily residue is fractionated in vacuo, yielding dl-2-(4-fluorophenyl)-butanol, boiling at 126–127° C. at 17.5 mm. pressure; $n_D^{20}$: 1.5003; $d_{20}^{20}$: 1.072.

69 parts dl-2-(4-fluorophenyl)-butanol are stirred and cooled in an ice-bath. Then there are added 53 parts phosphorous tribromide, while keeping a temperature between 10° and 15° C. After the addition is complete, the whole is stirred overnight at room temperature. The whole is then heated for one hour in a boiling water-bath. After cooling, the reaction mixture is poured into crushed ice. The whole is extracted with petroleum ether and then washed successively twice with sodium carbonate 5%, once with concentrated sulfuric acid, once with sodium carbonate and once with water. After drying over sodium sulfate, the organic layer is evaporated. The residue is distilled in vacuo, yielding dl-1-bromo-2-(4-fluorophenyl)-butane, boiling at 113–117° C. at 12 mm. pressure.

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 6.1 parts dl-1-bromo-2-(4-fluorophenyl)-butane in 24 parts 4-methyl-2-pentanone. After the addition is complete, the whole is stirred and refluxed for forty-eight hours. After cooling, the reaction mixture is treated with 150 parts water. The organic layer is separated, dried over potassium carbonate and evaporated. The solid residue is boiled in 48 parts 4-methyl-2-pentanone. After cooling to −15° C., dl-1-phenyl-4-oxo-8-[2-(4-fluorophenyl)-butyl]-1,3,8-triaza-spiro(4,5)decane is filtered off, melting point 174–181° C.

*Example CXXXVI*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 6 parts dl-1-bromo-3-(4-fluorophenyl)-butane in 24 parts 4-methyl-2-pentanone. After the addition is complete, the whole is further stirred and refluxed for another forty-eight hours. After cooling to room temperature, 150 parts water are added. The organic layer is separated, dried over potassium carbonate and evaporated. The solid residue is recrystallized from a mixture of 40 parts 4-methyl-2-pentanone and 40 parts diisopropylether, yielding dl-1-phenyl-4-oxo-8-[3-(4-fluorophenyl)-butyl]-1,3,8-triaza-spiro(4,5)decane, melting point 155–158.5° C.

*Example CXXXVII*

A mixture of 59 parts 5-bromo-2-(4-fluorophenyl)-2-pentene, 30 parts distilled water and 240 parts methanol is hydrogenated at normal pressure and at a temperature of about 30°–35° C., in the presence of 7 parts palladium-on-charcoal catalyst 10%. After the calculated amount of hydrogen is taken up, hydrogenation is stopped. The whole is boiled for a few minutes. The catalyst is then filtered off and the filtrate is evaporated. The oily residue is distilled in vacuo, yielding a first fraction of dl-1-bromo-4-(4-fluorophenyl)-pentane, boiling at 133–139° C. at 16 mm. pressure and a second fraction of dl-1-bromo-4-(4-fluorophenyl)-pentane, boiling at 141–141.5° C. at 16 mm. pressure.

A mixture of 6.5 parts dl-1-bromo-4-(4-fluorophenyl)-pentane, 5.1 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for fifty-six hours. After cooling the reaction mixture, there are added 150 parts water. The organic layer is separated, dried, filtered and evaporated. The solid residue is stirred in diisopropylether, filtered off again and dried, yielding the crude product. This crop is first recrystallized from 24 parts 4-methyl-2-pentanone and then from 24 parts diisobutylketone, to yield dl-1-phenyl-4-oxo-8-[4-(4-fluorophenyl)-pentyl]-1,3,8-triaza-spiro(4,5)decane, melting point 129.5–132° C.

*Example CXXXVIII*

Starting from 11 parts magnesium, 69.7 parts methyliodide in 160 parts anhydrous ether, a methylmagnesiumiodide solution is prepared in the usual manner. To this solution is added a solution of 77 parts 4-chlorophenyl cyclopropyl ketone in 240 parts anhydrous ether, while stirring and refluxing. After the addition is complete, a solid is precipitated. The whole is stirred for two hours at room temperature; then decomposed with 800 parts of an ammonium chloride solution 20% and the organic layer is separated, washed with water, dried over sodium sulfate, filtered and the filtrate is evaporated. The oily residue is distilled in vacuo, yielding dl-4-chlorophenyl-cyclopropyl-methyl-carbinol, boiling at 102–104° C. at 1 mm. pressure; $n_D^{20}$: 1.5485; $d_{20}^{20}$: 1.1498.

A mixture of 62 parts dl-4-chlorophenyl-cyclopropyl-methyl-carbinol and 80 parts benzene is cooled with ice-water to a temperature below 15° C. Then there are added dropwise 40 parts thionylchloride. After the addition is complete, the whole is stirred and refluxed for one hour. After cooling, the reaction mixture is evaporated. The residue is taken up in 160 parts benzene and the whole is evaporated again. This treatment is repeated once more to remove excess thionylchloride. The remaining residue is distilled in vacuo, yielding 5-chloro-2-(4-chlorophenyl)-2-pentene, boiling at 128–131° C. at 1.5 mm. pressure; $n_D^{20}$: 1.5696; $d_{20}^{20}$: 1.1694.

A solution of 42 parts 5-chloro-2-(4-chlorophenyl)-2-pentene in 120 parts 2-propanol is hydrogenated at normal pressure and at a temperature of about 35°–40° C., in the presence of 4 parts palladium-on-charcoal catalyst 10%. After the calculated amount of hydrogen is taken up, hydrogenation is stopped. The catalyst is filtered off and the filtrate is evaporated. The oily residue is dissolved in 80 parts toluene and this solution is evaporated again. The oily residue is distilled in vacuo, yielding dl-1-chloro-4-(4-chlorophenyl)-pentane, boiling at 115–117° C. at 1.5 mm. pressure; $d_{20}^{20}$: 1.1244; $n_D^{20}$: 1.5291.

To a stirred mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5.6 parts dl-1-chloro-4-(4-chlorophenyl)-pentane in 24 parts 4-methyl-2-pentanone. After the addition is complete, the whole is stirred and refluxed for forty-eight hours. After cooling the reaction mixture, 150 parts water are added. The organic layer is separated, dried over potassium carbonate and evaporated. The oily residue is dissolved in 48 parts diisopropylether and 16 parts acetone are added. On keeping at room temperature, a solid is precipitated, it is filtered off and dried, yielding dl-1-phenyl-4-oxo-8-[4-(4-chlorophenyl)-pentyl]-1,3,8-triaza-spiro(4,5)decane, melting point 146–147° C.

*Example CXXXIX*

A mixture of 5.5 parts 5-chloro-2-(4-chlorophenyl)-2-pentene, 5.1 parts 1-phenyl-4-oxo-1,3,8-triaza-spiro(4,5)decane, 7 parts sodium carbonate, a few crystals of potassium iodide in 200 parts 4-methyl-2-pentanone is stirred and refluxed for two days. After cooling to room temperature, the reaction mixture is treated with 250 parts water. The formed precipitate is filtered off and recrystallized from 4-methyl-2-pentanone, yielding 1-phenyl-4-oxo-8-[4-(4-chlorophenyl)-3-pentenyl]-1,3,8-triaza-spiro(4,5)decane, melting point 181–183° C.

*Example CXL*

To a cooled (0° C.) and stirred solution of 35 parts 1-(hydroxymethyl)-2-phenyl-cyclopropane in 240 parts anhydrous ether are added dropwise 35 parts phosphorous tribromide. The cooling-bath is removed and after the addition is complete, the whole is stirred for thirty minutes at room temperature. The reaction mixture is decomposed with 50 parts water. The organic layer is separated, washed successively twice with water and once with a sodium hydrogen carbonate solution; then it is dried over sodium sulfate, filtered and evaporated. The oily residue is distilled in vacuo, yielding A-dl-1-(bromomethyl)-2-phenyl-cyclopropane, boiling at 72–87° C. at 0.5 mm. pressure; $n_D^{20}$: 1.5662; $d_{20}^{20}$: 1.3100.

A mixture of 6.2 parts A-dl-1-(bromo-methyl)-2-phenyl-cyclopropane, 5.1 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for forty-eight hours. After cooling the reaction mixture, there are added about 80 parts water. The organic layer is separated, dried over potassium carbonate and filtered. The filtrate is evaporated in vacuo and the oily residue is dissolved in about 60 parts 4-methyl-2-pentanone. On cooling the solution to about 0° C. a solid is precipitated. This is filtered off and dried, to yield A-dl-1-phenyl-4-oxo-8-[(2-phenyl-1-cyclopropyl)-methyl]-1,3,8-triaza-spiro(4,5)decane, melting point 170–184° C. (dec).

*Example CXLI*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 4.9 parts 1-chloro-3-methoxy-3-phenyl-propane in 24 parts 4-methyl-2-pentanone. After the addition is complete, the whole is stirred and refluxed for sixty-five hours. After cooling, 150 parts water are added. The aqueous layer is separated and extracted once more with 4-methyl-2-pentanone. The combined organic phases are dried over potassium carbonate and evaporated. The solid residue is stirred in 80 parts diisopropylether, filtered off again and dried. It is recrystallized from 56 parts 4-methyl-2-pentanone. After cooling to 0° C., dl-1-phenyl-4-oxo-8-(3-methoxy-3-phenyl-propyl)-1,3,8-triaza-spiro(4,5)decane is obtained, melting point 162–164° C.

*Example CXLII*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 1-bromo-5-phenyl-pentane in 24 parts 4-methyl-2-pentanone. After the addition is complete, the whole is stirred and refluxed for forty-eight hours. After cooling the reaction mixture, there are added 150 parts water. The organic layer is separated, dried over potassium carbonate and evaporated. The solid residue is stirred in 80 parts diisopropylether and filtered off again and dried in vacuo, yielding the crude product. This crop is recrystallized from 48 parts 4-methyl-2-pentanone. After cooling for two hours at room temperature, 1-phenyl-4-oxo-8-(5-phenyl-pentyl)-1,3,8-triaza-spiro(4,5)decane is obtained, melting point 143–144.5° C.

Example CXLIII

To a refluxing solution of about 7 parts 1-phenyl-4-oxo-8 - [3 - (4 - fluorobenzoyl)-propyl]-1,3,8-triaza-spiro(4,5)decane in 470 parts 2-propanol is added a solution of 1 part hydrochloric acid in 10 parts 2-propanol. After further refluxing for a few minutes, the clear solution is cooled overnight at room temperature. The formed precipitate is filtered off, washed with 2-propanol and dried for four hours in vacuo at 80° C., yielding 1-phenyl-4-oxo - 8 - [3-(4-fluorobenzoyl)-propyl]-1,3,8-triaza-spiro(4,5)decane hydrochloride, melting point 242–243° C.

Example CXLIV

To a stirred and refluxing mixture of 4 parts 1-butyl-4-oxo-1,3,8-triaza-spiro(4,5)decane, 3.2 parts sodium carbonate, a few crystals of potassium iodide in 120 parts 4-methyl-2-pentanone is added dropwise a solution of 3.8 parts 4-chloro-4'-fluoro-butyrophenone in 40 parts 4-methyl-2-pentanone. After the addition is complete, the whole is stirred and refluxed for twenty-four hours. Then a second portion of 3.8 parts 4-chloro-4'-fluoro-butyrophenone dissolved in 40 parts 4-methyl-2-pentone is added and the whole is stirred and refluxed for another forty hours. After cooling the reaction mixture, there are added 50 parts water. The organic layer is separated, dried over potassium carbonate and evaporated. The oily residue is dissolved in 400 parts diisopropylether. The solution is filtered and gaseous hydrogen chloride is introduced into the filtrate. The solid hydrochloride is filtered off, to yield the crude salt. This crop is boiled in 120 parts 2-propanol. The undissolved part is filtered off, yielding 1 - butyl - 4 - oxo - 8 - [3-(4-fluorobenzoyl)-propyl]-1,3,8-triaza-spiro(4,5)decane dihydrochloride hydrate, melting point 203–208° C.

On cooling the mother liquor for two hours at −20° C., a second fraction of 1-butyl-4-oxo-8-[3-(4-fluorobenzoyl)-propyl]-1,3,8-triaza-spiro(4,5)decane dihydrochloride hydrate is obtained, melting point 209–213.5° C.

Example CXLV

To a solution of 290 parts cyclopropyl-4-fluorophenyl-carbinol in 800 parts anhydrous benzene are added portionwise 244 parts thionylchloride (temperature rises to about 50° C.) . After the addition is complete, the whole is refluxed until no more gaseous hydrogen chloride is evolved (duration time about three hours). The reaction mixture is evaporated and the oily residue is distilled in vacuo, yielding 4-chloro-1-(4 - fluorophenyl) - 1 - butene, boiling point 130–132° C. at 12 mm. pressure A mixture of 4.8 parts 4-chloro-1-(4-fluorophenyl)-1-butene, 5.1 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for forty-eight hours. After cooling 150 parts water are added and the whole is stirred until a clear solution is obtained. The organic layer is separated, dried, filtered and evaporated. The solid residue is recrystallized from 4-methyl-2-pentanone, yielding 1-phenyl-4-oxo-8-[4-(4 - fluorophenyl) - 3 - butenyl] - 1,3,8 - triaza-spiro(4,5)decane, melting point 204–205° C.

Example CXLVI

To a solution of 4-methyl-phenyl-magnesium bromide, prepared from 49 parts magnesium and 341 parts 4-methyl-bromobenzene in 400 parts dry tetrahydrofurane, is added dropwise a solution of 160 parts cyclopropyl-methyl-ketone in 560 parts anhydrous ether. After the addition is complete, the whole is stirred and refluxed for one and a half hours. After cooling, the reaction mixture is decomposed by successive addition of 50 parts ammonium chloride and 250 parts water, at a temperature below 20° C. The solution is decanted from some gelationous precipitate and from the solution the etheric layer is separated and set aside. The gelationous precipitate is triturated in ether and the solvent is decanted. This treatment is repeated twice. The combined organic layers are dried over potassium carbonate, filtered and evaporated. The residue is distilled in vacuo, yielding a first fraction of dl-cyclopropyl-methyl - 4 - methylphenyl-carbinol, boiling at 110–115° C. at 0.9–2 mm. pressure and a second fraction of dl-cyclopropyl-methyl - 4 - methylphenyl-carbinol, boiling at 110–111° C. at 0.6–0.7 mm. pressure.

To a mixture of 248 parts dl-cyclopropyl-methyl-4-methylphenyl-carbinol and 480 parts anhydrous benzene are added dropwise 215 parts thionylchloride (exothermic reaction). After the addition is complete, the whole is further stirred and refluxed for two hours. The reaction mixture is evaporated. The oily residue is extracted with benzene. This organic layer is dried over sodium sulfate, filtered and evaporated again. The oily residue is distilled in vacuo, yielding a first fraction of 5-chloro-2-(4-methylphenyl) - 2 - pentene, boiling at 102–110° C. at 0.7 mm. pressure; $n_D^{20}$: 1.5456; $d_{20}^{20}$: 1.0389; and a second fraction of 5-chloro-2-(4-methylphenyl)-2-pentene, boiling at 99–103° C. at 0.9 mm. pressure; $n_D^{20}$: 1.5500; $d_{20}^{20}$: 1.0407.

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5.1 parts 5-chloro-2-(4-methylphenyl)-2-pentene in 24 parts 4-methyl-2-pentanone. After the addition is complete, the whole is further stirred and refluxed for another forty-eight hours. After cooling, there are added 150 parts water. The organic layer is separated, dried over potassium carbonate and evaporated. The solid residue is stirred in 80 parts diisopropylether, filtered off again and recrystallized from 64 parts 4-methyl-2-pentanone. After cooling for two hours at room temperature, the solid product is filtered off and dried, yielding 1-phenyl - 4 - oxo-8-[4-(4 - methylphenyl)-3-pentenyl]-1,3,8 - triaza - spiro(4,5)decane, melting point 170–174.5° C.

Example CXLVII

Starting from 20.6 parts magnesium and 120 parts methyliodide a solution of methylmagnesium iodide is prepared in 160 parts anhydrous ether in the usual manner. To this solution is added a solution of 135 parts cyclopropyl-4-methoxyphenyl-ketone in 120 parts anhydrous ether (exothermic reaction). After the addition is complete, the whole is stirred and refluxed for three hours. After cooling the reaction mixture is poured into ice-water. To the mixture is added an ammonium chloride solution. The organic layer is separated and the aqueous layer is extracted once more with ether. The combined organic layers are dried over sodium sulfate and evaporated. The oily residue is distilled in vacuo, yielding dl-cyclopropyl-4-methoxyphenyl-methyl-carbinol, boiling point 143° C. at 3 mm. pressure; $n_D^{20}$: 1.5432; $d_{20}^{20}$: 1.0720.

To a solution of 57.5 parts dl-cyclopropyl-4-methoxyphenyl-methyl-carbinol in 80 parts benzene are added dropwise 40 parts thionylchloride (exothermic reaction). After the addition is complete, the whole is stirred and refluxed for one hour. The reaction mixture is evaporated and the oily residue is distilled in vacuo, yielding 5-chloro-2-(4-methoxyphenyl)-2-pentene, boiling point 141–143° C. at 2 mm. pressure; $n_D^{20}$: 1.5578; $d_{20}^{20}$: 1.1080.

A mixture of 5.46 parts 5-chloro-2-(4-methoxyphenyl)-2-pentene, 5.1 parts 1-phenyl-4-oxo - 1,3,8 - triaza-spiro(4,5)decane, 7 parts sodium carbonate, a few crystals of potassium iodide in 160 parts 4-methyl-2-pentanone is stirred and refluxed for two days. After cooling, there are added 300 parts water. The organic layer is separated, dried over potassium carbonate, filtered and evaporated in vacuo. The oily residue is dissolved in 4-methyl-2-pentanone. After cooling this solution to 0° C., 1-phenyl-4-oxo-8-[4-(4 - methoxyphenyl) - 3 - pentenyl]-1,3,8-triaza-spiro(4,5)decane is obtained, melting point 136–145° C.

*Example CXLVIII*

While cooling 250 pairs hydrobromic acid solution (60%) in an ice-bath, gaseous hydrobromic acid is introduced into it until saturation. Then there are added dropwise 81 parts 1-cyclopropyl-1-phenyl-ethanol, at a temperature of 0° C. and after the addition is complete the whole is stirred for another hour at the same temperature. The supernatant oily layer is separated, diluted with ether, washed with a saturated sodium hydrogen carbonate solution, dried over magnesium sulfate, filtered and evaporated. The oily residue is distilled in vacuo, yielding a first fraction of 5-bromo-2-phenyl-2-pentene, boiling at 145–155° C. at 19 mm. pressure and a second fraction of 5-bromo-2-phenyl-2-pentene, boiling at 155–163° C. at 22 mm. pressure.

A mixture of 6 parts 5-bromo-2-phenyl-2-pentene, 5.1 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for forty hours. After cooling the reaction mixture, there are added 200 parts water. The organic layer is separated, dried, filtered and evaporated. The solid residue is recrystallized from 200 parts 4-methyl-2-pentanone, yielding a product (mainly mixture of the crude free base and mono-hydrochloride). The mother liquor is diluted with ether. This mixture is filtered and then gaseous hydrogen chloride is introduced into the filtrate. The precipitated solid hydrochloride is filtered off and recrystallized from 80 parts 2-propanol, yielding 1-phenyl-4-oxo-8-(4-phenyl-3-pentenyl)-1,3,8-triaza - spiro(4,5)decane hydrochloride, melting point 216–218° C.

*Example CXLIX*

250 parts hydrobromic acid solution (60%) are saturated with gaseous hydrobromic acid, while maintaining a temperature of 0° C. Then there are added dropwise 90 parts 1-cyclopropyl-1-(4-fluorophenyl)-ethanol (exothermic reaction). After the addition is complete, the whole is stirred for one hour at 0° C. The cooling-bath is removed. The oily layer is separated and diluted with 200 parts diethylether. The obtained mixture is washed with a sodium hydrogen carbonate solution in water, dried over magnesium sulfate, filtered and evaporated. The oily residue is distilled in vacuo, yielding 5-bromo-2-(4-fluorophenyl)-2-pentene, boiling point 133–136° C. at 10 mm. pressure; $n_D^{20}$: 1.5500; $d_{20}^{20}$: 1.3384.

A mixture of 6.3 parts 5-bromo-2-(4-fluorophenyl)-2-pentene, 5.1 parts 1-phenyl-4-oxo-1,3,8-triaza-spiro(4,5)-decane, 4 parts sodium carbonate, a few crystals of potassium iodide in 200 parts 4-methyl-2-pentanone is stirred and refluxed for forty hours. After cooling the reaction mixture, there are added 200 parts water. The organic layer is separated, dried, filtered and evaporated. The solid residue is stirred in diisopropylether, filtered off again and recrystallized from 80 parts 4-methyl-2-pentanone, yielding 1-phenyl-4-oxo-8-[4-(4-fluorophenyl)-3-pentenyl]-1,3,8 - triaza-spiro(4,5)decane, melting point 163–164.5 C.

*Example CL*

A solution of 48.5 parts 4-chloro-1,1-diphenyl-1-butene in 400 parts 2-propanol is hydrogenated at normal pressure and at a temperature of about 30° C., in the pressure of 5 parts palladium-on-charcoal catalyst 10%. After the calculated amount of hydrogen is taken up, hydrogenation is stopped. The catalyst is filtered off and the filtrate is evaporated. The oily residue is distilled in vacuo, yielding 1-chloro-4,4-diphenyl-butane, boiling point 180–185° C. at 2 mm. pressure, $n_D^{20}$: 1.5728; $d_{20}^{20}$: 1.0874.

A mixture of 6.3 parts 1-chloro-4,4-diphenyl-butane, 5.1 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for sixty hours. After cooling the reaction mixture is treated with water. After separation of the organic layer, a solid crystallizes, which is filtered off and recrystallized from 120 parts 4-methyl-2-pentanone, yielding 1-phenyl-4-oxo-8-(4,4-diphenyl-butyl) - 1,3,8-triaza - spiro(4,5)decane, melting point 204–206° C.

*Example CLI*

To a solution of phenyl-magnesiumbromide, prepared in usual manner starting from 20.5 parts magnesium and 141.5 parts bromo-benzene in 400 parts anhydrous ether, is added dropwise a solution of 65.8 parts ethyl 5-chlorovalerate, while refluxing. After the addition is complete, the whole is further stirred and refluxed for another four hours. After cooling the reaction mixture is decomposed with an ammoniumchloride solution. The aqueous layer is separated and extracted with ether. The organic layers are dried over sodium sulfate, filtered and evaporated. The oily residue is dissolved in 240 parts petroleum ether and this solution is stirred for one hour in an ice-salt bath, whereupon a solid is precipitated. It is filtered off and dried in an exsiccator, to yield 5-chloro-1,1-diphenyl-pentanol, melting point 58–61° C.

A solution of 50 parts 5-chloro-1,1-diphenyl-pentanol in 300 parts concentrated hydrochloric acid is stirred and refluxed for five hours. After cooling, the reaction mixture is extracted with ether. The organic layer is dried over calcium chloride, filtered and evaporated. The oily residue is distilled in vacuo, yielding 5-chloro-1,1-diphenyl-1-pentene, boiling point 150–165° C. at 1.5 mm. pressure.

A solution of 25.6 parts 5-chloro-1,1-diphenyl-1-pentene in 200 parts 2-propanol is hydrogenated at normal pressure and at a temperature of about 30° C., in the presence of 5 parts palladium-on-charcoal catalyst 10%. After the calculated amount of hydrogen is taken up, hydrogenation is stopped. The catalyst is filtered off and the filtrate is evaporated. The oily residue is distilled in vacuo, yielding 1-chloro-5,5-diphenyl-pentane, boiling point 130–144° C. at 0.2 mm. pressure.

A mixture of 5.68 parts 1-chloro-5,5-diphenyl-pentane, 4.6 parts 1-phenyl-4-oxo-1,3,8-triaza-spiro(4,5)decane, 3.2 parts sodium carbonate, a few crystals of potassium iodide in 200 parts 4-methyl-2-pentanone is stirred and refluxed for forty-eight hours. After cooling to room temperature, there are added 70 parts water. The undissolved solid is filtered off and recrystallized from 280 parts 4-methyl-2-pentanone, filtered off and dried, yielding 1-phenyl-4-oxo-8-(5,5 - diphenylpentyl) - 1,3,8 - triaza-spiro(4,5)decane, melting point 195.5–196° C.

*Example CLII*

To a solution of 4-methyl-phenyl-magnesiumbromide, prepared from 12.2 parts magnesium, 102.6 parts 4-methyl-bromobenzene and 320 parts anhydrous ether in the usual manner, is added dropwise a solution of 73 parts cyclopropyl-phenyl-ketone in 320 parts anhydrous ether, while refluxing. After the addition is complete, the whole is further stirred and refluxed for another three hours. After cooling the reaction mixture is decomposed with 1500 parts of a saturated ammoniumchloride solution. The organic layer is separated, dried over magnesium sulfate, filtered and evaporated. The oily residue is distilled in vacuo, yielding dl-cyclopropyl- 4-methylphenyl-phenyl-carbinol, boiling point 131–134° C. at 0.4 mm. pressure; $n_D^{20}$: 1.5795.

To a solution of 45 parts dl-cyclopropyl-4-methylphenyl-phenyl-carbinol in 80 parts anhydrous ether are added portionwise 16 parts thionylchloride (exothermic reaction: temperature rises to 60° C.). After the addition is complete, the whole is stirred and refluxed for one hour and a half. The solvent is evaporated. The residue is dissolved in 160 parts toluene and evaporated again. The oily residue is distilled in vacuo, yielding 4-chloro - 1 - (4 - methylphenyl) - 1 - phenyl - 1- butene, boiling point 164–165° C. at 1.4 mm. pressure; $n_D^{20}$: 1.5955.

A solution of 28 parts 4-chloro-1-(4-methylphenyl)-1-phenyl-1-butene in 120 parts 2-propanol is hydrogenated at normal pressure and at room temperature in the presence of 4 parts palladium-on-charcoal catalyst. After the calculated amount of hydrogen is taken up, hydrogenation is stopped. The catalyst is filtered off and the filtrate is evaporated. The oily residue is distilled in vacuo, yielding dl-1-chloro-4-(4-methylphenyl)-4-phenyl-butane, boiling point 140–142° C. at 0.3 mm. pressure.

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 6.7 parts dl-1-chloro-4-(4-methylphenyl)-4-phenyl-butane in 24 parts 4-methyl-2-pentanone. After the addition is complete, the whole is further stirred and refluxed for forty-eight hours. After cooling the reaction mixture, there are added 150 parts water. The organic layer is separated, dried over potassium carbonate and evaporated in vacuo. The solid residue is recrystallized from 56 parts 4-methyl-2-pentanone, to yield dl-1-phenyl - 4 - oxo - 8 - [4 - (4 - methylphenyl)-4-phenyl-butyl]-1,3,8-triaza-spiro(4,5)decane, melting point 166–186° C. (dec.).

Example CLIII

To a solution of 4-methoxy-phenyl-magnesiumbromide, prepared in the usual manner starting from 14.6 parts magnesium and 118 parts 4-methoxy-bromo-benzene in 200 parts anhydrous ether, is added dropwise a solution of 88 parts cyclopropyl phenyl ketone in 120 parts anhydrous ether. After the addition is complete, the whole is further stirred and refluxed for one and a half hour. After cooling the reaction mixture is decomposed by successive addition of 40 parts ammonium chloride and 100 parts water. The solvent is decanted from the precipitated matter (which is set aside), washed with water. The precipitate is dissolved in water, saturated with potassium carbonate and extracted with ether (three times with 80 parts). The combined organic layers are dried over potassium carbonate, filtered and evaporated. The oily residue is distilled in vacuo, yielding dl-cyclopropyl-4-methoxyphenyl-phenyl-carbinol, boiling point 150–180° C. at 1.5 mm. pressure; $n_D^{20}$: 1.5890; $d_{20}^{20}$: 1.1417.

To a solution of 86 parts dl-cyclopropyl-4-methoxyphenyl-phenyl-carbinol in 200 parts anhydrous benzene are added dropwise 60 parts thionylchloride (exothermic reaction). After the addition is complete, the whole is stirred and refluxed for one hour. The reaction mixture is evaporated. The residue is dissolved in benzene and this solution is evaporated again. This treatment is repeated three times. The oily residue is distilled in vacuo, yielding 4-chloro-1-(4-methoxyphenyl)-1-phenyl-1-butene, boiling point 165–183° C. at 0.4 mm. pressure.

A solution of 49 parts 4-chloro-1-(4-methoxyphenyl)-1-phenyl-1-butene in 80 parts methanol and 160 parts 2-propanol is hydrogenated at normal pressure and at room temperature, in the presence of 5 parts palladium-on-charcoal catalyst 10 percent. After the calculated amount of hydrogen is taken up, hydrogenation is stopped.

A mixture of 6.03 parts dl-1-chloro-4-(4-methoxyphenyl)-4-phenyl-butane, 4.6 parts 1-phenyl-4-oxo-1,3,8-triaza-spiro(4,5)-decane, 3.18 parts sodium carbonate, a few crystals of potassium iodide in 200 parts 4-methyl-2-pentanone is stirred and refluxed for seventy hours. After cooling the reaction mixture to room temperature, there are added 80 parts water. The organic layer is separated, dried over potassium carbonate and filtered. The filtrate is evaporated in vacuo and the solid residue is washed with isopropylether to yield the crude product. This product is dissolved again in chloroform. The obtained solution is washed with sodium hydroxide solution and then dried over sodium sulfate. After filtering the solution is evaporated in vacuo and the solid residue is washed with diisopropylether and dried to yield dl-1-phenyl - 4 - oxo - 8 - [4 - (4 - methoxyphenyl) - 4-phenyl-butyl]-1,3,8-triaza-spiro(4,5)decane, melting point 176–178° C. (dec.).

The catalyst is filtered off and the filtrate is evaporated. The oily residue is distilled in vacuo, yielding dl-1-chloro-4-(4-methoxyphenyl)-4-phenyl-butane, boiling point 146–155° C. at 0.2–0.3 mm. pressure.

Example CLIV

Starting from 36 parts magnesium and 263 parts 4-fluoro-bromobenzene, a solution of 4-fluoro-phenyl magnesium bromide in 280 parts anhydrous tetrahydrofurane is prepared in the usual manner. To this solution is added a solution of 220 parts cyclopropyl phenyl ketone in 120 parts anhydrous tetrahydrofurane (exothermic reaction: the reflux temperature is reached). The whole is further stirred and refluxed for two hours. The reaction mixture is cooled to room temperature and decomposed with water, while keeping a temperature below 20° C. The mixture is then extracted with benzene and ether. The organic extracts are dried over magnesium sulfate, filtered and evaporated. The oily residue is distilled in vacuo, yielding dl-cyclopropyl-4-fluorophenyl-phenyl - carbinol, boiling point 170–175° C. at 6 mm. pressure.

To a stirred mixture of 200 parts dl-cyclopropyl-4-fluorophenyl-phenyl-carbinol in 360 parts anhydrous benzene are added dropwise 120 parts thionylchloride (exothermic reaction). After the addition is complete, the whole is stirred and refluxed for one and a half hour. The reaction mixture is evaporated. The oily residue is fractionated in vacuo, yielding 4-chloro-1-(4-fluorophenyl)-1-phenyl-1-butene, boiling point 153–158° C. at 1.2 mm. pressure.

A mixture of 90 parts 4-chloro-1-(4-fluorophenyl)-1-phenyl-1-butene, 440 parts 2-propanol and 40 parts distilled water is hydrogenated at normal pressure and at a temperature of about 35° C., in the presence of 10 parts palladium-on-charcoal catalyst. After the calculated amount of hydrogen is taken up, hydrogenation is stopped. The whole is boiled for a few minutes. The catalyst is filtered off and the filtrate is evaporated. The oily residue is distilled in vacuo, yielding a first fraction of less pure dl-1-chloro-4-(4-fluorophenyl)-4-phenyl-butane, boiling point 135–145° C. at 0.2 mm. pressure and a second fraction of pure dl-1-chloro-4-(4-fluorophenyl)-4-phenyl-butane, boiling point 145–150° C. at 0.2 mm. pressure; $n_D^{20}$: 1.5578; $d_{20}^{20}$: 1.1447.

A mixture of 6.8 parts dl-1-chloro-4-(4-fluorophenyl)-4-phenyl-butane, 5.1 parts 1-phenyl-4-oxo-1,3,8-triaza-spiro(4,5)-decane, 4 parts sodium carbonate, a few crystals of potassium iodide in 200 parts 4-methyl-2-pentanone is stirred and refluxed for sixty hours. After cooling, the reaction mixture is treated with water. The organic layer is separated, dried over potassium carbonate, filtered and after cooling the filtrate to 0° C., dl-1-phenyl-4-oxo-8-[4-(4-fluorophenyl)-4-phenyl-butyl] - 1,3,8 - triaza-spiro(4,5)decane is obtained, melting point 190–192° C.

Example CLV

A mixture of 6.75 parts dl-1-chloro-4-(4-fluorophenyl)-4-phenyl-butane, 6.1 parts 1-phenyl-3-methyl-4-oxo-1,3,8-triaza-spiro(4,5)decane, 7 parts sodium carbonate, a few crystals of potassium iodide in 200 parts 4-methyl-2-pentanone is stirred and refluxed for two days. After cooling, 250 parts water are added. The organic layer is separated, dried over potassium carbonate, filtered and evaporated. The solid residue is recrystallized from 40 parts 4-methyl-2-pentanone, yielding dl-1-phenyl-3-methyl-4-oxo-8-[4-(4-fluorophenyl)-4-phenyl-butyl]-1,3,8 - triaza-spiro(4,5)decane, melting point 149–151° C.

Example CLVI

A mixture of 46 parts dl-5-chloro-1-(4-fluorophenyl)-1-phenyl-pentanol and 300 parts concentrated hydrochloric acid is stirred and boiled for five hours. After cooling the reaction mixture is extracted with ether. The organic layer is dried over calcium chloride, filtered and evaporated and the oily residue is distilled in vacuo, yielding 5-chloro-1-(4-fluorophenyl)-1-phenyl-1-pentene, boiling point 150–160° C. at 0.6 mm. pressure.

A solution of 15 parts 5-chloro-1-(4-fluorophenyl)-1-phenyl-1-pentene and 160 parts 2-propanol is hydrogenated at normal pressure and at room temperature, in the presence of 2.5 parts palladium-on-charcoal catalyst. After the calculated amount of hydrogen is taken up, hydrogenation is stopped. The catalyst is filtered off and the filtrate is evaporated. The oily residue is distilled in vacuo, yielding dl-1-chloro-5-(4-fluorophenyl)-5-phenyl-pentane, boiling point 155–157° C. at 0.6 mm. pressure.

A mixture of 6.1 parts dl-1-chloro-5-(4-fluorophenyl)-5-phenyl-pentane, 4.6 parts 1-phenyl-4-oxo-1,3,8-triaza-spiro(4,5)-decane, 3.2 parts sodium carbonate, a few crystals of potassium iodide in 200 parts 4-methyl-2-pentanone is stirred and refluxed for forty-eight hours. After cooling the reaction mixture, there are added 70 parts water. The undissolved part is filtered off, dried and recrystallized from 120 parts 4-methyl-2-pentanone, yielding dl-1-phenyl-4-oxo-8-[5-(4-fluorophenyl)-5 - phenyl-pentyl]-1,3,8 - triaza - spiro(4,5)decane, melting point 182.5–183.5° C.

Example CLVII

To a solution of 4-fluorophenyl-magnesiumbromide, prepared in the usual manner starting from 12.2 parts magnesium and 96.2 parts 4-fluoro-bromobenzene in 240 parts anhydrous ether, is added dropwise a solution of 80 parts cyclopropyl-4-methylphenyl-ketone in 240 parts anhydrous ether (exothermic reaction: reflux-temperature is maintained). After the addition is complete, the whole is further stirred and refluxed for another three hours. The reaction mixture is decomposed with 1000 parts ammonium chloride. The so obtained emulsion is filtered and from the filtrate is separated the aqueous layer and extracted twice more with 240 parts ether. The combined etheric layers are dried over sodium sulfate and evaporated. The oily residue is distilled in vacuo, yielding dl - cyclopropyl - 4 - fluorophenyl - 4 - methyl - phenyl-carbinol, boiling point 130–135° C. at 0.4 mm. pressure.

To a solution of 79 parts dl-cyclopropyl-4-fluorophenyl-methylphenyl-carbinol in 160 parts anhydrous ether are added portionwise 40 parts thionylchloride (exothermic reaction: temperature rises from 15° to 50° C.). The mixture is cooled in an ice-bath and the addition is continued. After the addition is complete, the whole is stirred and refluxed one and a half hour. The solvent is evaporated and the oily residue is distilled in vacuo, yielding 4 - chloro - 1 - (4 - fluorophenyl) - 1 - (4 - methylphenyl)-1-butene, boiling point 164–167° C. at 2 mm. pressure; $n_D^{20}$: 1.5809.

A solution of 43 parts 4-chloro-1-(4-fluorophenyl)-1-(4-methylphenyl)-1-butene in 120 parts 2-propanol is hydrogenated at normal pressure and at room temperature, in the presence of 4 parts palladium-on-charcoal catalyst. After the calculated amount of hydrogen is taken up, hydrogenation is stopped. The catalyst is filtered off and the filtrate is evaporated. The oily residue is distilled in vacuo, yielding dl-1-chloro-4-(4-fluorophenyl) - 4 - (4-methylphenyl)-butane, boiling point 132–137° C. at 0.2–0.3 mm. pressure; $n_D^{20}$: 1.5550; $d_{20}^{20}$: 1.1324.

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 7.2 parts dl-1-chloro-4(4-fluorophenyl)-4-(4-methylphenyl)-butane in 24 parts 4-methyl-2-pentanone. After the addition is complete, the whole is further stirred and refluxed for another forty-eight hours. After cooling the reaction mixture, there are added 150 parts water. The organic layer is separated, dried over potassium carbonate and evaporated. The oily residue is dissolved in a mixture of 56 parts diisopropylether and 32 parts 4-methyl-2-pentanone. After cooling to −15° C., the precipitated solid is filtered off and dried, yielding a first fraction of 1.1 parts of the crude product. On further keeping the mother liquor overnight at room temperature, another fraction of pure dl - 1 - phenyl - 4 - oxo - 8 - [4 - (4 - fluorophenyl)-4-(4-methylphenyl)-butyl] - 1,3,8 - triaza - spiro(4,5)-decane is obtained, melting point 161–163.5° C.

Example CLVIII

To a solution of 130 parts cyclopropyl-di-(4-fluorophenyl)-carbinol in 240 parts benzene are added dropwise 43 parts thionylchloride. The whole is refluxed until no more gas is evolved. The reaction mixture is then evaporated. The residue is distilled in vacuo, yielding 4-chloro-1,1-di-(4-fluorophenyl)-1-butene, boiling point 165–167° C. at 6 mm. pressure; $n_D^{20}$: 1.5698; $d_{20}^{20}$: 1:2151.

A solution of 61 parts 4-chloro-1,1-di-(4-fluorophenyl)-1-butene in 400 parts 2-propanol is hydrogenated at normal pressure and at room temperature in the presence of 5.5 parts palladium-on-charcoal catalyst 10% (exothermic reaction: temperature rises to about 30° C.). After the calculated amount of hydrogen is taken up, hydrogenation is stopped. The catalyst is filtered off and the filtrate is evaporated. The oily residue is distilled in vacuo, yielding 1-chloro-4,4-di-(4-fluorophenyl)-butane, boiling point 166–168° C. at 6 mm. pressure; $n_D^{20}$: 1.5425; $d_{20}^{20}$: 1.2039.

A mixture of 7.3 parts 1-chloro-4,4-di-(4-fluorophenyl)-butane, 5.1 parts 1-phenyl-4-oxo-1,3,8-triazo-spiro(4,5)-decane, 4 parts sodium carbonate, a few crystals of potassium iodide in 200 parts 4-methyl-2-pentanone is stirred and refluxed for sixty hours. After cooling the reaction mixture is treated with water. The organic layer is separated, dried, filtered and evaporated. The solid residue is recrystallized from 80 parts 4-methyl-2-pentanone, yielding 1-phenyl-4-oxo-8-[4,4-di-(4-fluorophenyl)-]butyl-1,3,8-triaza-spiro(4,5)decane, melting point 187.5–190° C.

Example CLIX

A solution of 46 parts 1-phenyl-3-(2-cyano-ethyl)-4-oxo - 8 - benzyl - 1,3,8 - triaza - spiro(4,5)decane hydrochloride in 160 parts methanol and 100 parts distilled water is hydrogenated at normal pressure and at room temperature and in the presence of 10 parts palladium-on-charcoal catalyst 10%. After the calculated amount of hydrogen is taken up, hydrogenation is stopped. The catalyst is filtered off and the filtrate is evaporated. The solid residue is boiled in acetone. After cooling the formed solid is filtered off and dried yielding a first fraction of 1-phenyl-3-(2-cyano-ethyl)-4-oxo1,3,8-triaza-spiro-(4,5)decane hydrochloride, melting point 265–268° C.

On further standing of the mother liquor a second fraction of 1-phenyl-3-(2-cyano-ethyl)-4-oxo-1,3,8-triaza-spiro(4,5)decane hydrochloride is obtained, melting point 249–252° C. (dec.).

A mixture of 7.3 parts 1-chloro-4,4-di-(4-fluorophenyl)-butane, 7 parts 1-phenyl-3-(2-cyano-ethyl)-4-oxo-1,3,8-triaza-spiro(4,5)decane hydrochloride, 7 parts sodium carbonate, a few crystals of potassium iodide in 200 parts 4-methyl-2-pentanone is stirred and refluxed for two days. After cooling, the reaction mixture is treated with 250 parts water. The organic layer is separated, dried over potassium carbonate, filtered and evaporated. The oily residue is dissolved in a mixture of 320 parts diisopropylether and 40 parts acetone and gaseous hydrogen chloride is introduced into this solution: an only hydrochloride is obtained. The solvent is decanted and the residue is dissolved in 120 parts acetone. After cooling for four hours at 0° C., no solid is formed but the only residue solidifies on treating with diisopropylether, yielding 1-phenyl-3-(2-cyano-ethyl)-4-oxo-8-[4,4-di-(4-fluorophenyl)-butyl]-1,3,8-triaza-spiro(4,5)decane hydrochloride, melting point 125–137° C. (dec.).

*Example CLX*

To a solution of 4-fluoro-phenyl-magnesiumbromide, prepared in the usual manner starting from 26.5 parts magnesium and 210 parts 4-fluoro-bromobenzene in 320 parts anhydrous ether, is added dropwise a solution of 83 parts ethyl-5-chloro-valeriate in 320 parts anhydrous ether, while refluxing. After the addition is complete, the whole is further stirred and refluxed for another three hours. After cooling the reaction mixture is decomposed with a saturated solution of ammonium chloride and then extracted with ether. The organic layer is dried over potassium carbonate, filtered and evaporated. The oily residue is poured into 400 parts petroleum ether and on scratching a solid precipitate is formed. It is filtered off and dried in an exsiccator, to yield 5-chloro-1,1-di-(4-fluoro-phenyl)-pentanol, melting point 50–55° C.

A mixture of 84 parts 5-chloro-1,1-di-(4-fluorophenyl)-pentanol in 500 parts concentrated hydrochloric acid is stirred and refluxed for five hours. After cooling the reaction mixture is extracted with ether. The etheric layer is dried over calcium chloride, filtered and evaporated. The oily residue is distilled in vacuo, yielding 5-chloro-1,1-di-(4-fluorophenyl)-1-pentene, boiling point 127–142° C. at 0.2 mm. pressure; $n_D^{20}$: 1.5590.

A solution of 40 parts 5-chloro-1,1-di-(4-fluorophenyl)-1-pentene and 200 parts 2-propanol is hydrogenated at normal pressure and at room temperature, in the presence of 5 parts palladium-on-charcoal catalyst 10%. After the calculated amount of hydrogen is taken up, hydrogenation is stopped. The catalyst is filtered off and the filtrate is evaporated. The oily residue is distilled in vacuo, yielding 1-chloro-5,5-di-(4-fluorophenyl)-pentane, boiling point 100–130° C. at 0.2 mm. pressure.

A mixture of 6.43 parts 1-chloro-5,5-di-(4-fluorophenyl)-pentane, 4.6 parts 1-phenyl-4-oxo-1,3,8-triaza-spiro(4,5)decane, 3.18 parts sodium carbonate, a few crystals of potassium iodide in 200 parts 4-methyl-2-pentanone is stirred and refluxed for seventy hours. After cooling the reaction mixture, there are added 100 parts water. The organic layer is separated, dried over potassium carbonate, filtered and evaporated. The oily residue is dissolved in a mixture of 160 parts diisopropylether and 160 parts 2-propanol. This solution is filtered and gaseous hydrogen chloride is introduced into the filtrate. The precipitated solid hydrochloride is filtered off and dried in vacuo overnight at 60° C., yielding 1-phenyl-4-oxo-8-[5,5-di-(4-fluorophenyl)-pentyl]-1,3,8-triaza-spiro(4,5)decane hydrochloride, melting point 265–266° C.

*Example CLXI*

A mixture of 7.3 parts 1-chloro-4,4-di-(4-fluorophenyl)-butane, 6.1 parts 1-phenyl-3-methyl-4-oxo-1,3,8-triaza-spiro(4,5)decane, 7 parts sodium carbonate, a few crystals of potassium iodide in 200 parts of 4-methyl-2-pentanone is stirred and refluxed for two days. After cooling the reaction mixture is decomposed with 250 parts water. The organic layer is separated, dried over potassium carbonate, filtered and evaporated in vacuo. The oily residue is dissolved in diisopropylether and 40 parts acetone are added and then gaseous hydrogen chloride is introduced into this solution. The solid hydrochloride is filtered off, washed with ether and dried, yielding 1-phenyl-3-methyl-4-oxo-8-[4,4-di-(4-fluorophenyl)-butyl]-1,3,8-triaza-spiro(4,5)decane hydrochloride, melting point 232.5–243° C.

*Example CLXII*

To a solution of 3-(trifluoromethyl)-phenyl-magnesiumbromide, prepared from 12 parts magnesium and 117 parts 3-(trifluoromethyl)-phenyl-magnesium bromide in 176 parts anhydrous ether, is added dropwise a solution of 82 parts cyclopropyl-4-fluorophenyl-ketone in 80 parts anhydrous ether (exothermic reaction: reflux temperature is reached). After the addition is complete, the whole is further stirred and refluxed for another two hours. After cooling, the reaction mixture is decomposed with ammonium chloride solution 25% at a temperature below 20° C. and then extracted with ether. The organic layer is dried over potassium carbonate, filtered and evaporated. The oily residue is distilled in vacuo, yielding dl-cyclopropyl-4-fluorophenyl-3-trifluoromethylphenyl-carbinol, boiling point 145–150° C. at 1.5–2 mm. pressure.

To a solution of 103.4 parts dl-cyclopropyl-4-fluorophenyl-3-trifluoromethylphenyl-carbinol in 160 parts anhydrous benzene are added dropwise 48 parts thionylchloride (exothermic reaction: temperature rises to about 40° C.). After the addition is complete, the whole is further stirred and refluxed for three hours and thirty minutes. The reaction mixture is filtered and the filtrate is evaporated. The oily residue is distilled in vacuo, yielding 4-chloro-1-(4-fluorophenyl)-1-(3-trifluoromethylphenyl)-1-butene, boiling point 140–145° C. at 0.8 mm. pressure; $n_D^{20}$: 1.5355; $d_{20}^{20}$: 1.2750.

A mixture of 82 parts 4-chloro-1-(4-fluorophenyl)-1-(3-trifluoromethylphenyl)-1-butene and 320 parts 2-propanol is hydrogenated at normal pressure and at room temperature in the presence of 5 parts palladium-on-charcoal catalyst 10%. After the calculated amount of hydrogen is taken up hydrogenation is stopped. The catalyst is filtered off and the filtrate is evaporated. The oily residue is fractionated yielding dl-1-chloro-4-(4-fluorophenyl)-4-(3-trifluoromethylphenyl)-butane, boiling point 140–145° C. at 0.6 mm. pressure, $n_D^{20}$: 1.5132; $d_{20}^{20}$: 1.2642.

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 8.7 parts dl-1-chloro-4-(4-fluorophenyl)-4-(3-trifluoromethylphenyl)-butane in 24 parts 4-methyl-2-pentanone. After the addition is complete, the whole is further stirred and refluxed for another forty-eight hours. After cooling the reaction mixture, there are added 150 parts water. The organic layer is separated, dried over potassium carbonate and evaporated. The oily residue is dissolved in diisopropylether and gaseous hydrogen chloride is introduced into this solution. The solid precipitated hydrochloride is filtered off and recrystallized from a boiling mixture of 2-propanol and methanol, yielding dl-1-phenyl-4-oxo-8-[4-(4-fluorophenyl)-4-(3-trifluoromethylphenyl)-butyl]-1,3,8-triaza-spiro(4,5)decane hydrochloride, melting point 247–248° C.

*Example CLXIII*

A solution of 3-trifluoromethylphenyl-magnesiumbromide, prepared in the usual manner starting from 12.7 parts magnesium and 112.6 parts 3-bromo-benzotrifluoride in 160 parts anhydrous ether, is added dropwise a solution of 26 parts ethyl-cyclopropane carboxylate in 80 parts anyhydrous ether, while refluxing. After the addition is complete, the whole is further stirred and refluxed for another two hours. The reaction mixture is cooled and decomposed by successive addition of 300 parts crushed ice and a solution of ammoniumchloride. The organic layer is separated, dried over magnesium sulfate and evaporated. The oily residue is distilled in vacuo, yielding cyclopropyl-di-(3-trifluoromethylphenyl)-carbinol, boiling point 137–139° C. at 1.5 mm. pressure.

A mixture of 24 parts cyclopropyl-di-(3-trifluoromethylphenyl)-carbinol and 100 parts of a hydrobromic acid solution 48% is stirred for three hours at room temperature and then heated for one hour at a temperature of about 80–90° C. The reaction mixture is stirred overnight at room temperature. The whole is diluted with ether. The organic layer is washed with a solution of sodium hydrogen carbonate and then with water. The ether is then dried over magnesium sulfate and evaporated. The oily residue is distilled in vacuo, yielding 4-bromo-1,1-di-(3-trifluoromethylphenyl)-1-butene, boiling point 145–147° C. at 0.8 mm. pressure.

A solution of 50 parts 4-bromo-1,1-di-(3-trifluoromethylphenyl)-1-butene in 200 parts 2-propanol is hydrogenated at normal pressure and at a temperature of about 30° C. in the presence of 3 parts palladium-on-charcoal catalyst 10%. After the calculated amount of hydrogen is taken up, hydrogenation is stopped. The catalyst is filtered off and the filtrate is evaporated. The oily residue is distilled in vacuo, yielding 1-bromo-4,4-di-(3-trifluoromethylphenyl)-butane, boiling point 144–146° C. at 0.4 mm. pressure.

A mixture of 11 parts 1-bromo-4,4-di-(3-trifluoromethylphenyl)-butane, 5.1 parts 1-phenyl-4-oxo-1,3,8-triaza-spiro(4,5)decane, 7 parts sodium carbonate, a few crystals of potassium iodide in 200 parts 4-methyl-2-pentanone is stirred and refluxed for sixty hours. After cooling the reaction mixture, 100 parts water are added. The organic layer is separated, dried over sodium carbonate and evaporated. The residue is dissolved in 240 parts diisopropylether and this solution is saturated with gaseous hydrogen chloride. The precipitated solid hydrochloride is filtered off, recrystallized from a mixture of 80 parts 2-propanol and 80 parts acetone, filtered off again and dried, yielding two fractions: respectively a first fraction of 1-phenyl-4-oxo-8-[4,4-di-(3-trifluoromethyl-phenyl)-butyl]-1,3,8-triaza-spiro(4,5)-decane hydrochloride, melting point 243.5–248.5° C. and a second fraction of 1-phenyl-4-oxo-8-[4,4-di-(3-trifluoromethylphenyl)-butyl]-1,3,8-triaza-spiro(4,5)decane hydrochloride, melting point 246–249° C.

*Example CLXIV*

To a solution of 4-fluoro-phenyl-magnesium bromide prepared in the usual manner from 24.3 parts magnesium and 192.5 parts 4-fluoro-bromobenzene in 400 parts anhydrous ether, is added dropwise a solution of 152 parts cyclopropyl-2-thienyl ketone in 400 parts anhydrous ether. After the addition is complete, the whole is stirred and refluxed for three hours. After cooling the reaction mixture is decomposed with 1700 parts ammonium chloride solution 20%. The organic layer is separated, washed once more with water, dried over sodium sulfate and evaporated. The oily residue is distilled in vacuo, yielding dl-cyclopropyl-4-fluorophenyl-2-thienyl-carbinol, boiling point 138–140° C. at 1 mm. pressure, $n_D^{20}$: 1.5777; $d_{20}^{20}$: 1.2296.

To a stirred solution of 120 parts dl-cyclopropyl-4-fluorophenyl-2-thienyl-carbinol in 2880 parts 1,4-dioxane are added 2160 parts perchloric acid in the course of 15 minutes (slightly exothermic reaction: temperature rises to about 30° C.). After the addition is complete, the whole is stirred at room temperature for six hours. Then there are added 2400 parts diisopropylether and the whole is neutralized with about 450 parts sodium hydrogen carbonate. The organic layer is separated, dried over magnesium sulfate and evaporated yielding 4-(4-fluorophenyl)-4-(2-thienyl)-but-3-en-1-ol, as an oily residue.

To a suspension of 11.4 parts lithium tetrahydroaluminate in 200 parts anhydrous benzene and 200 parts tetrahydrofurane is added dropwise a solution of 116 parts 4-(4-fluorophenyl)-4-(2-thienyl)-but-3-en-1-ol in 280 parts anhydrous benzene and 280 parts tetrahydrofurane. After the addition is complete, the whole is stirred and refluxed overnight. After cooling the reaction mixture is decomposed with 200 parts water and diluted sulfuric acid. The organic layer is separated, washed once more with 500 parts water, dried over magnesium sulfate and evaporated, to yield an oily residue which is distilled in vacuo, yielding dl - 4 - (4-fluorophenyl)-4-(2-thienyl)-butanol, boiling point 147–156° C. at 0.2–0.3 mm. pressure.

To a solution of 80 parts dl-4-(4-fluorophenyl)-4-(2-thienyl)-butanol in 200 parts anhydrous benzene are added portionwise 40 parts thionylchloride (slightly exothermic reaction: the temperature rises to 35° C.). After the addition is complete, the whole is stirred and refluxed for one and a half hour. After cooling, the reaction mixture is washed with a saturated solution of sodium hydrogen carbonate until neutral. The benzene layer is dried over magnesium sulfate and evaporated. The oily residue is distilled in vacuo, to yield dl-1-chloro-4-(4-fluorophenyl)-4-(2-thienyl)-butane, boiling point 140–142° C. at 0.4 mm. pressure, $n_D^{20}$: 1.5647.

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 7 parts dl - 1 - chloro-4-(4-fluorophenyl)-4-(2-thienyl)-butane in 24 parts 4-methyl-2-pentanone. After the addition is complete, the whole is stirred and refluxed for another forty-eight hours. After cooling the reaction mixture, there are added 150 parts water. The undissolved part is filtered off and recrystallized from 64 parts 4-methyl-2-pentanone. After cooling to room temperature for three hours, the solid is filtered off and dried in vacuo, yielding dl-1-phenyl-4-oxo-8-[4-(4-fluorophenyl)-4-(2-thienyl)-butyl]-1,3,8-triaza-spiro(4,5)decane, melting point 202–203° C.

*Example CLXV*

To a solution of 4-fluoro-benzyl-magnesiumchloride, prepared in the usual manner starting from 24 parts magnesium and 145 parts 4-fluoro-benzylchloride in 320 parts anhydrous ether, is added dropwise a solution of 146 parts cyclopropyl-phenyl-ketone in 160 parts anhydrous ether. After the addition is complete, the whole is stirred and refluxed for one hour. After cooling the reaction mixture is decomposed with 300 parts of a 20% ammonium chloride solution (exothermic reaction) and extracted with ether. The organic layers are dried over sodium sulfate, filtered and evaporated. The residue is distilled in vacuo, yielding dl-1-cyclopropyl-2-(4-fluorophenyl)-1-phenyl-ethanol, boiling point 160–170° C. at 0.8 mm. pressure.

To a solution of 108 parts dl-1-cyclopropyl-2-(4-fluorophenyl)-1-phenyl-ethanol in 350 parts benzene are added portionwise 100 parts thionylchloride (slightly exothermic reaction: the temperature rises to 35° C.). After the addition is complete, the whole is stirred and refluxed for ten hours. The dark coloured reaction mixture is evaporated. The oily residue is distilled in vacuo, yielding a first fraction of 5-chloro-1-(4-fluorophenyl)-2-phenyl-2-pentene, boiling point 165–170° C. at 0.4 mm. pressure and a second fraction of 5-chloro-1-(4-fluorophenyl)-2-phenyl-2-pentene, boiling point 170–172° C. at 0.4 mm. pressure.

A solution of 22 parts 5-chloro-1-(4-fluorophenyl)-2-phenyl-2-pentene in 160 parts 2-propanol is hydrogenated at normal pressure and at a temperature of about 40° C., in the presence of 3 parts palladium-on-charcoal catalyst 10%. After the calculated amount of hydrogen is taken up, hydrogenation is stopped. The catalyst is filtered off and the filtrate is evaporated. The oily residue is distilled in vacuo, yielding dl-1-chloro-5-(4-fluorophenyl)-4-phenyl-pentane, boiling point 145–150° C. at 0.8 mm. pressure.

A mixture of 6.2 parts dl-1-chloro-5-(4-fluorophenyl)-4-phenyl-pentane, 4.6 parts 1-phenyl-4-oxo-1,3,8-triaza-spiro(4,5)decane, 3.18 parts sodium carbonate, a few crystals of potassium iodide in 200 parts 4-methyl-2-pentanone is stirred and refluxed for seventy hours. After cooling the reaction mixture, there are added 100 parts water. After keeping for three hours at room temperature, the solid precipitate is filtered off and recrystallized from 120 parts 4-methyl-2-pentanone. After keeping overnight at room temperature, the solid is filtered off and dried in vacuo, yielding 2.3 parts dl-1-phenyl-4-oxo-8-[5-(4-fluorophenyl) - 4 - phenyl-pentyl]-1,3,8-triaza-spiro(4,5)decane, melting point 191–193.5° C.

*Example CLXVI*

To a solution of 4-fluorophenyl-magnesiumchloride, prepared in the usual manner starting from 24 parts magnesium and 145 parts 4-fluoro-benzylchloride in 160 parts anhydrous ether, is added dropwise a solution of 164 parts cyclopropyl-4-fluoro-phenylketone in 240 parts anhydrous ether. After the addition is complete, the whole is stirred and refluxed for one hour. After cooling the reaction mixture is decomposed with a ammoniumchloride solution and extracted with ether. The organic layer is separated, dried over potassium carbonate, filtered and evaporated. The oily residue is distilled in vacuo, yielding a crude product. This fraction is redistilled in vacuo, whereafter two fractions are obtained: a first fraction of dl-1-cyclopropyl-1,2-di-(4-fluorophenyl)-ethanol, boiling point 120–128° C. at 0.09 mm. pressure and a second fraction of dl-1-cyclopropyl-1,2-di-(4-fluorophenyl)-ethanol, boiling point 140–145° C. at 0.6 mm. pressure.

To a solution of 145 parts dl-1-cyclopropyl-1,2-di-(4-fluorophenyl)-ethanol in 320 parts anhydrous benzene are added portionwise 134 parts thionylchloride. After the addition is complete, the whole is stirred and refluxed for eight hours. After cooling the solvent is evaporated. The oily residue is distilled in vacuo, yielding 5-chloro-1,2-di-(4-fluorophenyl)-2-pentene, boiling point 144–146° C. at 0.6 mm. pressure.

A solution of 33 parts 5-chloro-1,2-di-(4-fluorophenyl)-2-pentene in 240 parts methanol is hydrogenated at normal pressure and at a temperature of about 35–40° C. in the presence of 5 parts palladium-on-charcoal catalyst 10%. After the calculated amount of hydrogen is taken up, hydrogenation is stopped. The catalyst is filtered off and the filtrate is evaporated. The oily residue is distilled in vacuo, yielding dl-1-chloro-4,5-di-(4-fluoro-phenyl)-pentane, boiling point 114–129° C. at 0.1 mm. pressure.

To a stirred and refluxing mixture of 3.9 parts 1-phenyl-4-oxo-1,3,8-triaza-spiro(4,5)decane, 2.7 parts sodium carbonate, a few crystals of potassium iodide in 160 parts 4-methyl-2-pentanone is added dropwise a solution of 7.25 parts dl-1-chloro-4,5-di-(4-fluorophenyl)-pentane in 40 parts 4-methyl-2-pentanone. After the addition is complete, the whole is stirred and refluxed for forty-eight hours. After cooling the reaction mixture, there are added 50 parts water. The organic layer is separated, dried over potassium carbonate, filtered and evaporated. The solid residue is recrystallized from 40 parts acetone, filtered off again and dried, yielding a first fraction of dl-1-phenyl-4-oxo-8-[4,5-di-(4 - fluorophenyl)-pentyl]-1,3,8-triaza-spiro(4,5)decane, melting point 136–141° C. After further cooling the mother liquor at room temperature, a second fraction of dl-1-phenyl-4-oxo-8-[4, 5-di-(4-fluorophenyl)-pentyl]-1,3,8 - triaza - spiro(4,5) decane is obtained, melting point 141–143° C.

*Example CLXVII*

A mixture of 5.6 parts 5-chloro-1,1-diphenyl-1-pentene, 4.6 parts 1-phenyl-4-oxo-1,3,8-triaza-spiro(4,5) decane, 3.2 parts sodium carbonate and a few crystals of potassium iodide in 200 parts 4-methyl-2-pentanone is stirred and refluxed for seventy hours. After cooling to room temperature, there are added 70 parts water. The undissolved part is filtered off and recrystallized twice from 120 parts 4-methyl-2-pentanone. After keeping for one hour at room temperature, 1-phenyl-4-oxo-8-(5,5-diphenyl-4-pentenyl)-1,3,8 - triaza-spiro(4,5)decane is obtained, melting point 195.5–197° C.

*Example CLXVIII*

A mixture of 6.5 parts 4-chloro-1-(4-methylphenyl)-1-phenyl-1-butene, 5.1 parts 1-phenyl-4-oxo-1,3,8-triaza-spiro(4,5)decane, 7 parts sodium carbonate, a few crystals of potassium iodide in 200 parts 4-methyl-2-pentanone is stirred and refluxed for forty-eight hours. After cooling there are added 150 parts water. The organic layer is separated, dried over potassium carbonate and evaporated. The oily residue is dissolved in a mixture of 64 parts diisopropylether and 24 parts 4-methyl-2-pentanone. After cooling to −15° C., the precipitated solid is filtered off and dried in vacuo, yielding 1-phenyl-4-oxo-8-[4-(4-methylphenyl) - 4 - phenyl-3-butenyl]-1,3,8-triaza-spiro(4,5)decane, melting point 165–177° C.

On further keeping the mother liquor overnight at room temperature, a second fraction of 1-phenyl-4-oxo-8-[4-(4-methylphenyl)-4-phenyl - 3 - butenyl] - 1,3,8-triaza-spiro(4,5)decane is obtained, melting point 174.5–188° C.

*Example CLXIX*

To a stirred and refluxing mixture of 4.6 parts 1-phenyl-4-oxo-1,3,8-triaza-spiro(4,5)decane, 5.3 parts sodium carbonate, a few crystals of potassium iodide in 160 parts 4-methyl-2-pentanone is added dropwise a solution of 6 parts 4-chloro-1-(4-methoxyphenyl)-1-phenyl-1-butene in 40 parts 4-methyl-2-pentanone. After the addition is complete, the whole is further stirred and refluxed for another seventy-two hours. After cooling to room temperature, 50 parts water are added. The organic layer is separated, dried over potassium carbonate, filtered and evaporated. The solid residue is triturated in a mixture of 40 parts diisopropylether and 32 parts acetone, yielding 1-phenyl-4-oxo-8-[4-(4-methoxyphenyl)-4-phenyl - 3 - butenyl]-1,3,8-triaza-spiro(4,5)decane, melting point 169–173° C.

*Example CLXX*

A mixture of 6.7 parts 4-chloro-1-(4-fluorophenyl)-1-phenyl-1-butene, 5.1 parts 1-phenyl-4-oxo-1,3,8-triaza-spiro(4,5)decane, 7 parts sodium carbonate, a few crystals of potassium iodide in 160 parts 4-methyl-2-pentanone is stirred and refluxed for two days. After cooling, there are added 300 parts water. The organic layer is separated, dried over potassium carbonate, filtered and evaporated. The residue is recrystallized from 4-methyl-2-pentanone, yielding 1-phenyl-4-oxo-8-[4-(4-fluorophenyl)-4-phenyl - 3 - butenyl]-1,3,8-triaza-spiro(4,5)decane, melting point 180–184° C.

*Example CLXXI*

A mixture of 6 parts 5-chloro-1-(4-fluorophenyl)-1-phenyl-1-pentene, 4.6 parts 1-phenyl-4-oxo-1,3,8-triaza-spiro(4,5)decane, 3.2 parts sodium carbonate, a few crystals of potassium iodide in 200 parts 4-methyl-2-pentanone is stirred and refluxed for seventy hours. After cooling the reaction mixture, 70 parts water are added. The undissolved precipitate is filtered off, dried and then recrystallized from 160 parts 4-methyl-2-pentanone, to yield 1 - phenyl-4-oxo-8-[5-(4-fluorophenyl)-5-phenyl-4- pentenyl] - 1,3,8 - triaza-spiro(4,5)decane, melting point 197–198.5° C.

Example CLXXII

To a solution of 3-trifluoromethyl-phenyl-magnesium-bromide, prepared from 13 parts magnesium, 125 parts 3-bromo-benzotrifluoride in 480 parts anhydrous ether, is added dropwise a solution of 73 parts cyclopropyl-phenyl-ketone in 400 parts anhydrous ether (exothermic reaction: the reflux temperature is maintained). After the addition is complete, the whole is further stirred and refluxed for one hour. The reaction mixture is cooled into ice water. The whole is decomposed with ammonium chloride solution. The organic layer is separated, dried over magnesium sulfate and evaporated. The oily residue is distilled in vacuo, yielding dl-cyclopropyl-phenyl-3-trifluoromethylphenyl-carbinol, boiling point 144–146° C. at 2.5 mm. pressure.

To a solution of 10.5 parts dl-cyclopropyl-phenyl-3-trifluoromethylphenyl-carbinol in 200 parts anhydrous benzene are added dropwise 60 parts thionylchloride, while heating the whole to a temperature of 50° C. After the addition is complete, the whole is further stirred and refluxed for eight hours. The solvent is evaporated and the oily residue is distilled in vacuo, yielding 4-chloro-1-phenyl-1-(3-trifluoromethylphenyl) - 1 - butene, boiling point 138–139° C. at 0.6 mm. pressure; $n_D^{20}$, 1.5470; $d_{20}^{20}$: 1.2255.

A mixture of 8 parts 4-chloro-1-phenyl-1-(3-trifluoromethylphenyl)-1-butene, 5.1 parts 1-phenyl-4-oxo-1,3,8-triaza-spiro(4,5)decane, 7 parts sodium carbonate, a few crystals of potassium iodide in 200 parts 4-methyl-2-pentanone is stirred and refluxed for sixty hours. After cooling the reaction mixture, there are added 50 parts water. The organic layer is separated, dried over magnesium sulfate and evaporated. The solid residue is recrystallized from 60 parts 4-methyl-2-pentanone, yielding a first fraction of 1-phenyl-4-oxo-8-[4-phenyl-4-(3-trifluoromethylphenyl)-3-butenyl]-1,3,8-triaza-spiro(4,5)decane, melting point 179.5–185.5° C.

The mother liquor is diluted with 60 parts diisopropylether and after keeping at room temperature, a second fraction is obtained, mainly a mixture of the free base and the mono-hydrochloride. This crop is stirred in sodium hydroxide solution and then extracted with chloroform. The organic layer is dried over sodium sulfate and evaporated. The solid residue is recrystallized from 4-methyl-2-pentanone, yielding a second pure fraction of 1-phenyl-4-oxo-8-[4-phenyl-4-(3-trifluoromethylphenyl) - 3 - butenyl]-1,3,8-triaza-spiro(4,5)decane, melting point 158–164° C.

Example CLXXIII

To a solution of 4-methyl-phenyl-magnesiumbromide, prepared in the usual manner starting from 12.2 parts magnesium and 102.6 parts 4-methyl-bromobenzene in 320 parts anhydrous ether, is added dropwise a solution of 28.5 parts ethyl-cyclopropane carboxylate in 200 parts anhydrous ether, while refluxing. After the addition is complete, the whole is stirred and refluxed for another two hours. After cooling, the reaction mixture is decomposed with 1000 parts ammonium chloride solution. The organic layer is separated, dried over magnesium sulfate, filtered and evaporated. The oily residue is distilled in vacuo, yielding cyclopropyl-di-(4-methylphenyl)-carbinol, boiling point 171–175° C. at 1.5 mm. pressure.

To a solution of 44 parts cyclopropyl-di-(4-methylphenyl)-carbinol in 80 parts anhydrous benzene are added portionwise 14 parts thionylchloride (exothermic reaction: the temperature rises to 63° C.). After the addition is complete, the whole is further stirred and refluxed for one hour and a half. The solvent is evaporated. The oily residue is dissolved in 160 parts toluene and this solution is evaporated again. The oily residue is distilled in vacuo, yielding 4-chloro-1,1-di-(4-methylphenyl)-1-butene, boiling point 162–164° C. at 0.6 mm. pressure; $n_D^{20}$: 1.5907.

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 7 parts 4-chloro-1,1-di-(4-methylphenyl)-1-butene in 24 parts 4-methyl-2-pentanone. After the addition is complete the whole is further stirred and refluxed for forty-eight hours. After cooling the reaction mixture to room temperature, there are added 150 parts water. The whole is then filtered and the obtained solid is recrystallized from 80 parts 4-methyl-2-pentanone, to yield 1-phenyl-4-oxo-8-[4,4-di-(4-methylphenyl)-3-butenyl] - 1,3, 8-triaza-spiro(4,5)decane, melting point 183–184° C.

Example CLXXIV

To a solution of 4-methoxyphenyl-magnesiumbromide, prepared in the usual manner starting from 26.5 parts magnesium and 187 parts 4-methoxy-bromobenzene in 320 parts anhydrous ether, is added dropwise a solution of 52 parts ethyl-cyclopropylcarboxylate in 160 parts anhydrous ether, while allowing the mixture to reflux. The reflux-temperature is maintained for two hours after the addition is complete. The mixture is then poured onto 500 parts of ice and 150 parts concentrated hydrochloric acid are added to the mixture. The organic layer is separated and dried on magnesium sulfate. The solvent is evaporated and the oily residue is distilled in vacuo, yielding 4-chloro-1,1-di-(4-methoxyphenyl)-1-butene, boiling point 210–212° C. at 1 mm. pressure.

A mixture of 7.8 parts 4-chloro-1,1-di-(4-methoxyphenyl)-1-butene, 5.1 parts 1-phenyl-4-oxo-1,3,8-triaza-spiro(4,5)decane, 7 parts sodium carbonate, a few crystals of potassium iodide in 200 parts 4-methyl-2-pentanone is stirred and refluxed for sixty hours. After cooling the reaction mixture, there are added 100 parts water. The organic layer is separated, dried over potassium carbonate and evaporated. The residue is dissolved in 200 parts 2-propanol and gaseous hydrogen chloride is introduced into this solution. The precipitated hydrochloride is filtered off and dried, yielding 1-phenyl-4-oxo-8-[4,4-di-(4-methoxyphenyl)-3-butenyl] - 1,3,8 - triaza-spiro(4,5) decane hydrochloride, melting point 221–228° C.

Example CLXXV

To a solution of 4-fluorophenyl-magnesiumbromide, prepared in the usual manner starting from 12.2 parts magnesium and 96.2 parts 4-fluoro-bromobenzene in 280 parts anhydrous ether, is added dropwise a solution of 88 parts cyclopropyl-4-methoxyphenyl-ketone in 280 parts anhydrous ether. After the addition is complete, the whole is refluxed for two and a half hours. The reaction mixture is decomposed with 1000 parts of a saturated solution of ammonium chloride. The so obtained suspension is filtered and from the filtrate the organic layer is separated. The aqueous layer is extracted with 240 parts ether. The combined etheric layers are dried over sodium sulfate and evaporated. The oily residue is distilled in vacuo, to yield the crude product. This crop is redistilled to yield dl-cyclopropyl-4-fluorophenyl-4-methoxyphenyl-carbinol, boiling point 138–142° C. at 0.2–0.3 mm. pressure; $n_D^{20}$: 1.5697.

To a stirred solution of 65.8 parts of dl-cyclopropyl-4-fluorophenyl-4-methoxyphenyl-carbinol in 160 parts anhydrous benzene are added dropwise 35 parts thionylchloride. The reaction is exothermic. The mixture is cooled on the water-bath, in order to keep the temperature below 30° C. After the addition is complete, the mixture is stirred and refluxed for ninety minutes. The organic layer is then evaporated. The oily residue is distilled in vacuo. This crude fraction is redistilled in vacuo, yielding 4-chloro-1-(4-fluorophenyl)-1-(4-methoxyphenyl)-1-butene, boiling point 162–165° C. at 0.4 mm. pressure.

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 7.5 parts 4-chloro-1-(4-fluorophenyl)-1-(4-methoxyphenyl)-1-butene in 24 parts 4-methyl-2-pentanone. After the addition is complete, the whole is further stirred and refluxed for forty-eight hours. After cooling the reaction mixture, there are added 150 parts water. The organic layer is separated, dried over potassium carbonate and evaporated. The oily residue is dissolved in 64 parts 4-methyl-2-pentanone and this solution is diluted with 240 parts diisopropylether. The whole is filtered several times until clear and then gaseous hydrogen chloride is introduced into the filtrate. The precipitated hydrochloride is filtered off and recrystallized from 72 parts methanol. After cooling to 0° C., the solid is filtered off and dried, yielding 1 - phenyl - 4 - oxo - 8 - [4 - (4 - fluorophenyl)-4 - (4 - methoxyphenyl) - 3 - butenyl] -1,3,8 - triaza-spiro(4,5)decane hydrochloride, melting point 242–244° C.

Example CLXXVI

A mixture of 7.2 parts 4-chloro-1,1-di-(4-fluorophenyl)-1-butene, 5.1 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for sixty hours. After cooling the reaction mixture is treated with water. The organic layer is separated, dried, filtered and evaporated. The solid residue is recrystallized from 80 parts 4-methyl-2-pentanone, yielding 1-phenyl-4-oxo-8-[4,4-di-(4-fluorophenyl)-3-butenyl]-1,3,8-triaza-spiro(4,5)decane, melting point 189.5–193° C.

Example CLXXVII

To a solution of 4-fluorophenyl-magnesiumbromide, prepared from 22 parts magnesium and 157.5 parts 4-fluoro-bromobenzene in 400 parts anhydrous ether is added dropwise a solution of 154 parts 4-chlorophenyl-cyclopropyl-ketone in 400 parts anhydrous ether, while refluxing. After the addition is complete, the whole is further stirred and refluxed for two hours. After cooling the reaction mixture is stirred fourteen hours at room temperature. The whole is then decomposed with 1400 parts of a saturated ammonium chloride solution. The organic layer is separated, dried over sodium sulfate, filtered and evaporated. The oily residue is distilled in vacuo, yielding 159 parts dl-4-chlorophenyl-cyclopropyl-4-fluorophenyl-carbinol, boiling point 148–155° C. at 0.6 mm. pressure; $n_D^{20}$: 1.5787; $d_{20}^{20}$: 1.2425.

41 parts dl-4-chlorophenyl-cyclopropyl-4-fluorophenyl-carbinol are dissolved in 40 parts benzene while stirring. To this solution are added dropwise 20 parts thionylchloride, while cooling with ice-water to keep the temperature below 15° C. After the addition is complete, the whole is stirred and refluxed for one hour. After cooling the reaction mixture is evaporated. The residue is dissolved in 160 parts benzene and evaporated again. This treatment is repeated once more, yielding 4-chloro-1-(4-chlorophenyl)-1-(4-fluorophenyl)-1-butene as an oily residue; $n_D^{20}$: 1.5903; $d_{20}^{20}$: 1.2361.

A mixture of 6.5 parts 4-chloro-1-(4-chlorophenyl)-1-(4-fluorophenyl)-butene, 5.1 parts 1-phenyl-4-oxo-1,3,8-triaza-spiro(4,5)decane, 7 parts sodium carbonate, a few crystals of potassium iodide in 200 parts 4-methyl-2-pentanone is stirred and refluxed for two days. After cooling the reaction mixture, 200 parts water are added. The organic layer is separated, dried over potassium carbonate, filtered and evaporated. The oily residue is dissolved in a mixture of diisopropylether and acetone and gaseous hydrogen chloride is introduced into this solution. The precipitated solid hydrochloride is filtered off, washed with ether and dried, yielding the crude product. This crop is recrystallized twice: first from a mixture of 80 parts acetone and 200 parts 2-propanol and then from 120 parts 2-propanol, yielding 1 - phenyl - 4 - oxo - 8 - [4 - (4-chlorophenyl) - 4 - (4 - fluorophenyl) - 3 - butenyl] - 1,3,8-triaza-spiro(4,5)decane hydrochloride, melting point 252–253° C.

Example CLXXVIII

A mixture of 11 parts 4-bromo-1,1-di-(3-trifluoromethylphenyl)-1-butene, 5.1 parts 1-phenyl-4-oxo-1,3,8-triaza-spiro(4,5)decane, 7 parts sodium carbonate, a few crystals of potassium iodide in 200 parts 4-methyl-2-pentanone is stirred and refluxed for sixty hours. After cooling the reaction mixture, there are added 100 parts water. The organic layer is separated, dried over sodium sulfate and evaporated. The solid residue is recrystallized from 80 parts diisopropylether. After cooling to room temperature, yielding 1-phenyl-4-oxo-8-[4,4-di-(3-trifluoromethylphenyl)-3-butenyl]-1,3,8-triaza-spiro(4,5)decane, melting point 133–135° C.

The mother liquor is saturated with gaseous hydrogen chloride. The solid hydrochloride is filtered off and boiled in 80 parts acetone. The solid is filtered off while hot and dried, yielding the crude salt: 1-phenyl-4-oxo-8-[4,4 - di - (3 - trifluoromethylphenyl) - 3 - butenyl] - 1,3,8-triaza-spiro(4,5)decane hydrochloride, melting point 211–228° C. From the acetone-filtrate a second fraction is obtained, yielding 1-phenyl-4-oxo-8-[4,4-di-(3-trifluoromethylphenyl) - 3-butenyl]-1,3,8-triaza-spiro(4,5)decane hydrochloride, melting point 233–237.5° C.

Example CLXXIX

A mixture of 6.4 parts 5-chloro-1,1-di-(4-fluorophenyl)-1-pentene, 4.6 parts 1-phenyl-4-oxo-1,3,8-triaza-spiro(4,5)decane, 3.2 parts sodium carbonate, a few crystals of potassium iodide in 200 parts 4-methyl-2-pentanone is stirred and refluxed for seventy hours. After cooling the reaction mixture, there are added 70 parts water. The organic layer is separated, dried over potassium carbonate, filtered and evaporated. The oily residue is dissolved in diisopropylether and evaporated again. The solid residue is recrystallized from 48 parts 4-methyl-2-pentanone to yield 1-phenyl-4-oxo-8-[5,5-di-(4-fluorophenyl)-4 - pentenyl]-1,3,8-triaza-spiro(4,5)decane, melting point 154–158° C.

Example CLXXX

To a stirred and refluxing mixture of 4.1 parts 1-phenyl-4-oxo-1,3,8-triaza-spiro(4,5)decane, 5.7 parts sodium carbonate, a few crystals of potassium iodide in 136 parts 4-methyl-2-pentanone is added dropwise a solution of 6.6 parts 4-chloro-1-(4-fluorophenyl) - 1 - (3-trifluoromethylphenyl)-1-butene in 24 parts 4-methyl-2-pentanone. After the addition is complete, the whole is stirred and refluxed for another forty-eight hours. After cooling the reaction mixture, there are added 150 parts water. The organic layer is separated, dried over potassium carbonate and evaporated. The oily residue is dissolved in a mixture of diisopropylether and acetone and gaseous hydrogen chloride is introduced into this solution. The solid hydrochloride is filtered off and recrystallized from 72 parts 2-propanol. After keeping at room temperature, the solid is filtered off and dried, yielding 1-phenyl-4-oxo-8[4-(4-fluorophenyl)-4-(3-trifluoromethylphenyl) - 3 - butenyl]-1,3,8-triaza-spiro(4,5)decane hydrochloride, melting point 226–229° C.

Example CLXXXI

To a stirred and refluxing mixture of 5.1 parts 1-phenyl-4-oxo-1,3,8 - triaza - spiro(4,5)decane, 7 parts sodium carbonate, a few crystals of potassium iodide in 136 parts 4-methyl-2-pentanone is added dropwise a solution of 7.1 parts 4-chloro-1-(4-fluorophenyl)-1-(4-methylphenyl) - 1-butene in 24 parts 4-methyl-2-pentanone. After the addition is complete, the whole is further stirred and refluxed for another forty-eight hours. After cooling the reaction mixture, there are added 150 parts water. The organic layer is separated, dried over potassium carbonate and evaporated. The oily residue is dissolved in a mixture of 40 parts diisopropylether and 24 parts 4-methyl-2-pentanone. After cooling to −15° C., the formed precipitate is filtered off and dried in vacuo, to yield the crude product. This fraction is recrystallized from 36 parts boiling 4-methyl-2-pentanone. After cooling to room temperature, the formed precipitate is filtered off and dried in vacuo, yielding 1-phenyl-4-oxo-8-[4-(4-fluorophenyl)-4-(4-methylphenyl) - 3 - butenyl] -1 ,3,8 - triaza-spiro(4,5)decane, melting point 163–166° C.

Example CLXXXII

To a solution of 4-fluorophenyl-magnesiumbromide, prepared in the usual manner starting from 24.3 parts magnesium and 192.5 parts 4-fluoro-bromobenzene in 400 parts anhydrous ether, is added dropwise a solution of 152 parts cyclopropyl-2-thienyl-ketone in 400 parts anhydrous ether. After the addition is complete, the whole is stirred and refluxed for three hours. After cooling the reaction mixture is decomposed with 1700 parts ammonium chloride solution 20%. The organic layer is separated, washed once more with water, dried over sodium sulfate and evaporated. The oily residue is distilled in vacuo, yielding dl-cyclopropyl-4-fluorophenyl-2-thienyl-carbinol, boiling point 138–140° C. at 1 mm. pressure; $n_D^{20}$: 1.5777; $d_{20}^{20}$: 1.2296.

To a solution of 38 parts dl-cyclopropyl-4-fluorophenyl-2-thienyl-carbinol in 80 parts anhydrous benzene are added dropwise 20 parts thionylchloride while cooling with ice-water to keep the temperature below 15° C. After the addition is complete, the whole is stirred and refluxed for two hours. After cooling, the organic layer is washed with a saturated sodium hydrogen carbonate solution until neutral, further dried over sodium sulfate and evaporated. The residue is distilled in vacuo, yielding 4-chloro-1-(4-fluorophenyl)-1-(2-thienyl)-1-butene, boiling point 150–160° C. at 0.6 mm. pressure.

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 6.9 parts 4-chloro-1-(4-fluorophenyl)-1-(2-thienyl)-1 - butene in 24 parts 4-methyl-2-pentanone. After the addition is complete, the whole is stirred and refluxed for another forty-eight hours. After cooling the reaction mixture, 150 parts water are added. The organic layer is separated, dried over potassium carbonate and evaporated. The oily residue is dissolved in a mixture of 40 parts acetone and 200 parts diisopropylether and gaseous hydrogen chloride is introduced into this solution. The precipitated solid hydrochloride is filtered off and dried in vacuo, yielding 7.8 parts of the crude product. This fraction is dissolved in 56 parts warm methanol and the solution is boiled with activated charcoal. The whole is filtered and after cooling the filtrate to room temperature, the solid is filtered off and dried in vacuo, yielding 1-phenyl-4-oxo-8-[4 - (4-fluorophenyl)-4-(2-thienyl)-3-butenyl] - 1,3,8 - triaza - spiro(4,5)decane hydrochloride, melting point 236–244° C.

Example CLXXXIII

To a stirred mixture of 4.6 parts 1-phenyl-4-oxo-1,3,8-triaza-spiro(4,5)decane, 3.2 parts sodium carbonate, a few crystals of potassium iodide in 160 parts 4-methyl-2-pentanone is added dropwise a solution of 6.1 parts 5-chloro-1-(4-fluorophenyl)-2-phenyl-2-pentene in 40 parts 4-methyl-2-pentanone. After the addition is complete, the whole is stirred and refluxed for sixty-five hours. After cooling there are added 50 parts water. The organic layer is separated, dried over potassium carbonate, filtered and evaporated. The oily residue is dissolved in 75 parts acetone. This solution is filtered and after cooling the filtrate overnight at −20° C., the precipitated solid is filtered off, washed with diisopropylether and dried, yielding the crude product. This fraction is recrystallized from a mixture of 24 parts diisopropylether and 24 parts 4-methyl-2-pentanone, yielding 1-phenyl - 4 - oxo-8-[5-(4-fluorophenyl)-4-phenyl - 3 - pentenyl] - 1,3,8 - triaza-spiro(4,5)decane, melting point 147–157° C.

Example CLXXXIV

A mixture of 9.2 parts 5-chloro-1,2-di-(4-fluorophenyl)-2-pentene, 4.6 parts 1-phenyl-4-oxo-1,3,8-triaza-spiro(4,5)decane, 3.2 parts sodium carbonate, a few crystals of potassium iodide in 200 parts 4-methyl-2-pentanone is stirred and refluxed for seventy hours. After cooling, there are added 70 parts water. The organic layer is separated, dried over potassium carbonate, filtered and the filtrate is evaporated. The oily residue is dissolved in diisopropylether and this solution is evaporated again. The now obtained solid residue is recrystallized from 80 parts 4-methyl-2-pentanone. After cooling to −20° C., the solid is filtered off and dried, yielding 1-phenyl-4-oxo-8-[4,5-di-(4-fluorophenyl) - 3 - pentenyl]-1,3,8-triaza-spiro(4,5)decane, melting point 162–164° C.

Example CLXXXV

To a stirred and refluxing mixture of 5.1 parts 1-phenyl-4-oxo-1,3,8-triaza-spiro(4, 5)decane, 7 parts sodium carbonate, a few crystals of potassium iodide in 136 parts 4-methyl-2-pentanone is added dropwise a solution of 6.4 parts 1-bromo-5-phenoxy-pentane in 24 parts 4-methyl-2-pentanone. After the addition is complete, the whole is stirred and refluxed for forty-eight hours. After cooling, there are added 150 parts water. The remaining precipitate is filtered off and recrystallized from 80 parts 4-methyl-2-pentanone. After keeping for two hours at room temperature, the formed precipitate is filtered off and dried, yielding 1-phenyl-4-oxo-8-(5-phenoxy-pentyl)-1,3,8-triaza-spiro(4, 5)decane, melting point 170–171.5° C.

Example CLXXXVI

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 6 parts 1-bromo-3-(2-methylphenoxy)-propane in 24 parts 4-methyl-2-pentanone. After the addition is complete, the whole is stirred and refluxed for forty hours. After cooling 150 parts water are added. The remaining precipitate is filtered off, washed successively with water and 4-methyl-2-pentanone and dried. It is recrystallized from a mixture of 4-methyl-2-pentanone and tetrahydrofurane. The whole is filtered several times until clear and after cooling the filtrate to −20° C., 1-phenyl-4-oxo-8-[3-(2-methylphenoxy)-propyl] - 1,3,8 - triaza-spiro(4,5)decane is obtained, melting point 188–189° C.

Example CLXXXVII

To a stirred mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 6 parts 1-bromo-3-(3-methylphenoxy)-propane in 24 parts 4-methyl-2-pentanone. After the addition is complete, the whole is stirred and refluxed for forty hours. After cooling the reaction mixture, 150 parts water are added. The remaining solid is filtered off, washed successively with water and 4-methyl-2-pentanone and dried. The obtained product is recrystallized from 48 parts 4-methyl-2-pentanone. After cooling for three hours at room temperature, 1-phenyl - 4 - oxo-8-[3-(3 - methylphenoxy)-propyl] - 1,3,8 - triaza-spiro(4,5)decane is obtained, melting point 159–159.5° C.

Example CLXXXVIII

To a stirred and refluxing mixture of 5.1 parts 1-phenyl-4-oxo - 1,3,8 - triaza-spiro(4,5)decane, 7 parts sodium carbonate, a few crystals of potassium iodide in 136 parts 4-methyl-2-pentanone is added dropwise a solution of 6 parts 1-bromo-3-(4-methylphenoxy)-propane in 24 parts 4-methyl-2-pentanone. After the addition is complete, the whole is further stirred and refluxed for another forty hours. After cooling 150 parts water are added. The remaining precipitate is filtered off, washed on the filter with water and 4-methyl-2-pentanone and then recrystallized from 48 parts 4-methyl-2-pentanone. After standing at room temperature for three hours, 1-phenyl-4-oxo-8-[3-(4-methylphenyl)-propyl] - 1,3,8 - triaza - spiro(4,5) decane is obtained, melting point 165–166° C.

*Example CLXXXIX*

To a stirred mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5.3 parts 1-chloro-3-(4-methoxy-phenoxy)-propane in 24 parts 4-methyl-2-pentanone. After the addition is complete, the whole is stirred and refluxed for twenty-six hours. After cooling 150 parts water are added. The remaining precipitate is filtered off, washed on the filter with water and 4-methyl-2-pentanone and then recrystallized from 56 parts 4-methyl-2-pentanone. After cooling for two hours at room temperature, 1-phenyl-4-oxo-8-[3-(4-methoxyphenoxy)-propyl] - 1,3,8 - triaza-spiro(4,5)decane is obtained, melting point 164–165.5° C.

*Example CXC*

To a stirred mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5.3 parts 1-chloro-3-(3-methoxy-phenoxy)-propane in 24 parts 4-methyl-2-pentanone. After the addition is complete, the whole is stirred and refluxed for twenty-eight hours. After cooling, 50 parts water are added. The aqueous layer is separated and extracted once more with 4-methyl-2-pentanone. The combined organic layers are dried over potassium carbonate and evaporated. The solid residue is first stirred in 80 parts diisopropylether and then recrystallized from 72 parts 4-methyl-2-pentanone. After cooling to 0° C., 1-phenyl - 4 - oxo-8-[3-(3-methoxy-phenoxy)-propyl] - 1,3,8 - triaza-spiro(4,5)decane is obtained, melting point 166–167° C.

*Example CXCI*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5 parts 1-chloro-3-(2-fluorophenoxy)-propane in 24 parts 4-methyl-2-pentanone. After the addition is complete, the whole is further stirred and refluxed for another twenty-eight hours. After cooling 150 parts water are added. The remaining precipitate is filtered off, washed successively with 4-methyl-2-pentanone and water and dried. It is recrystallized twice from 4-methyl-2-pentanone (40 parts and 80 parts respectively). After keeping at room temperature, 1-phenyl-4-oxo-8-[3-(2-fluorophenoxy)-propyl]-1,3,8-triaza-spiro(4,5)decane is obtained, melting point 173.5–175° C.

*Example CXCII*

To a stirred mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5 parts 1-chloro-3-(3-fluorophenoxy)-propane in 24 parts 4-methyl-2-pentanone. After the addition is complete, the whole is stirred and refluxed for another thirty hours. After cooling 150 parts water are added. The aqueous layer is separated and extracted once more with 4-methyl-2-pentanone. The combined organic layers are dried over potassium carbonate and evaporated. The solid residue is recrystallized from 80 parts 4-methyl-2-pentanone. After standing for three hours at room temperature, 1-phenyl-4-oxo-8 - [3 - (3-fluorophenoxy)-propyl]-1,3,8-triaza-spiro(4,5) decane is obtained, melting point 152–154° C.

*Example CXCIII*

A mixture of 62 parts 1-chloro-3-(4-fluorophenoxy)-propane, 58 parts 1-phenyl-4-oxo-1,3,8-triaza-spiro(4,5) decane, 43 parts sodium carbonate, a catalytic quantity of potassium iodide in 2000 parts 4-methyl-2-pentanone is stirred and refluxed for two days. After the reaction mixture is sucked off while hot, the filtrate is heated again for a few minutes and filtered. After keeping first at room temperature and then cooled for one hour at 0° C., the formed precipitate is filtered off, washed with 4-methyl-2-pentanone and dried, yielding 1-phenyl-4-oxo-8-[3-(4-fluorophenoxy) - propyl] - 1,3,8 - triaza-spiro(4,5)decane, melting point 173.2–174.4° C.

*Example CXCIV*

A mixture of 4.9 parts of 1-chloro-3-(4-fluorophenoxy)-propane, 5.1 parts 1-phenyl-4-oxo-1,3,8-triaza-spiro(4,5) decane, 7 parts sodium carbonate, a few crystals of potassium iodide in 160 parts 4-methyl-2-pentanone is stirred and refluxed for two days. After cooling, 150 parts water are added. The formed precipitate is filtered off, washed with water and 4-methyl-2-pentanone and dried. After recrystallization from 4-methyl-2-pentanone, the crude free base is obtained. This crop is dissolved in warm methanol. Then gaseous hydrogen chloride is introduced into the hot solution. After cooling the formed precipitate is filtered off and recrystallized from 4-methyl-2-pentanone, yielding 1-phenyl-4-oxo-8-[3-(4-fluorophenoxy)-propyl]-1,3,8-triaza-spiro(4,5-decane hydrochloride, melting point 207–212° C.

*Example CXCV*

To a solution of 0.5 part 1-phenyl-4-oxo-8-[3-(4-fluorophenyl)-propyl]-1,3,8-triaza-spiro(4,5)decane in 40 parts methanol is added a warm solution of 1 part picric acid in 8 parts methanol. After cooling for two hours at 0° C., the formed precipitate is filtered off, washed with ether and dried, yielding the crude picrate. This fraction is dissolved in 120 parts methanol, filtered, and after cooling the filtrate to 0° C., the solid is filtered off, washed sucessively with methanol and ether and dried at 100° C., yielding 1 - phenyl - 4-oxo-8-[3-(4-fluorophenyl)-propyl]-1,3,8-triaza-spiro(4,5)decane picrate, melting point 205–206.5° C.

*Example CXCVI*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 4.5 parts 1-chloro-2-(phenyl-thio)-ethane in 24 parts 5-methyl-2-pentanone. After the addition is complete, the whole is further stirred and refluxed for fifty-five hours. After cooling, 150 parts water are added. The formed precipitate is filtered off and dried, yielding the crude product. This fraction is recrystallized from 48 parts 4-methyl-2-pentanone. After cooling to 0° C., 1-phenyl-4-oxo-8-[2-(phenyl - thio)-ethyl]-1,3,8-triaza-spiro(4,5)decane is obtained, melting point 178–180° C.

*Example CXCVII*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 4.84 parts 1-chloro-3-(phenyl-thio)-propane in 24 parts 4-methyl-2-pentanone. After the addition is complete, the whole is further stirred and refluxed for another two days. After cooling, 150 parts water are added. The formed precipitate is filtered off, washed successively with water and with 4-methyl-2-pentanone and dried, yielding the crude product. This fraction is recrystallized from 120 parts 4-methyl - 2 - pentanone, yielding 1-phenyl-4-oxo-8-[3-(phenyl-thio)-propyl]-1,3,8-triaza-spiro(4,5)decane, melting point 185.5–186.5° C.

Example CXCVIII

To a stirred and refluxing mixture of 199 parts 4-methyl-thiophenol, 314 parts 1-bromo-3-chloro-propane, 360 parts benzene and 450 parts water is added dropwise a solution of 64.7 parts sodium hydroxide in 225 parts water. After the addition is complete, the whole is stirred and refluxed for eight hours. The organic layer is separated, dried over magnesium sulfate, filtered and evaporated. The oily residue is distilled in vacuo, yielding 1-chloro-3-(4-methyl-thio-phenoxy)-propane, boiling point 152–156° C. at 10 mm. pressure.

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5.3 parts 1-chloro-3-(4-methyl-thio-phenoxy)-propane in 24 parts 4-methyl-2-pentanone. After the addition is complete, the whole is stirred and refluxed for another forty-eight hours. After cooling the reaction mixture, 50 parts water are added. The remaining precipitate is filtered off (filtrate is set aside), washed with water and then with 4-methyl-2-pentanone and dried, yielding a first fraction of the crude product. From the filtrate the organic layer is separated, dried over potassium carbonate and evaporated. This solid residue is added to the first crude product and the combined fractions are recrystallized from about 56 parts 4-methyl-2-pentanone. After cooling to room temperature, 1-phenyl-4-oxo-8-[3-(4-methyl-thio-phenoxy)-propyl]-1,3,8-triaza-spiro(4,5)decane is obtained, melting point 163.5–164.5° C.

Example CXCIX

A mixture of 51.2 parts 4-fluoro-thiophenol and 180 parts sodium hydroxide solution 10% is stirred for fifteen minutes at about 40° C. Then there are added dropwise 36.3 parts 2-chloro-ethanol (exothermic reaction: temperature rises to 75° C.). After the addition is complete, the whole is further stirred and refluxed for two hours and thirty minutes. After cooling there are added 160 parts anhydrous ether. The aqueous layer is separated and extracted once more with ether. The combined etheric layers are washed twice with water, dried over sodium sulfate, filtered and evaporated. The oily residue is distilled in vacuo, yielding a first fraction of 2-(4-fluoro-thio-phenoxy)-ethanol boiling at 111–120° C. at 1 mm. pressure and a second fraction of 2-(4-fluoro-thio-phenoxy)-ethanol is obtained with a boiling point 120–123° C. at 2 mm. pressure.

To a stirred and refluxing mixture of 115 parts 2-(4-fluoro-thio-phenoxy)-ethanol in 390 parts chloroform are added dropwise 90 parts thionylchloride. After the addition is complete, the whole is further stirred and refluxed for another four hours. The reaction mixture is then stirred overnight at room temperature. After evaporation the residue is distilled in vacuo, yielding 1-chloro-2-(4-fluoro-thio-phenoxy)-ethane, boiling point 122–123° C., at 14 mm. pressure; $n_D^{20}$: 1.5560; $d_{20}^{20}$: 1.2613.

To a stirred and refluxing mixture of 5.1 parts 1-phenyl-4-oxo-1,3,8-triaza-spiro(4,5)decane, 7 parts sodium carbonate and a few crystals of potassium iodide in 136 parts 4-methyl-2-pentanone is added dropwise a solution of 5 parts 1-chloro-2-(4-fluoro-thio-phenoxy)-ethane in 24 parts 4-methyl-2-pentanone. After the addition is complete, the whole is further stirred and refluxed for forty-eight hours. After cooling there are added 150 parts water. The organic layer is separated, dried over potassium carbonate and evaporated. The solid residue is recrystallized from 72 parts 4-methyl-2-pentanone. After cooling to 0° C., 1-phenyl-4-oxo-8-[2-(4-fluoro-thio-phenoxy)-ethyl]-1,3,8-triaza-spiro(4,5)decane is obtained, melting point 146–150° C.

Example CC

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 5.4 parts 1-chloro-3-(4-fluorophenyl-thio)-propane in 24 parts 4-methyl-2-pentanone. After the addition is complete, the whole is stirred and refluxed for another forty-eight hours. After cooling, 150 parts water are added. The remaining precipitate is filtered off, washed successively with water and 4-methyl-2-pentanone and dried. After recrystallization from 64 parts 4-methyl-2-pentanone and cooling to room temperature, 1-phenyl-4-oxo-8-[3-(4-fluoro-phenyl-thio)-propyl]-1,3,8-triaza-spiro(4,5)decane is obtained, melting point 168.5–169° C.

Example CCI

To a stirred and refluxing mixture of 5.1 parts 1-phenyl-4-oxo-1,3,8-triaza-spiro(4,5)decane, 7 parts sodium carbonate, a few crystals of potassium iodide in 136 parts of 4-methyl-2-pentanone is added dropwise a solution of 6.9 parts dl-1-chloro-2-[α-(4-fluorophenyl)-benzyloxy]-ethane in 24 parts 4-methyl-2-pentanone. After the addition is complete, the whole is stirred and refluxed for another forty-eight hours. After cooling 150 parts water are added. The organic layer is separated, dried over potassium carbonate and evaporated. The solid residue is recrystallized from a boiling mixture of 32 parts 4-methyl-2-pentanone and 32 parts diisopropylether. After cooling to room temperature, the solid is filtered off and dried, yielding 1-phenyl-4-oxo-8-{2-[α-(4-fluorophenyl)-benzyloxy]-ethyl}-1,3,8-triaza-spiro(4,5)decane, melting point 166–168° C.

Example CCII

A mixture of 10 parts 1-chloro-2-[di-(4-fluorophenyl)-methoxy]-ethane, 5.1 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for sixty hours. After cooling the reaction mixture is treated with 150 parts water. The organic layer is separated, dried over potassium carbonate, filtered and evaporated. The oily residue is dissolved in 80 parts 2-butanone. After cooling to room temperature, the formed precipitate is filtered off and dried, yelding 1-phenyl-4-oxo-8-{2-[di-(4-fluorophenyl)-methoxy]-ethyl}-1,3,8-triaza-spiro(4,5)decane, melting point 163–164° C.

Example CCIII

To a solution of 4-fluoro-phenyl-magnesiumbromide, prepared in the usual manner, starting from 7.72 parts magnesium and 52.5 parts 4-fluoro-bromobenzene in 200 parts anhydrous ether, is added dropwise a solution of 50 parts 4-benzoyl-1-chloro-butane in 200 parts anhydrous ether, while refluxing. After the addition is complete, the whole is further stirred and refluxed for another four hours. After cooling the reaction mixture is decomposed with an ammonium chloride solution. The organic layer is separated and dried over sodium sulfate, filtered and evaporated. The oily residue is distilled in vacuo, yielding dl-5-chloro-1-(4-fluorophenyl)-1-phenyl-pentanol, boiling point 170–175° C. at 0.8 mm. pressure.

A mixture of 6.5 parts dl-5-chloro-1-(4-fluorophenyl)-1-phenyl-pentanol, 4,6 parts 1-phenyl-4-oxo-1,3,8-triaza-spiro(4,5)decane, 3.18 parts sodium carbonate, a few crystals of potassium iodide in 200 parts 4-methyl-2-pentanone is stirred and refluxed for seventy hours. After cooling 100 parts water are added. The undissolved part is filtered off and dried, yielding a mixture of the free base and the mono-hydrochloride. This fraction is washed with a 10% sodium hydroxide solution and extracted with chloroform. The organic layer is dried over sodium sulfate, filtered and evaporated. The solid residue is recrystallized from 160 parts 4 - methyl - 2 - pentanone, yielding dl - 1 - phenyl - 4 - oxo - 8 - [5 - (4 - fluorophenyl) - 5 - hydroxy - 5 - phenyl - pentyl] - 1,3,8 - triaza - spiro(4,5)decane, melting point 151–155° C.

*Example CCIV*

A mixture of 6.8 parts 5 - chloro - 1,1 - di - (4 - fluorophenyl) - pentanol, 4.6 parts 1 - phenyl - 4 - oxo - 1,3,8-triaza - spiro(4,5)decane, 3,2 parts sodium carbonate, a few crystals of potassium iodide in 200 parts 4 - methyl-2 - pentanone is stirred and refluxed for forty-five hours. After cooling the reaction mixture, there are added 70 parts water. The organic layer is separated, dried over potassium carbonate, filtered and evaporated. The solid residue is dissolved in 120 parts boiling acetone. This solution is filtered and to the filtrate are added 24 parts 2-propanol. To this solution is added a warm solution of 2.6 parts oxalic acid dihydrate in 40 parts acetone. After cooling to room temperature, the precipitated oxalate is filtered off and dried, yielding 1 - phenyl - 4 - oxo - 8 - [5,5 - di - (4 - fluorophenyl) - 5 - hydroxy-pentyl] - 1,3,8 - triaza - spiro(4,5)decane oxalate, melting point 126°→183° C. (dec.).

*Example CCV*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 3.25 parts 1-bromo-propane in 24 parts 4-methyl-2-pentanone. After the addition is complete, the whole is stirred and refluxed for another forty-eight hours. After cooling the reaction mixture, 150 parts water are added. The remaining precipitate is filtered off and dried, yielding 1-phenyl-4-oxo-8-propyl-1,3,8 - triaza-spiro(4,5)decane, melting point 201.5–203° C.

*Example CCVI*

A mixture of 8.3 parts 1-bromo-4,4-diphenyl-valeronitrile, 5.1 parts 1-phenyl-4-oxo-1,3,8-triaza-spiro(4,5)decane, 7 parts sodium carbonate, a few crystals of potassium iodide in 160 parts 4-methyl-2-pentanone is stirred and refluxed for forty-eight hours. After cooling the reaction mixture, there are added 150 parts water. The remaining precipitate is filtered off and dried in vacuo, to yield the crude product. This fraction is recrystallized from 105 parts 4-methyl-2-pentanone. After cooling to room temperature, 1 - phenyl-4-oxo-8-(4 - cyano-4,4-diphenyl-butyl)-1,3,8-triaza-spiro(4,5)decane is obtained, melting point 212–213.5° C.

*Example CCVII*

A mixture of 8 parts 1-chloro-5-cyano-5,5-diphenyl-pentane, 7 parts 1-phenyl-4-oxo-1,3,8-triaza-spiro(4,5)decane, 15 parts sodium carbonate, a few crystals of potassium iodide in 280 parts 4-methyl-2-pentanone is stirred and refluxed for seventy-two hours. After cooling 200 parts water are added. The formed precipitate is filtered off and the filtrate is set aside. The solid is washed with water and ether and dried yielding the crude product. From the filtrate, which was set aside, the aqueous layer is separated and washed with ether. The combined organic layers are dried and evaporated. The residue is washed with acetone, to yield a second crude crop. The combined crude fractions are dissolved in 200 parts benzene. On addition of 160 parts petroleum-ether, two fractions are obtained, a first fraction of 1-phenyl-4-oxo-8-(5-cyano-5,5 - diphenyl-pentyl)-1,3,8-triaza-spiro(4,5)decane, melting point 188–189° C. and a second fraction of 1-phenyl-4-oxo-8-(5-cyano-5,5-diphenyl-pentyl) - 1,3,8 - triaza-spiro(4,5)decane, melting point 187.5–188° C.

*Example CCVIII*

A mixture of 4.5 parts 1-(benzyloxy)-2-chloro-ethane, 5.1 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for fifty hours. After cooling, 150 parts water are added. The organic layer is separated, dried over potassium carbonate, filtered and evaporated. The solid residue is stirred in diisopropylether, filtered off again and recrystallized from 24 parts 4-methyl-2-pentanone, yielding 1-phenyl-4-oxo-8-(2-benzyloxy-ethyl)-1,3,8 - triaza-spiro(4,5)decane, melting point 147–150° C.

*Example CCIX*

A mixture of 4 parts 4-bromo-2-methyl-2-butene, 5.1 parts 1-phenyl-4-oxo - 1,3,8 - triaza - spiro(4,5)decane, 4 parts sodium carbonate, a few crystals of potassium iodide in 200 parts 4-methyl-2-pentanone is stirred and refluxed for sixty hours. After cooling the reaction mixture, 150 parts water are added. The organic layer is separated, dried over sodium carbonate, filtered and evaporated. The solid residue is recrystallized from 24 parts 4-methyl-2-pentanone, yielding 1-phenyl-4-oxo-8-(3-methyl-2-butenyl) - 1,3,8 - triaza - spiro(4,5)decane, melting point 180–182° C.

*Example CCX*

A mixture of 3.4 parts 4-chloro-1-cyclopropyl-1-butene, 5.1 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for forty hours. After cooling the reaction mixture, there are added 150 parts water. The remaining precipitate is filtered off and the filter-cake is set aside. From the filtrate the organic layer is separated, dried over potassium carbonate, filtered and evaporated. The solid residue is recrystallized from 80 parts 4-methyl-2-pentanone, yielding less pure 1-phenyl-4-oxo-8-(4-cyclopropyl-3-butenyl)-1,3,8-triaza-spiro(4,5)decane, melting point 203.5–212° C. The filter-cake, which was set aside, is recrystallized from 120 parts 4-methyl-2-pentanone, yielding 1-phenyl-4-oxo-8-(4 - cyclopropyl-3-butenyl)-1,3,8-triaza-spiro(4,5)decane, melting point 220–226° C.

*Example CCXI*

A mixture of 2 parts 2-chloro-ethanol, 5 parts 1-phenyl-4-oxo-1,3,8-triaza-spiro(4,5)decane, 4 parts sodium carbonate, a few crystals of potassium iodide in 200 parts 4-methyl-2-pentanone is stirred and refluxed for forty-eight hours. After cooling the reaction mixture, the formed precipitate is filtered off and dried, yielding the crude product. This fraction is recrystallized from 24 parts 4-methyl-2-pentanone. This recrystallization is repeated once more, to yield 1-phenyl-4-oxo-8-(2-hydroxyethyl)-1,3,8-triaza-spiro(4,5)decane hemihydrate, melting point 180–185.5° C.

*Example CCXII*

To a stirred and refluxing mixture of 5.1 parts 1-phenyl-4-oxo-1,3,8-triaza-spiro(4,5)decane, 7 parts sodium carbonate, a few crystals of potassium iodide in 136 parts 4-methyl-2-pentanone is added dropwise a solution of 4.8 parts 2-(benzoyloxy)-1-chloro-ethane in 24 parts 4-methyl-2-pentanone. After the addition is complete, the whole is stirred and refluxed for another two days. After cooling, 150 parts water are added. The formed precipitate is filtered off, washed with water and 4-methyl-2-pentanone and dried, to yield the crude product. This fraction is recrystallized from 80 parts 4-methyl-2-pentanone, yielding 1-phenyl-4-oxo-8-[2-(benzoyloxy)-ethyl]-1,3,8-triaza-spiro(4,5)decane, melting point 191–193° C.

Example CCXIII

A mixture of 50 parts 1-phenyl-4-oxo-8-benzyl-1,3,8-triaza-spiro(4,5)decane, 100 parts propionic acid anhydride and 400 parts toluene is stirred and refluxed for fifteen hours. After cooling the reaction mixture to room temperature, the whole is rendered alkaline with ammonium hydroxide solution, while cooling with ice. The organic layer is separated, dried over magnesium sulfate, filtered and evaporated in vacuo to a volume of about 200 parts. To the residue are added 400 parts anhydrous ether and after cooling to −15° C., 1-phenyl-3-propionyl-4-oxo-8-benzyl-1,3,8-triaza-spiro(4,5)decane is obtained, melting point 110–111° C.

Example CCXIV

A mixture of 3.8 parts 1-phenyl-4-oxo-8-[2-(1,4-benzodioxanyl)-methyl]-1,3,8-triaza - spiro(4,5)decane, 5.1 parts acetic acid anhydride and 80 parts anhydrous toluene is stirred and refluxed for 15 hours. The hot reaction mixture is filtered. After cooling the filtrate is alkalized with ammonium hydroxide solution. The organic layer is separated, washed twice with sodium hydroxide solution, dried over potassium carbonate and evaporated. The semi-solid residue is dissolved in a mixture of 16 parts acetone and 240 parts diisopropyl-ether and gaseous hydrogen chloride is introduced into this solution. The precipitated solid salt is filtered off and dried, yielding 1-phenyl-3-acetyl-4-oxo-8-[2-(1-4-benzodioxanyl)-methyl]-1,3,8-triaza - spiro(4,5)decane hydrochloride, melting point 140° C. (dec.).

Example CCXV

A mixture of 3.8 parts 1-phenyl-4-oxo-8-[2-(1,4-benzodioxanyl)-methyl]-1,3,8-triaza-spiro(4,5)decane, 6.5 parts propionic acid anhydride and 80 parts anhydrous toluene is stirred and refluxed for fifteen hours. The hot reaction mixture is filtered. After cooling the filtrate is alkalized with ammonium hydroxide solution. The organic layer is separated, washed twice with sodium hydroxide solution, dried over potassium carbonate and evaporated. The solid residue is triturated in 16 parts diisopropylether, yielding dl - 1 - phenyl-3-propionyl-4-oxo-8-[2-(1,4-benzodioxanyl) - methyl]-1,3,8-triaza-spiro(4,5)decane, melting point 141–147° C.

Example CCXVI

A mixture of 7.3 parts 1-phenyl-4-oxo-8-[2-(1,4-benzodioxanyl) - methyl] - 1,3,8-triaza-spiro(4,5)decane, 1.6 parts sodamide and 80 parts anhydrous toluene is stirred and refluxed for seven hours. After cooling to 60° C., there is added a solution of 8.3 parts cyclopropane carboxylic acid chloride in 160 parts anhydrous toluene and the whole is further stirred and refluxed for another eighteen hours. After cooling 100 parts water are added, whereupon the formed precipitate is filtered off. From the filtrate the organic layer is separated, washed with sodium hydroxide solution, dried over sodium sulfate, filtered and evaporated. The oily residue is dissolved in 400 parts anhydrous ether. The solution is filtered and gaseous hydrogen chloride is introduced into the filtrate. The solid hydrochloride is filtered off, to yield the crude product. This fraction is dissolved in 64 parts acetone. After cooling to 0° C., the formed precipitate is filtered off and dried for two hours at 70° C. in vacuo, yielding dl - 1 - phenyl-3-(cyclopropylcarbonyl)-4-oxo-8-[2-(1,4-benzodioxanyl) - methyl] - 1,3,8-triaza-spiro(4,5)decane hydrochloride, melting point 140–196° C. (dec.).

Example CCXVII

A mixture of 7.3 parts 1-phenyl-4-oxo-8-[2-(1,4-benzodioxanyl)-methyl]-1,3,8-triaza-spiro(4,5)decane, 1,2 parts sodamide and 200 parts anhydrous toluene is stirred and refluxed for four hours. After cooling there are added 5.6 parts benzoylchloride and the whole is further stirred and refluxed for three hours. After cooling the reaction mixture is decomposed with water, whereupon some solid is precipitated. It is filtered off and the filtrate is set aside. The solid is dissolved in chloroform. This solution is washed with ammonium hydroxide solution and water, dried over sodium sulfate and evaporated. The residue is recrystallized from 4-methyl-2-pentanone, yielding a first crude fraction.

From the filtrate, which was set aside, the organic layer is separated, washed with ammonium hydroxide solution and water, dried over sodium sulfate and evaporated. The residue is recrystallized from 60 parts 4-methyl-2-pentanone, to yield a second fraction of the crude product.

These combined crude fractions are dissolved in chloroform. This solution is washed once more with ammonium hydroxide solution, dried over sodium sulfate and evaporated. The residue is first recrystallized from 4-methyl-2-pentanone and then from a mixture of ethanol and chloroform, to yield 1-phenyl-3-benzoyl-4-oxo-8-[2-(1,4 - benzodioxanyl) - methyl]-1,3,8-triaza-spiro(4,5) decane, melting point 188.5–190° C.

Example CCXVIII

A mixture of 4.5 parts dl-1-phenyl-4-oxo-8-[4-(4-fluoro-phenyl - 4 - phenyl - butyl]-1,3,8-triaza-spiro(4,5)decane, 10 parts propionic acid anhydride and 40 parts toluene is stirred and refluxed for twenty hours. The reaction mixture is cooled and alkalized with sodium hydroxide solution 10%, while stirring. The organic layer is separated, dried over potassium carbonate, filtered and evaporated. The oily residue is dissolved in 24 parts ether, filtered and after cooling the filtrate to room temperature, 1 - phenyl-3-propionyl-4-oxo-8-[4-(4-fluorophenyl) - 4 - phenyl-butyl] - 1,3,8-triaza-spiro(4,5)decane, melting point 102.5–103° C.

Example CCXIX

A mixture of 4.7 parts 1-phenyl-4-oxo-8-[4,4-di-(4-fluorophenyl) - butyl]-1,3,8-triaza-spiro(4,5)decane, 10 parts propionic acid anhydride and 40 parts toluene is boiled for fifteen hours, while stirring. After cooling, the reaction mixture is rendered alkaline with sodium hydroxide solution 10%. The organic layer is separated, dried over sodium sulfate, filtered and evaporated in vacuo. To the residue are added 40 parts diethylether. After cooling to −15° C., the crude product is obtained. This fraction is recrystallized from a mixture of 16 parts acetone and 24 parts diisopropylether, yielding 1-phenyl-3-propionyl - 4 - oxo-8-[4,4-di-(4-fluorophenyl)-butyl]-1,3,8-triaza-spiro(4,5)decane, melting point 113–114° C.

Example CCXX

A mixture of 4.5 parts 1-phenyl-4-oxo-8-[2-(1,4-benzodioxanyl) - methyl] - 1,3,8-triaza-spiro(4,5)decane, 0.7 part sodamide and 36 parts toluene is refluxed for three hours. Then 3.7 parts N,N,N-trimethyl-aniliniumbromide are added and the whole is further stirred and refluxed for another sixteen hours. After cooling 15 parts water are added. The organic layer is separated, dried over sodium sulfate, filtered and evaporated. The oily residue is dissolved in a mixture of 560 parts diisopropylether and 8 parts ethyl acetate. The whole is filtered and gaseous hydrogen chloride is introduced into the filtrate. The precipitated very hygroscopic hydrochloride is filtered off and the free base is liberated again in the usual manner. It is extracted with chloroform and after distillation of this solvent, the oily residue is dissolved in 60 parts 2-propanol. Then a solution of 1.5 parts oxalic acid dihydrate in 20 parts 2-propanol is added. The whole is boiled for a short time, filtered and after cooling the filtrate for two hours at room temperature, an oil is obtained. After addition of another 80 parts 2-propanol, the whole is boiled while stirring, whereupon a solid is obtained. After keeping the mixture at room temperature for one hour, the solid is filtered off and dried, yielding dl-1-phenyl-3-methyl-4-oxo-8-[2-(1,4-benzodioxanyl)- methyl] - 1,3,8-triaza-spiro(4,5)decane oxalate, melting point 227–228° C.

*Example CCXXI*

To a suspension of 7.3 parts 1-phenyl-4-oxo-8-[2-(1,4-benzodioxanyl)-methyl]-1,3,8-triaza-spiro(4,5)decane in 40 parts anhydrous benzene are added 1.6 parts sodamide. The whole is stirred and refluxed for seven hours, whereupon a solution is obtained. Then there is added, after cooling to 60° C., a solution of 5.4 parts ethyl-2-chloropropionate in 80 parts anhydrous benzene and the whole is further stirred and refluxed for seventeen hours. After cooling, 60 parts water are added. The organic layer is separated, dried over sodium sulfate, filtered and evaporated. The oily residue is dissolved in a mixture of 64 parts acetone and 400 parts diisopropylether and gaseous hydrogen chloride is introduced into the solution. The ether is decanted and the residue is dried overnight at 60° C., yielding dl-1-phenyl-3-[2-(ethoxy-carbonyl)-ethyl]-4-oxo-8-[2-(1,4-benzo-dioxanyl) - methyl] - 1,3,8-triaza-spiro(4,5)decane hydrochloride, melting point 93–114° C.

*Example CCXXII*

To a suspension of 7.3 parts 1-phenyl-4-oxo-8-[2-(1,4-benzodioxanyl)-methyl] - 1,3,8 - triaza-spiro(4,5)decane in 80 parts anhydrous toluene are added 1.6 parts sodamide. The whole is refluxed for seven hours. To the obtained solution is added dropwise a solution of 5.04 parts benzylchloride in 80 parts anhydrous toluene. After the addition is complete, the whole is stirred and refluxed for seventeen hours. After cooling, 100 parts water are added. The organic layer is separated, dried over sodium sulfate, filtered and evaporated. The residue is dissolved in a mixture of 560 parts diisopropylether and 40 parts acetone. The solution is filtered and gaseous hydrogen chloride introduced into the filtrate. The formed solid hydrochloride is filtered off and dried, yielding the crude product. This crop is recrystallized from boiling acetone. After cooling, the solid is filtered and dried, yielding dl-1-phenyl-3-benzyl-4-oxo-8-[2-(1,4-benzodioxanyl) - methyl]-1,3,8-triaza-spiro(4,5)decane hydrochloride, melting point 230–232° C.

*Example CCXXIII*

A mixture of 17.5 parts 1-phenyl-4-oxo-8-[2-(1,4-benzodioxanyl)-methyl]-1,3,8-triaza-spiro(4,5)decane, 50 parts formaldehyde 37% and 160 parts 2-propanol is stirred and refluxed for fifteen hours. The reaction mixture is evaporated. The residue is dissolved in 32 parts acetone. The solution is poured into 480 parts diisopropylether and gaseous hydrogen chloride is introduced into the solution. The precipitated solid hydrochloride is filtered off and dried, yielding the crude salt. This crop is dissolved in a mixture of 200 parts water and 40 parts acetone. The solution is alkalized with sodium hydroxide and the acetone is removed by distillation in vacuo. The residue is extracted twice with chloroform. The chloroform solution is dried over magnesium sulfate and evaporated. The solid residue is dissolved in 32 parts acetone. After cooling overnight at −20° C., dl-1-phenyl-3-(hydroxymethyl)-4-oxo-8-[2-(1,4-benzodioxanyl) - methyl) - methyl]-1,3,8-triaza-spiro(4,5)decane is obtained, melting point 169–175° C.

*Example CCXXIV*

6.5 parts 1-phenyl - 4 - oxo-8-[2-(1,4-benzodioxanyl)-methyl]-1,3,8-triaza-spiro(4,5)decane are dissolved in 120 parts anhydrous benzene, while stirring. Then 1.2 parts sodamide are added, whereupon ammonia gas is evolved. The whole is refluxed for four hours, while stirring. After cooling to a temperature of 25° C., a solution of 2.4 parts chloro-methyl-methylether dissolved in 8 parts anhydrous benzene is added dropwise. (Exothermic reaction: temperature rises from 25° to 40° C.) The whole is stirred at 40° C. for fourteen hours. After cooling the reaction mixture is decomposed twice with 50 parts water. The organic layer is dried over magnesium sulfate and evaporated. The oily residue is dissolved in 32 parts hot ethanol. Then there is added a hot solution of 2.15 parts oxalic acid dihydrate in 16 parts ethanol. After cooling for two hours at −20° C., a first fraction of dl-1-phenyl-3-(methoxy-methyl)-4-oxo-8 - [2 - (1,4 - benzodioxanyl)-methyl]-1,3,8-triaza-spiro(4,5)decane oxalate is obtained, melting point 138°–183° C. (dec.).

On further cooling the mother liquor for four days at −20° C., a second fraction of dl-1-phenyl-3-(methoxy-methyl)-4-oxo-8-[2-(1,4-benzodioxanyl) - methyl] - 1,3,8-triaza-spiro(4,5)decane oxalate is obtained, melting point 194.5–196° C.

*Example CCXXV*

To a mixture of 5.6 parts 1-phenyl-4-oxo-8-[2-(1,4-benzodioxanyl)-methyl]-1,3,8-triaza - spiro(4.5)decane, 1 part acrylonitrile and 100 parts tetrahydrofurane is added dropwise a solution of sodium thioxide, prepared from 0.5 part sodium in 8 parts ethanol. After the addition is complete, the whole is heated to about 40° C. While maintaining this temperature, the whole is stirred overnight. After cooling the reaction mixture is evaporated. The residue is dissolved in water. This solution is extracted with chloroform. The organic layer is dried over sodium sulfate and evaporated. The residue is dissolved in hot 2-propanol. Then there is added a hot solution of 1.8 parts oxalic acid dihydrate in 2-propanol. After cooling two fractions are obtained, respectively a first fraction of less pure product, which is recrystallized twice: first from 120 parts 2-propanol and then from 60 parts ethanol, to yield the pure 1-phenyl-3-(2-cyano-ethyl)-4-oxo-8-[2-(1,4-benzodioxanyl)-methyl]-1,3,8-triaza-spiro(4,5)decane oxalate, melting point 181–187° C.; and a second fraction of 1-phenyl-3-(2-cyano-ethyl) - 4 - oxo-8[2-(1,4-benzodioxanyl)-methyl]-1,3,8-triaza-spiro(4,5)decane oxalate, melting point 181.5–186.5° C.

*Example CCXXVI*

To a stirred and warm solution (50° C.) of 7.3 parts 1-phenyl-4-oxo-8-[2-(1,4 - benzodioxanyl) - methyl] - 1,3,8-triaza-spiro(4,5)decane, 2.1 parts acrylamide and 80 parts tetrahydrofurane is added dropwise a sodium ethoxide solution, prepared from 0.5 part sodium in 8 parts ethanol (exothermic reaction). After the addition is complete, the whole is stirred for fourteen hours at 50° C. After cooling the reaction mixture is exaporated. The residue is extracted with chloroform and water. The organic layer is dried over sodium sulfate, filtered and evaporated. The oily residue is dissolved in a mixture of 400 parts diisopropylether and 40 parts acetone. The solution is filtered and gaseous hydrogen chloride is introduced into the filtrate. The precipitated hydrochloride is filtered off and dried overnight at 60° C., to yield the crude product. This fraction is recrystallized from a mixture of acetone and 2-propanol, yielding dl-1-phenyl-3-(2-carbamoyl-ethyl)-4-oxo-8-[2-(1,4-benzodioxanyl)-methyl]-1,3,8-triaza - spiro (4,5)decane hydrochloride, melting point 175–184° C.

*Example CCXXVII*

A mixture of 4.1 parts 1-phenyl-4-oxo-8-(3-benzoyl-propyl)-1,3,8-triaza-spiro(4,5)decane, 0.5 part sodium tetrahydridoborate, 1 part water and 60 parts tetrahydrofurane is stirred and refluxed for four hours. After cooling the reaction mixture is decomposed with diluted hydrochloric acid. The acid aqueous solution is alkalized with ammonium hydroxide and extracted with chloroform. The organic layer is dried over potassium carbonate and evaporated. The solid residue is dried, yielding dl-1-phenyl-4-oxo-8-(4-hydroxy-4-phenyl-butyl)-1,3,8-triaza - spiro(4,5) decane, melting point 153.5–161° C.

*Example CCXXVIII*

A mixture of 5 parts 1-phenyl-4-oxo-8-(4-benzoyl-butyl) - 1,3,8 - triaza-spiro(4,5)decane, 0.5 part sodium tetrahydridoborate, 1 part water and 60 parts tetrahydrofurane is stirred and refluxed for four hours. After cooling, the reaction mixture is decomposed with diluted hydrochloric acid. The acid solution is alkalized with ammonium hydroxide, whereupon a solid is precipitated. It is filtered off and recrystallized from 56 parts 4-methyl-2-pentanone. After cooling to 0° C., dl-1-phenyl-4 - oxo - 8 - (5 - hydroxy - 5 - phenyl - pentyl) - 1,3,8-triaza-spiro(4,5)decane is obtained, melting point 174–174.5– C.

*Example CCXXIX*

A mixture of 8 parts dl-1-phenyl-4-oxo-8-[4-(4-fluorophenyl) - 4 - hydroxy - butyl] - 1,3,8 - triaza-spiro(4,5)decane, 4 parts propionic acid anhydride, 40 parts anhydrous benzene and a catalytic quantity of sulfosalicylic acid is stirred and refluxed for five hours. After cooling the reaction mixture is evaporated. The residue is alkalized with ammonum hydroxide and extracted with chloroform. The organic layer is dried over magnesium sulfate, filtered and evaporated. The residue is dissolved in 120 parts ether, filtered and gaseous hydrogen chloride is introduced into the filtrate. The precipitated solid hydrochloride is filtered off and recrystallized from 40 parts 2-propanol, yielding dl-1-phenyl - 4 - oxo - 8 - [4 - (4 - fluorophenyl) - 4-propionoxy - butyl] - 1,3,8 - triaza - spiro(4,5)decane hydrochloride, melting point 219–222° C.

*Example CCXXX*

30 parts 1 - phenyl - 4 - oxo - 8 - benzyl - 1,3,8-triaza-spiro(4,5)decane are dissolved in 480 parts anhydrous toluene, while heating and stirring. Then there are added 7.5 parts sodamide, whereupon ammonia gas is evolved. The mixture is refluxed for seven hours. After cooling to room temperature, there is added dropwise a solution of 15.5 parts chloro-methyl-methylether in 48 parts anhydrous toluene (slightly exothermic reaction: temperature rises to 35° C.). After the addition is complete, the whole is stirred for eighteen hours at a temperature of 40–45° C. After cooling to room temperature, the mixture is shaken with 150 parts water. The organic layer is dried over magnesium sulfate and evaporated. The oily residue solidifies on evaporation in acetone, yielding 1-phenyl-3-(methoxy-methyl)-4-oxo-8 - benzyl - 1,3,8 - triaza - spiro(4,5)decane, melting point 105.5–110° C.

*Example CCXXXI*

A mixture of 8 parts dl-1-phenyl-4-oxo-8-[4-(4-fluorophenyl) - 4 - hydroxy - butyl] - 1,3,8 - triaza - spiro (4,5)decane, 3.15 parts acetic acid anhydride, 40 parts benzene and a catalytic quantity of sulfosalicylic acid is stirred and refluxed for five hours. After cooling the reaction mixture is filtered and the filtrate is evaporated. The residue is alkalized with diluted ammonium hydroxide solution and extracted with chloroform. The organic layer is dried, filtered and evaporated. The solid residue is recrystallized twice from 4-methyl-2-pentanone (20 parts and 16 parts respectively), to yield dl - 1 - phenyl - 4 - oxo - 8 - [4 - (4 - fluorophenyl)-4 - acetoxy - butyl] - 1,3,8 - triaza - spiro(4,5)decane, melting point 158.5–160° C.

*Example CCXXXII*

A mixture of 3.2 parts 1,2-epoxy-ethyl-benzene and 5.1 parts 1 - phenyl - 4 - oxo - 1,3,8 - triaza - spiro(4,5)decane is heated for twenty hours at 100° C. (oil-bath). The solid reaction mixture is dissolved in 32 parts toluene. Then there are added 16 parts ether and the whole is stirred. After cooling to 0° C., the crude product is obtained. This fraction is recrystallized from 12 parts 4-methyl-2-pentanone. After cooling to room temperature, dl - 1 - phenyl - 4 - oxo - 8 - (2 - hydroxy-2 - phenyl - ethyl) - 1,3,8 - triaza-spiro(4,5)decane is obtained, melting point 173–177° C.

*Example CCXXXIII*

A mixture of 6.4 parts 1-chloro-2-(diphenyl-methoxy)-ethane, 5.1 parts 1-phenyl-4-oxo-1,3,8-triaza-spiro(4,5) decane, 4 parts sodium carbonate, a few crystals of potassium iodide in 200 parts 4-methyl-2-pentanone is stirred and refluxed for sixty hours. After cooling, the reaction mixture is treated with 150 parts water. The organic layer is separated, dried over potassium carbonate, filtered and evaporated. The solid residue is stirred in diisopropyl-ether, filtered off again and recrystallized from 80 parts diisobutyl-ketone, yielding 1-phenyl - 4 - oxo - 8 - [2 - (diphenyl - methoxy) - ethyl]-1,3,8-triaza-spiro(4,5)decane, melting point 176–180° C.

*Example CCXXXIV*

A mixture of 6.3 parts 4-chloro-1,1-diphenyl-1-butene, 5.1 parts 1 - phenyl - 4 - oxo - 1,3,8 - triaza - spiro(4,5) decane, 4 parts sodium carbonate, a few crystals of potassium iodide in 200 parts 4-methyl-2-pentanone is stirred and refluxed for forty hours. After cooling the reaction mixture, there are added 150 parts water. The remaining precipitate is filtered off and the filter-cake is set aside. From the filtrate the organic layer is separated, dried over potassium carbonate, filtered and evaporated. The solid residue is recrystallized from 80 parts 4-methyl-2-pentanone, yielding a first fraction of 1 - phenyl - 4 - oxo - 8 - (4,4 - diphenyl - 3 - butenyl)-1,3,8 - triaza - spiro(4,5)decane, melting point 201.5–2.06.5° C.

The filter-cake which was set aside (see above), is recrystallized from 400 parts 4-methyl-2-pentanone, to yield a second fraction of 1 - phenyl - 4 - oxo - 8 - (4,4 - diphenyl - 3 - butenyl) - 1,3,8 - triaza - spiro (4,5) decane, melting point 210.5–212° C., and a third fraction of 1 - phenyl - 4 - oxo - 8 - (4,4 - diphenyl - 3-butenyl) - 1,3,8 - triaza - spiro(4,5)decane, melting point 209.5–211° C.

*Example CCXXXV*

A mixture of 3.7 parts 3-chloro-propiophenone, 4.6 parts 1 - phenyl - 4 - oxo - 1,3,8 - triaza - spiro(4,5) decane, 3.2 parts sodium carbonate, a few crystals of potassium iodide in 200 parts 4-methyl-2-pentanone is stirred and refluxed for sixty hours. After cooling the reaction mixture, there are added 50 parts water. The organic layer is separated, dried over potassium carbonate and evaporated. The solid residue is washed with 16 parts acetone, filtered off again and dried, yielding 1-phenyl - 4 - oxo - 8 - (2 - benzoyl - ethyl) - 1,3,8-triaza-spiro(4,5)decane, melting point 159.4–163.2° C.

*Example CCXXXVI*

A mixture of 4.4 parts 1-bromo-2-phenyl-propane, 10.2 parts 1 - phenyl - 4 - oxo - 1,3,8 - triaza - spiro (4,5)decane, a few crystals of potassium iodide in 80 parts 4-methyl-2-pentanone is heated in a sealed tube for sixty-five hours at about 150° C. After cooling, the reaction mixture is poured into 100 parts water. The organic layer is separated and washed twice with water, dried over potassium carbonate and evaporated. The oily residue is dissolved in 48 parts ether. After cooling overnight at —20° C., dl - 1 - phenyl - 4 - oxo - 8-(2 - phenyl-propyl)-1,3,8-triaza-spiro(4,5)decane is obtained, melting point 144–152° C.

*Example CCXXXVII*

A mixture of 4.8 parts 1-bromo-1-phenyl-thane, 5.1 parts 1-phenyl-4-oxo-1, 3, 8-triaza-spiro(4, 5)decane, 4 parts sodium carbonate, a few crystals of potassium oxide in 200 parts 4-methyl-2-pentanone is stirred and refluxed for forty-eight hours. After cooling 150 parts water are added. The organic layer is separated, dried over sodium carbonate and filtered, whereupon a solid crystallizes, to yield a first fraction of dl-1-phenyl-4-oxo-8-(1-phenyl-ethyl)-1,3,8-triaza-spiro(4,5)decane, melting point 217–218° C.

The mother liquor is evaporated. The solid residue is recrystallized from 4-methyl-2-pentanone, to yield a second fraction of dl-1-phenyl-4-oxo-8-(1-phenyl-ethyl)-1,3,8-triaza-spiro(4,5)decane, melting point 215.5–217.5° C.

*Example CCXXXVIII*

To a stirred mixture of 95 parts 1-benzyl-4-oxo-piperidine, 29.5 parts propylamine and 48 parts denatured ethanol are added dropwise 50 parts concentrated hydrochloric acid at a temperature below 20° C. After the addition is complete and while keeping the temperature below 20° C., there is added dropwise a solution of 33.1 parts potassium cyanide in 120 parts water. After the addition is complete, the whole is stirred for three days at room temperature. The reaction mixture is poured into 200 parts water and then extracted with chloroform. The organic layer is washed with water, dried over potassium carbonate, filtered and evaporated. The oily residue, 1-benzyl-4-cyano-4-N-(propyl-amino)-piperidine, is used without further purification for the preparation of the next step.

To 165 parts sulfuric acid 98% are added 25.7 parts 1-benzyl-4-cyano-4-N-(propyl-amino)-piperidine, while stirring (exothermic reaction: temperature rises from 18° to 82° C.). The whole is stirred for one hour (temperature falls to 26° C.). The reaction mixture is poured into a mixture of crushed ice and ammonium hydroxide. The whole is extracted with chloroform. The organic layer is separated, dried over potassium carbonate, filtered and evaporated in vacuo. The residue is dissolved in ether. After keeping at room temperature, 1-benzyl-4-carbamoyl-4-N-(propyl-amino)-piperidine is obtained, melting point 128–131° C.

A mixture of 83 parts 1-benzyl-4-carbamoyl-4-N-(propyl-amino)-piperidine, 150 parts triethoxy-methane, 240 parts anhydrous toluene and 15 parts glacial acetic acid is stirred and refluxed for sixty hours. After cooling the reaction mixture is evaporated. The residue is alkalized with sodium hydroxide and 300 parts water are added. The whole is extracted with chloroform. The organic layer is dried over sodium sulfate, filtered and evaporated. The solid residue is recrystallized from ethyl acetate, yielding 1-propyl-4-oxo-8-benzyl-1,3,8,-triaza-spiro(4,5)dec-2-ene, melting point 146.6–156.6° C.

A mixture of 60 parts 1-propyl-4-oxo-8-benzyl-1,3,8-triaza-spiro(4,5)dec-2-ene, 240 parts methanol, 480 parts 2-propanol, 50 parts concentrated hydrochloric acid and 720 parts distilled water is hydrogenated at normal pressure and at a temperature of about 35° C., in the presence of 31 parts palladium-on-charcoal catalyst 10%. After the calculated amount of hydrogen is taken up, hydrogenation is stopped. The catalyst is filtered off and the filtrate is evaporated. The residue is triturated in acetone. The solid is filtered off, washed with ether and dried, yielding 1-propyl-4-oxo-1,3,8 - triaza - spiro(4,5)decane dihydrocloride, melting point 212–213° C. (dec.).

To a stirred and refluxing solution of 6.1 parts 1-propyl-4-oxo-1,3,8-triaza-spiro(4,5)decane dihydrochloride, 10.1 parts sodium carbonate, a few crystals of potassium iodide in 100 parts 4-methyl-2-pentanone is added dropwise a solution of 4.6 parts 2-(bromomethyl)-1,4-benzodioxane in 100 parts 4-methyl-2-pentanone. After the addition is complete, the whole is stirred and refluxed for seventy hours. After cooling the reaction mixture, there are added 70 parts water. The organic layer is separated, dried over potassium carbonate, filtered over activated charcoal and evaporated. The oily residue is evaporated once more with 80 parts acetone. The solid residue is filtered, washed with acetone and dried, yielding a first fraction of dl-1-propyl-4-oxo-8-[2-(1,4-benzodioxanyl)-methyl]-1,3,8-triaza-spiro(4,5)decane, melting point 143–143.6° C.

The mother liquor is evaporated. The residue is recrystallized from diisopropylether and filtered off. It is washed with acetone and dried, yielding a second fraction of dl-1-propyl-4-oxo-8-[2-(1, 4-benzodioxanyl)-methyl]-1,3,8-triaza-spiro(4,5)decane, melting point 138–140.8° C.

*Example CCIL*

To a stirred mixture of 95 parts 1-benzyl-4-oxo-piperidine, 36.5 parts n-butylamine and 48 parts ethanol are added dropwise 50 parts concentrated hydrochloric acid at a temperature below 20° C. (ice-bath). After the addition is complete, there is added dropwise a solution of 33.1 parts potassium cyanide in 120 parts water, while maintaining this temperature. After the addition is complete, the whole is stirred for thirty-six hours at room temperature. Then there are added 200 parts water and the whole is extracted with chloroform. The organic layer is washed with 500 parts water, dried over sodium sulfate, filtered and evaporated. The residue is dissolved in a mixture of 80 parts ether and 560 parts petroleum ether. After cooling for two days at −15° C., the crude product is filtered. This fraction is used without further purification for the preparation of the next step.

On further keeping the mother liquor at room temperature for two days, two fractions are obtained, respectively 1-benzyl-4-cyano-4-N-(butylamino)-piperidine, melting point 75–77° C.; and 1-benzyl-4-cyano-4-N-(butylamino)-piperidine, melting point 69.9–78.2° C.

To 108 parts sulfuric acid 98% are added portionwise 20 parts 1-benzyl-4-cyano-4-N-(butylamino)-piperidine in the course of two minutes, while stirring (exothermic reaction: temperature rises to 60° C.). After the addition is complete, the whole is heated at 80° C. for one hour, while stirring and then cooled to room temperature. The reaction mixture is poured into ice and ammonium hydroxide: an oil is precipitated. The whole is extracted with chloroform. The organic layer is dried over potassium carbonate, filtered and evaporated. The residue is dissolved in 40 parts diisopropylether. After cooling overnight at −15° C., the crude product is filtered off. This fraction is recrystallized from 2-propanol; after cooling overnight at −15° C., 1-benzyl-4-N-(butylamino)-4-carbamoyl-piperidine is filtered off, melting point 114–118° C.

A mixture of 26 parts 1-benzyl-4-N-(butylamino)-4-carbamoyl-piperidine, 50 parts triethoxy-methane, 80 parts toluene and 9 parts glacial acetic acid is stirred and refluxed for two days. After cooling the reaction mixture is evaporated in vacuo. The residue is alkalized and extracted with chloroform. The organic layer is separated, dried over potassium carbonate, filtered and evaporated. The residue is recrystallized from 80 parts ethylacetate, yielding the crude free base. After recrystallization of this free base from ethylacetate, the solid is dissolved in a mixture of 160 parts anhydrous ether and 40 parts 2-propanol and gaseous hydrogen chloride is introduced into the solution. After cooling overnight at 0° C., the solid is filtered and dried, yielding 1-butyl-4-oxo-8-benzyl-1,3,8-triaza-spiro(4,5)dec-2-ene dihydrochloride, melting point 265–267.5° C.

A mixture of 27 parts 1-butyl-4-oxo-8-benzyl-1,3,8-triaza-spiro(4,5)dec-2-ene dihydrochloride, 120 parts methanol, 75 parts distilled water and 20 parts concentrated hydrochloric acid is hydrogenated at normal pressure and at a temperature of 33–35° C., in the presence of 10 parts palladium-on-charcoal catalyst 10%. After the calculated amount of hydrogen is taken up (two moles), hydrogenation is stopped. The catalyst is filtered off and the filtrate is evaporated. The residue is triturated in acetone, filtered off and dried, yielding 1-butyl-4-oxo-1,3,8-triaza-spiro(4,5)decane dihydrochloride, melting point 110°→227° C. (dec.).

A mixture of 6.6 parts 1-bromo-3,3-diphenyl-butyronitrile, 4 parts 1-butyl-4-oxo-1,3,8-triaza-spiro(4,5)decane, 3.2 parts sodium carbonate, a few crystals of potassium iodide in 200 parts 4-methyl-2-pentanone is stirred and refluxed for sixty hours. After cooling 50 parts water are added. The organic layer is separated, washed with water, dried over potassium carbonate, and evaporated. The residue is dissolved in a mixture of acetone and diisopropylether and gaseous hydrogen chloride is introduced into the solution. The precipitated solid salt is filtered off and dried, to yield the crude product. This crop is recrystallized from a boiling mixture of 40 parts acetone and 40 parts 2-propanol. After cooling to room temperature, 1-butyl-4-oxo-8-(3-cyano-3,3-diphenyl-propyl)-1,3,8-triaza-spiro(4,5)decane dihydrochloride is obtained, melting point 246–254° C.

*Example CCL*

A mixture of 2.8 parts 1-chloro-4,4-diphenyl-butane, 3.2 parts 1-cyclohexyl-4-oxo-1,3,8-triaza-spiro(4,5)decane dihydrochloride, 5.3 parts sodium carbonate, a few crystals of potassium iodide in 200 parts 4-methyl-2-pentanone is stirred and refluxed for seventy-two hours. After cooling the reaction mixture, there are added 50 parts water. The undissolved part is filtered off (the filtrate is set aside) and recrystallized from 72 parts acetone, yielding a first fraction of 1-cyclohexyl-4-oxo-8-(4,4-diphenyl-butyl)-1,3,8-triaza-spiro(4,5)decane, melting point 201–209.5° C.

From the filtrate which was set aside, the organic layer is separated, dried over potassium carbonate, filtered and evaporated. The solid residue is triturated in a mixture of 20 parts acetone and 20 parts diisopropylether, to yield the crude product. This fraction is recrystallized from 80 parts acetone, yielding a second fraction 1-cyclohexyl-4-oxo-8-(4,4-diphenyl-butyl)-1,3,8-triaza-spiro(4,5)decane, melting point 207–210° C.

What is claimed is:

1. Chemical compounds selected from the group consisting of 1-$R_1$-2-$R_2$-3-$R_3$-4-oxo-8-$R_4$-1,3,8-triaza-spiro(4,5)decane and the therapeutically active nontoxic acid addition salts thereof wherein $R_1$ is a member selected from the group consisting of phenyl, lower alkaryl, lower alkyl, lower alkoxyphenyl, cyclobutyl, cyclopentyl, cyclohexyl, and halophenyl; $R_2$ is a member selected from the group consisting of hydrogen and lower alkyl; $R_3$ is a member selected from the group consisting of hydrogen, hydroxymethyl, lower alkyl, lower alkylcarbonyl, cyanoethyl, lower alkoxymethyl, lower alkoxycarbonyl-lower alkyl, carbamoyl-lower alkyl, cyclopropylcarbonyl, benzyl and benzoyl; $R_4$ is a member selected from the group consisting of (R''')(R'''')CH— and Z(CH$_2$)$_n$—, wherein R''' is a member selected from the group consisting of methyl and ethyl, R'''' is a member selected from the group consisting of aryl, arylmethylene and arylethylene, $n$ is a positive integer from 1 to 5 and Z is a member selected from the group consisting of hydrogen, lower alkyl, hydroxy, hydroxy-lower alkoxy, phenyl, diphenyl-cyanomethylene, diaryl-hydroxymethylene, diphenylpropionylmethylene, fluorophenyl-hydroxymethylene, aryloxy, 1,4-benzodioxanyl, halo-1,4-benzodioxanyl, thienyl, halophenyl, lower alkylphenyl, pyridyl, di-lower alkylphenyl, phenyl-lower alkylene, lower alkoxyphenyl, cyclopropyl-ethenyl, benzoyl, halobenzoyl, thienoyl lower alkylbenzoyl, lower alkoxybenzoyl, benzoyloxy, benzyloxy, phenylmethoxymethylene, phenylhydroxymethylene, fluorophenyl-lower alkylcarbonyl-oxy-methylene, fluorophenyl-lower alkylene, aryl-lower alkyl aryl-cyclopropyl, arylthio, (aryl)(R')CH—, wherein R' is a member selected from the group consisting of lower alkyl, aryl and aryl-lower alkyl, (aryl)$_2$CH—O—, (lower alkyl)$_2$C=CH—, (aryl)(R'')C=CH—, wherein R'' is a member selected from the group consisting of hydrogen, lower alkyl, aryl and aryl-lower alkyl; said lower alkyl and lower alkoxy containing from 1 to 6 carbon atoms and said aryl being a member selected from the group consisting of phenyl, halophenyl, lower alkylphenyl, lower alkoxyphenyl, trifluoromethylphenyl and 2-thienyl.

2. 1-phenyl-4-oxo-8-(3-benzoylpropyl)-1,3,8-triaza-spiro(4,5)decane.
3. 1-phenyl-4-oxo-8-[4-oxo-4-(2-thienyl)-butyl]-1,3,8-triaza-spiro(4,5)decane.
4. dl-1-phenyl-2-methyl-4-oxo-8-[3-(4-fluorobenzoyl)-propyl]-1,3,8-triaza-spiro(4,5)decane.
5. 1-phenyl-3-acetyl-4-oxo-8-[3-(4-fluorobenzoyl)-propyl]-1,3,8-triaza-spiro(4,5)decane hydrochloride.
6. 1-cyclohexyl-4-oxo-8-[3-(4-fluorobenzoyl)-propyl]-1,3,8-triaza-spiro(4,5)decane dihydrochloride.
7. 1-phenyl-3-methyl-4-oxo-8-[3-(4-fluorobenzoyl)-propyl]-1,3,8-triaza-spiro(4,5)decane hydrochloride.
8. 1-(4-methylphenyl)-4-oxo-8-[3-(4-fluorobenzoyl)-propyl]-1,3,8-triaza-spiro(4,5)decane.
9. 1-phenyl-4-oxo-8-[3-(4-chlorobenzoyl)-propyl]-1,3,8-triaza-spiro(4,5)decane.
10. 1-phenyl-4-oxo-8-[3-(4-fluorobenzoyl)-propyl[-1,3,8-triaza-spiro(4,5)decane.
11. 1-phenyl-4-oxo-8-[2-(1,4-benzodioxanyl)-methyl]-1,3,8-triaza-spiro(4,5)decane.
12. 1-phenyl-4-oxo-8-(4-methylbenzyl)-1,3,8-triaza-spiro(4,5)decane.
13. 1-phenyl-4-oxo-8-(4-methylbenzyl)-1,3,8-triaza-spiro(4,5)decane.
14. 1-phenyl-3-methyl-4-oxo-8-benzyl-1,3,8-triaza-spiro(4,5)decane.
15. 1-phenyl-4-oxo-8-(3-cyano-3,3-diphenylpropyl)-1,3,8-triaza-spiro(4,5)decane.
16. 1-phenyl-3-(hydroxymethyl)-4-oxo-8-benzyl-1,3,8-triaza-spiro(4,5)decane.
17. 1-phenyl-4-oxo-8-(2-methylbenzyl)-1,3,8-triaza-spiro(4,5)decane.
18. 1-phenyl-4-oxo-8-(4-fluorobenzyl)-1,3,8-triaza-spiro(4,5)decane.
19. 1-phenyl-4-oxo-8-[3-(4-halobenzoyl)-propyl]-1,3,8-triaza-spiro(4,5)decane.
20. 1-phenyl-4-oxo-8-[3-(4-fluoro-phenoxy)-propyl]-1,3,8-triaza-spiro(4,5)decane hydrochloride.
21. 1-phenyl-4-oxo-8-[3-(4-fluoro-phenyl-thio)-propyl]-1,3,8-triaza-spiro(4,5)decane.
22. 1-phenyl-4-oxo-8-[4-(4-fluoro-phenyl)-3-pentenyl]-1,3,8-triaza-spiro(4,5)decane.
23. 1-phenyl-4-oxo-8-[4-(4-fluoro-phenyl)-3-butenyl]-1,3,8-triaza-spiro(4,5)decane.
24. 1-phenyl-4-oxo-8-[4-(4-fluoro-phenyl)-butyl]-1,3,8-triaza-spiro(4,5)decane.
25. 1-phenyl-3-methyl-4-oxo-8-[4,4-di-(4-fluoro-phenyl-butyl]1,3,8-triaza-spiro(4,5)decane hydrochloride.
26. 1-phenyl-4-oxo-8-[4,4-di-(4-fluoro-phenyl)-butyl]-1,3,8-triaza-spiro(4,5)decane.
27. dl-1-phenyl-3-methyl-4-oxo-8-[4-(4-fluoro-phenyl)-4-phenyl-butyl]-1,3,8-triaza-spiro(4,5)-decane.
28. 1-phenyl-4-oxo-8-(4,4-diphenyl-butyl)-1,3,8-triaza-spiro(4,5)decane.
29. dl-1-phenyl-4-oxo-8-(3-phenyl-butyl)-1,3,8-triaza-spiro(4,5)decane.
30. dl-1-phenyl-4-oxo-8-[1-(4-fluoro-phenyl)-ethyl]-1,3,8-triaza-spiro(4,5)decane.
31. dl-1-phenyl-4-oxo-8-[1-(4-chloro-phenyl)-propyl]-1,3,8-triaza-spiro(4,5)decane.
32. dl-1-phenyl-3-methyl-4-oxo-8-[2-(1,4-benzodioxanyl)-methyl]-1,3,8-triaza-spiro(4,5)decane oxalate.
33. dl-1-phenyl-4-oxo-8-[2-(1,4-benzodioxanyl)-methyl]-1,3,8-triaza-spiro(4,5)decane.
34. dl-1-phenyl-3-(methoxy-methyl)-4-oxo-8-[2-(1,4-benzodioxanyl)-methyl]-1,3,8-triaza-spiro(4,5)decane oxalate.

No references cited.

WALTER A. MODANCE, *Primary Examiner.*

NICHOLAS S. RIZZO, *Examiner.*